United States Patent
Hart

(10) Patent No.: US 8,611,814 B2
(45) Date of Patent: Dec. 17, 2013

(54) COMMUNICATION SYSTEM

(75) Inventor: Michael John Hart, London (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/613,367

(22) Filed: Nov. 5, 2009

(65) Prior Publication Data

US 2010/0111027 A1      May 6, 2010

Related U.S. Application Data

(62) Division of application No. 11/453,055, filed on Jun. 15, 2006.

(30) Foreign Application Priority Data

Jun. 17, 2005  (EP) .................................. 05253783

(51) Int. Cl.
*H04B 7/14*       (2006.01)

(52) U.S. Cl.
USPC .................................. 455/16; 455/7; 370/315

(58) Field of Classification Search
USPC ................ 455/7–11.1, 14–25, 450–453, 509; 370/315
See application file for complete search history.

(56) References Cited

U.S. PATENT DOCUMENTS

| | | | |
|---|---|---|---|
| 4,261,054 A | 4/1981 | Scharla-Nielsen et al. |
| 5,029,164 A | 7/1991 | Goldstein |
| 5,293,639 A | 3/1994 | Wilson |
| 5,592,154 A | 1/1997 | Lin |
| 5,724,659 A | 3/1998 | Daniel |
| 6,002,690 A | 12/1999 | Takayama |
| 6,678,248 B1 | 1/2004 | Haddock |
| 6,907,212 B2 | 6/2005 | Harada |
| 7,184,703 B1 | 2/2007 | Naden |
| 7,376,122 B2 | 5/2008 | Draves |
| 7,400,856 B2 | 7/2008 | Sartori |
| 7,454,244 B2 | 11/2008 | Kassab |
| 7,574,230 B1 | 8/2009 | Oh |
| 7,609,631 B2 | 10/2009 | Stanwood |
| 7,738,859 B2 | 6/2010 | Roy |
| 7,865,146 B2 | 1/2011 | Hart |
| 7,881,741 B2 | 2/2011 | Horiuchi |
| 7,983,151 B2 | 7/2011 | Hart |
| 8,000,651 B2 | 8/2011 | Horiuchi |

(Continued)

FOREIGN PATENT DOCUMENTS

| CA | 2556681 A1 | 9/2005 |
|---|---|---|
| CN | 1547862 A | 11/2004 |

(Continued)

OTHER PUBLICATIONS

European Search Report dated Oct. 18, 2005 received in EP05253783.

(Continued)

*Primary Examiner* — Raymond Dean
(74) *Attorney, Agent, or Firm* — Smith, Gambrell & Russell, LLP

(57) ABSTRACT

The present application relates to a wireless communication system and related methods and apparatuses for transmitting a signal from a source apparatus to a destination apparatus, via at least one intermediate apparatus. In particular, the present invention relates to techniques which seek to improve the throughput of data in multi-hop communication systems.

8 Claims, 49 Drawing Sheets

(56) References Cited

U.S. PATENT DOCUMENTS

| | | |
|---|---|---|
| 2001/0008520 A1 | 7/2001 | Tiedemann, Jr. et al. |
| 2002/0039383 A1 | 4/2002 | Zhu |
| 2002/0115409 A1 | 8/2002 | Khayrallah |
| 2002/0115440 A1 | 8/2002 | Hamabe |
| 2003/0097460 A1 | 5/2003 | Higashiyama |
| 2003/0123401 A1 | 7/2003 | Dean |
| 2003/0125067 A1 | 7/2003 | Takeda |
| 2003/0156554 A1 | 8/2003 | Dillinger |
| 2003/0165127 A1 | 9/2003 | Fujiwara |
| 2003/0198204 A1 | 10/2003 | Taneja |
| 2003/0202476 A1 | 10/2003 | Billhartz |
| 2004/0001464 A1 | 1/2004 | Adkins |
| 2004/0123229 A1 | 6/2004 | Kim |
| 2004/0219876 A1 | 11/2004 | Baker |
| 2004/0266339 A1 | 12/2004 | Larsson |
| 2005/0014464 A1 | 1/2005 | Larsson |
| 2005/0048914 A1 | 3/2005 | Sartori |
| 2005/0048983 A1 | 3/2005 | Abraham |
| 2005/0063356 A1 | 3/2005 | Larsen |
| 2005/0213587 A1 | 9/2005 | Cho |
| 2005/0249162 A1 | 11/2005 | Kim |
| 2005/0249164 A1 | 11/2005 | Kwak |
| 2005/0272366 A1 | 12/2005 | Eichinger |
| 2005/0288020 A1 | 12/2005 | Cho |
| 2006/0040697 A1 | 2/2006 | Komatsu |
| 2006/0067243 A1 | 3/2006 | Bejerano |
| 2006/0209671 A1* | 9/2006 | Khan et al. .................. 370/208 |
| 2006/0227796 A1 | 10/2006 | Wei |
| 2006/0264172 A1 | 11/2006 | Izumikawa |
| 2007/0050495 A1 | 3/2007 | Sridhar et al. |
| 2007/0066239 A1 | 3/2007 | Hart |
| 2007/0066240 A1 | 3/2007 | Hart |
| 2007/0066241 A1 | 3/2007 | Hart |
| 2007/0066337 A1 | 3/2007 | Hart |
| 2007/0081507 A1 | 4/2007 | Koo |
| 2007/0116106 A1 | 5/2007 | Hart |
| 2008/0009243 A1 | 1/2008 | Hart |
| 2008/0049718 A1 | 2/2008 | Chindapol |
| 2008/0165720 A1 | 7/2008 | Hu |
| 2008/0225774 A1 | 9/2008 | Kim |
| 2009/0185479 A1 | 7/2009 | Hart |
| 2010/0110973 A1 | 5/2010 | Hart |
| 2010/0111027 A1 | 5/2010 | Hart |

FOREIGN PATENT DOCUMENTS

| | | |
|---|---|---|
| CN | 1859364 A | 11/2006 |
| EP | 1388936 A2 | 2/2004 |
| EP | 1753188 A1 | 2/2007 |
| EP | 1761080 A1 | 3/2007 |
| EP | 1773091 A2 | 4/2007 |
| EP | 1801995 A1 | 6/2007 |
| GB | 2440982 A | 2/2008 |
| GB | 2440984 A | 2/2008 |
| GB | 2440985 A | 2/2008 |
| GB | 2443466 A | 5/2008 |
| GB | 2443465 A | 7/2008 |
| JP | 3166831 A | 7/1991 |
| JP | 6505371 | 8/1992 |
| JP | 2002185382 A | 6/2002 |
| JP | 2003124876 A | 4/2003 |
| JP | 2003258719 A | 9/2003 |
| JP | 2004032393 A | 1/2004 |
| JP | 2004173123 A | 6/2004 |
| JP | 2005033625 A | 2/2005 |
| JP | 2005142676 A | 6/2005 |
| JP | 2005142968 A | 6/2005 |
| JP | 2005159900 A | 6/2005 |
| KR | 1020030049031 A | 6/2003 |
| WO | 9214309 A1 | 8/1992 |
| WO | 9746038 A2 | 12/1997 |
| WO | 98936509 A1 | 8/1998 |
| WO | 0077948 A1 | 12/2000 |
| WO | 0150635 A1 | 7/2001 |
| WO | 0163849 A2 | 8/2001 |
| WO | 0344970 A2 | 5/2003 |
| WO | 03044970 A2 | 5/2003 |
| WO | 2004107693 A1 | 12/2004 |
| WO | 2004107693 A1 | 12/2004 |
| WO | 2004112282 A1 | 12/2004 |
| WO | 2005013507 A1 | 2/2005 |
| WO | 2005020517 A1 | 3/2005 |
| WO | 2005025110 A3 | 3/2005 |
| WO | 2005053338 A1 | 6/2005 |
| WO | 2005064872 A1 | 7/2005 |
| WO | 2005088914 A1 | 9/2005 |
| WO | 2006020032 A1 | 2/2006 |
| WO | 2006080507 A1 | 8/2006 |
| WO | 2006099024 A2 | 9/2006 |
| WO | 2006101013 A1 | 9/2006 |
| WO | 2006130964 A1 | 12/2006 |
| WO | 2007003142 A1 | 1/2007 |
| WO | 2007019672 A1 | 2/2007 |
| WO | 2007028252 A2 | 3/2007 |

OTHER PUBLICATIONS

Non-Final Office Action dated Jul. 16, 2009 received in U.S. Appl. No. 11/453,055.
Final Office Action dated Mar. 24, 2010 received in U.S. Appl. No. 11/453,055.
Non-Final Office Action dated Aug. 23, 2010 received in U.S. Appl. No. 12/613,342.
Non-Final Office Action dated Nov. 29, 2010 received in U.S. Appl. No. 11/453,055.
Japanese Office Action dated Feb. 1, 2011 received in corresponding Japanese Patent Application 2006167985.
Japanese Office Action dated May 10, 2011 received in corresponding Japanese Patent Application 2006167983.
Final Office Action dated Oct. 14, 2011 received in U.S. Appl. No. 12/226,319.
Final Office Action dated Oct. 25, 2011 received in U.S. Appl. No. 12/226,344.
Non-Final Office Action dated Oct. 31, 2011 received in U.S. Appl. No. 12/301,414.
Notice of Allowance dated Nov. 7, 2011 received in U.S. Appl. No. 11/453,839.
Notification of Reason for Refusal dated Sep. 6, 2011 received in corresponding Japanese Patent Application 2006167986.
Notice of Allowance dated Nov. 23, 2011 received in U.S. Appl. No. 12/973,086.
European Search Report dated Feb. 2, 2011 received in corresponding EP06252979.7.
Christian Hoymann et al. "Multihop Communication in Relay Enhanced IEEE 802.16 Networks" Personal, Indoor and Mobile Radio Communications, 2006 IEEE 17th International Symposium on, IEEE, PI Sep. 11, 2006, pp. 1-4, XP002462917 the whole document.
Daehyon Kim, et al. "Fair and efficient multihop scheduling algorithm for IEEE 802.16 BWA systems" Broadband Networks, 2005 2nd International Conference onMA Oct. 3-7, 2005, Piscataway, NJ, USA, IEEE pp. 895-901 the whole document.
Extended European Search Report dated Mar. 1, 2010 received in corresponding European Patent No. 09172393.2-2416/2141870.
International Search Report issued in PCT/GB2007/002909 dated Mar. 2, 2007.
Kaneko S. et al, "Proposed Relay Method with P-MP Structure of IEEE 802.16-2004" Personal, Indoor and Mobile Radio Communications, 2005. PIMRC 2005, IEEE 16th International Symposium on Berlin, Germany Sep. 11-14, 2005, Piscataway, NJ, USA, IEEE, pp. 1606-1610, XP010926479 Paragraph [0011]—paragraph [00IV].
Non-Final Office Action dated Mar. 21, 2011 received in U.S. Appl. No. 12/226,344.
Search Report Issued in Priority United Kingdom application No. 0704093.4 dated Jul. 3, 2007.
United Kingdom Search Report dated Apr. 19, 2007 for application No. GB0705225.1.
United Kingdom Search Report dated May 23, 2007 for application No. GB0705225.1.

(56) References Cited

OTHER PUBLICATIONS

Non-Final Office Action dated Jun. 22, 2011 received in U.S. Appl. No. 11/637,025.
Non-Final Office Action dated Jun. 16, 2011 received in U.S. Appl. No. 11/454,028.
Final Office Action dated Jun. 23, 2011 received in U.S. Appl. No. 11/453,045.
Non-Final Office Action dated Jun. 27, 2011received in U.S. Appl. No. 12/226,319.
Japanese Office Action date May 10, 2011 received in JP2006-167984.
Notice of Allowance dated Jul. 28, 2011 received in U.S. Appl. No. 11/453,839.
Japanese Office Action dated May 24, 2011 received in JP2006342666.
Japanese Office Action dated May 31, 2011 received in JP2006167981.
Japanese Office Action dated May 10, 2011 received in JP2006-167982.
Japanese Office Action dated Jun. 14, 2011 received in JP2009-535780.
Japanese Office Action dated Jun. 28, 2011 received in JP2009-091469.
Chinese Office Action dated Aug. 12, 2011 received in 200780033647.2.
Notice of Allowance dated Sep. 28, 2011 received in U.S. Appl. No. 12/973,086.
Final Office Action dated Sep. 29, 2011 received in U.S. Appl. No. 11/454,016.
Office Action dated Jul. 5, 2011 received in corresponding Japanese Patent Application No. 2009-091471.
Apostolopoulos, J.G. et. Al. "Source-Channel Diversity for Parallel Channels" IEEE Transactions on Information Theory, IEEE Service Center, Piscataway, NJ, US, vol. 51, No. 10, Oct. 2005, pp. 3518-3539, XP011139661.
British Search Report for Application No. GB0622120.4 dated Dec. 6, 2006.
Communication dated Sep. 30, 2008 forwarding Extended European Search Report in European Application No. 08151572.8.1246 with copy of abstract and narrative.
European Search Report; EP 0525 3768 dated Oct. 14, 2005.
European Search Report: EP 05253784 dated Oct. 17, 2005.
European Search Report: EP 0525 3767 dated Oct. 17, 2005.
European Search Report; EP 05253785 dated Oct. 19, 2005.
European Search Report; EP 05253766 dated Oct. 13, 2005.
Non-Final Office Action dated May 20, 2011 received in U.S. Appl. No. 12/973,086.
European Office Action issued Jan. 17, 2011 in application 07 766 391.2-2415.
First Notice of Office Action in corresponding 200610095607.8 dated Feb. 6, 2009.
IEEE Std. 802.11g-2003 IEEE Standard for Information technology—Telecommunications and information exchange between systems—Local and metropolitan area networks—Specific requirements Part 11: Wireless LAN Medium Accedd Control (MAC) and Physical Layer (PHY) specifications Amendment 4: Further Higher Data Rate Extension in the 2.4 Ghz Band IEEE Computer Society, Jun. 27, 2003.
IEEE Std. 802.16/2004 IEEE Standard for Local and metropolitan area networks Part 16: Air Interface for Fixed Broadband Wireless Access Systems IEEE Computer Society and the IEEE Microwave Theory and Techniques Society, Oct. 1, 2004.
IEEE St. 802.16e 2005 "IEEE Standard for Local and Metropolitan Area Networks. Part 16: Air Interface for Fixed and Mobile Broadband Wireless Access Systems. Amendment 2: Physical and Medium Access Control Layers for Combined Fixed and Mobile Operation in Licensed Bands" Dated Feb. 28, 2006.
IEEE 802.11 a/g standard: "Wireless LAN Medium Access Control (MAC) and Physical Layer (PHY) specifications".
International Search Report for PCT/GB2007/002902(dated Dec. 14, 2007).
International Search Report dated Oct. 25, 2007.
Sreng V. et al.: Relayer selection strategies in cellular networks with peer-to-peer relaying, Vehicular Technology Conference, 2003. 2003 IEEE 58th Orlando, Fl., USA Oct. 6-9, 2003, Piscataway, NJ, USA, IEEE, US, Oct. 6, 2003, pp. 1949-1953.
Zhang Jingmei et al.: "Adaptive optimal transmit power allocation for two-hop non-regenerative wireless relaying system", Vehicular Technology Conference, 2004. VTC 2004-spring. 2004 IEEE 59th Milan, Italy May 17-19, 2004, Piscataway, NJ, USA, IEEE, US, vol. 2, May 17, 2004, pp. 1213-1217.
First Notification of Office Action dated Apr. 3, 2009 received in corresponding Chinese Application No. 200610172053.7.
Non-Final Office Action dated Apr. 9, 2009 received in U.S. Appl. No. 11/454,016.
Mona Ghassemian, Vasilis Friderikos, Hamid Aghvami; Hybrid Handover in Multihop Radio Access Networks; Sep. 2005; document No. XP-010855829.
Non-Final Office Action dated Jan. 5, 2010 received in U.S. Appl. No. 11/637,025.
Final Office Action dated Jul. 6, 2010 received in U.S. Appl. No. 11/637,025.
Final Office Action dated Jun. 16, 2010 received in U.S. Appl. No. 11/453,844.
Non-Final Office Action dated Sep. 30, 2009 received in U.S. Appl. No. 11/453,844.
Notice of Allowance dated Oct. 22, 2010 received on U.S. Appl. No. 11/453,844.
Extended European Search Report dated Feb. 8, 2011 received in 09173072.1-1246/2144466.
Extended European Search Report dated Feb. 14, 2011 received in 09173073.9-1246/2144472.
Extended European Search Report dated Feb. 14, 2011 received in 09173074.7-1246/2144473.
Notice of Allowance dated Jan. 13, 2011 received in U.S. Appl. No. 11/453,839.
Final Office Action dated Dec. 15, 2009 received in U.S. Appl. No. 11/454,016.
Final Office Action dated Mar. 9, 2011 received in U.S. Appl. No. 12/613,342.
Non-Final Office Action dated Dec. 9, 2010 received in U.S. Appl. No. 11/454,016.
Final Office Action dated May 2, 2011 received in U.S. Appl. No. 11/454,016.
Non-Final Office Action dated Jun. 30, 2010 received in U.S. Appl. No. 11/454,028.
Non-Final Office Action dated Apr. 10, 2009 received in U.S. Appl. No. 11/454,028.
Final Office Action dated Dec. 15, 2009 received in U.S. Appl. No. 11/454,028.
Final Office Action dated Dec. 28, 2010 received in U.S. Appl. No. 11/454,028.
Advisory Action dated Apr. 29, 2010 received in U.S. Appl. No. 11/454,028.
Non-Final Office Action dated Dec. 1, 2009 received in U.S. Appl. No. 11/453,045.
Non-Final Office Action dated Jan. 6, 2011 received in U.S. Appl. No. 11/453,045.
Final Office Action dated Aug. 2, 2010 received in U.S. Appl. No. 11/453,045.
Non-Final Office Action dated Jun. 8, 2010 received in U.S. Appl. No. 11/453,839.
Advisory Action dated Jul. 2, 2010 received in U.S. Appl. No. 11/453,055.
Notice of Allowance dated Apr. 26, 2011 received in U.S. Appl. No. 11/453,839.
Final Office Action dated May 17, 2011 received in U.S. Appl. No. 11/453,055.
Notice of Allowance dated May 23, 2011 received in U.S. Appl. No. 11/453,839.
Final Office Action dated Jun. 26, 2012 received in U.S. Appl. No. 12/226,344.

(56) References Cited

OTHER PUBLICATIONS

Non-Final Office Action dated Feb. 7, 2012 received in U.S. Appl. No. 12/613,342.
Notice of Allowance dated Mar. 8, 2012 received in U.S. Appl. No. 12/301,414.
Notice of Allowance dated Jan. 19, 2012 received in U.S. Appl. No. 11/454,028.
Non-Final Office Action dated Jan. 26, 2012 received in U.S. Appl. No. 12/226,319.
Non-Final Office Action dated Feb. 13, 2012 received in U.S. Appl. No. 12/226,344.
Notice of Allowance dated Dec. 22, 2011 received in U.S. Appl. No. 11/453,839.
Decision of Refusal dated Oct. 11, 2011 received in Japanese Patent Application No. 2006-167982.
Decision of Refusal dated Oct. 11, 2011 received in Japanese Patent Application No. 2006-167984.
Japanese Office Action dated Mar. 21, 2012 received in JP2009-530924.
Notification of Reasons for Refusal dated Apr. 24, 2012 received in JP2006-167986.
Final Notification for Reasons for Refusal dated Feb. 14, 2012 received in JP2009-535780.
Modification for Enabling RS Operations dated Nov. 2005 by Tzu-Ming Lin, Chang-Lung Hsiao, Rodger Tseng and Wem-Ho Sheen ITRI Computer and Communications Research Labs, Tawain, R.O.C.
Notice of Allowance received in U.S. Appl. No. 11/454,028 dated May 24, 2012.
Japanese Office Action dated May 29, 2012 received in Japanese Patent Application No. JP2011-081524.
Non-Final Office Action dated Aug. 2, 2012 received in U.S. Appl. No. 11/453,055.
Final Office Action dated Aug. 14, 2012 received in U.S. Appl. No. 12/613,342.
Non-Final Office Action dated Jul. 10, 2012 received in U.S. Appl. No. 12/226,319.
Non-Final Office Action dated Oct. 3, 2012 received in U.S. Appl. No. 13/168,500.
Non-Final Office Action dated Nov. 20, 2012 received in U.S. Appl. No. 12/226,319.
Non-final Office Action dated Apr. 22, 2013 received in U.S. Appl. No. 12/226,319.
Non-final Office Action dated Jun. 17, 2013 received in U.S. Appl. No. 12/513,805.
Final Office Action dated Jun. 26, 2013 received in U.S. Appl. No. 12/226,344.
Notice of Allowance dated Jun. 21, 2013 received in U.S. Appl. No. 11/454,028.
Final Office Action dated Jul. 9, 2013 received in U.S. Appl. No. 13/168,500.
Final Office Action dated Dec. 14, 2012 received in U.S. Appl. No. 11/453,055.
Non-Final Office Action dated Jan. 9, 2013 received in U.S. Appl. No. 11/454,016.
Non-Final Office Action dated Jan. 10, 2013 received in U.S. Appl. No. 12/613,342.
Notice of Allowance dated Jan. 16, 2013 received in U.S. Appl. No. 11/454,028.
Japanese Office Action dated Mar. 12, 2013 received in Patent Appeal No. 2012-516.
Notification of Reason(s) for Refusal dated Dec. 18, 2012 received in Japanese Patent Application No. 2011-191107.
Non-Final Office Action dated Dec. 10, 2012 received in U.S. Appl. No. 12/226,344.
3rd Notification of Chinese Office Action dated Jul. 15, 2013 received in Application No. 200910167069.2.
Notice of Allowance dated Aug. 5, 2013 received in U.S. Appl. No. 12/613,342.
non-final Office Action dated Jul. 24, 2013 received in U.S. Appl. No. 12/226,319.
non-final Office Action dated Jul. 19, 2013 received in U.S. Appl. No. 11/453,055.
Final Office Action dated Oct. 1, 2013 received in U.S. Appl. No. 11/454,016.
Notice of Allowance dated Oct. 16, 2013 received in U.S. Appl. No. 12/226,344.

\* cited by examiner

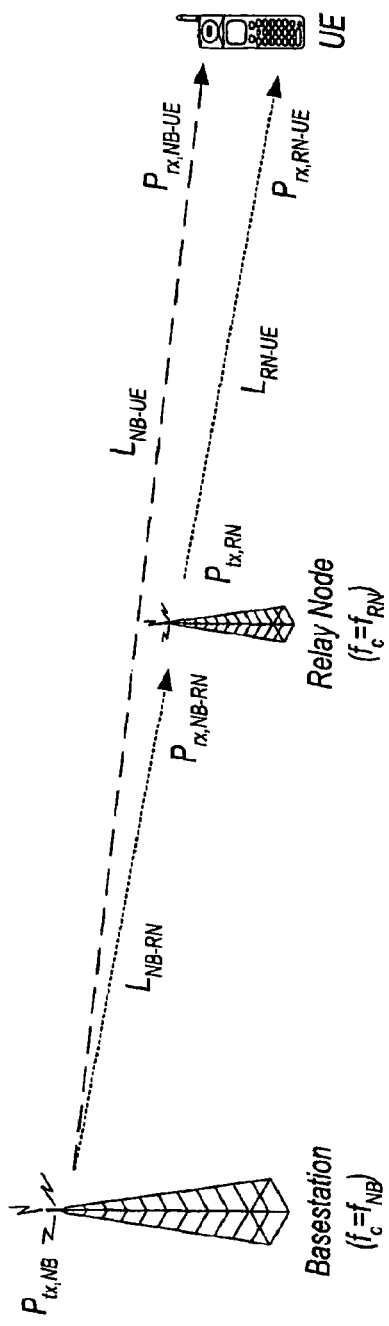
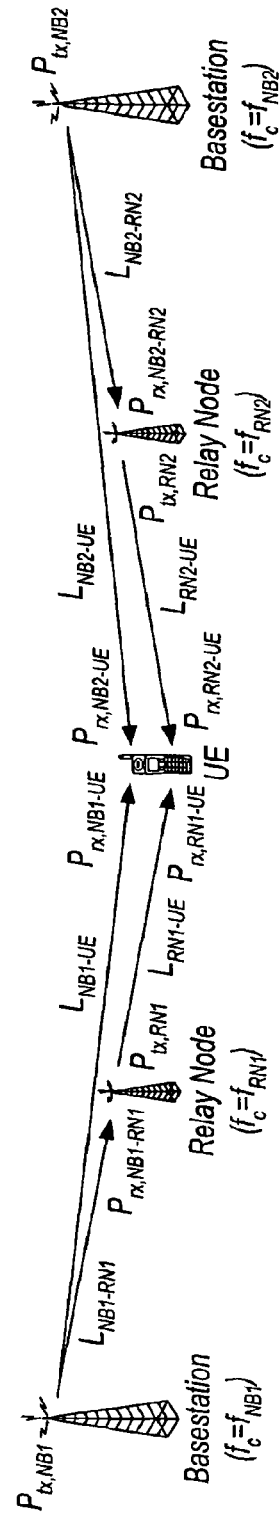
Fig. 1A
Fig. 1B

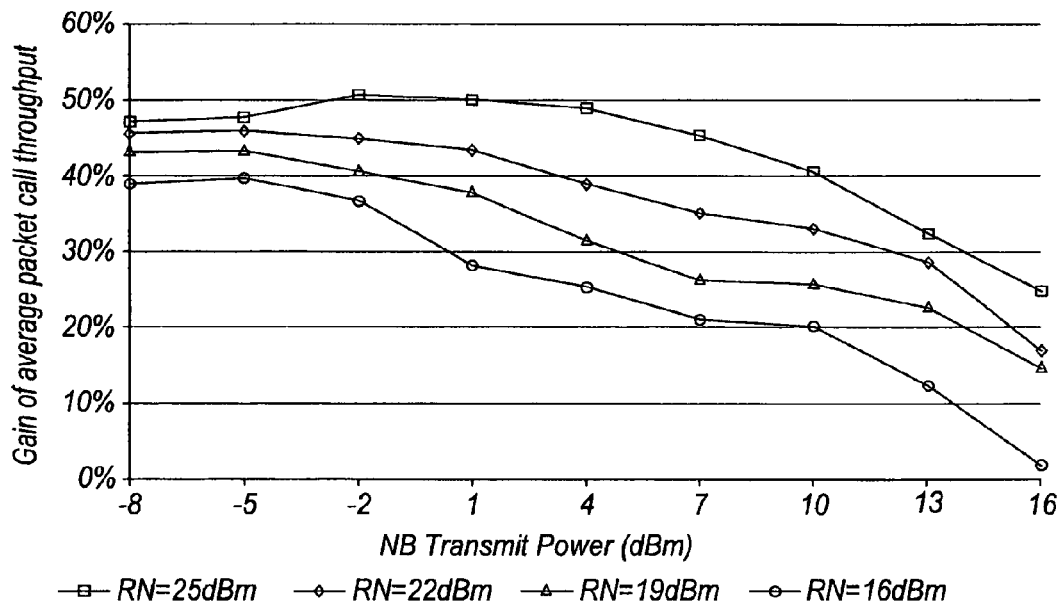
Fig. 29A  Gain in average packet call throughput for deployment scenario 1.
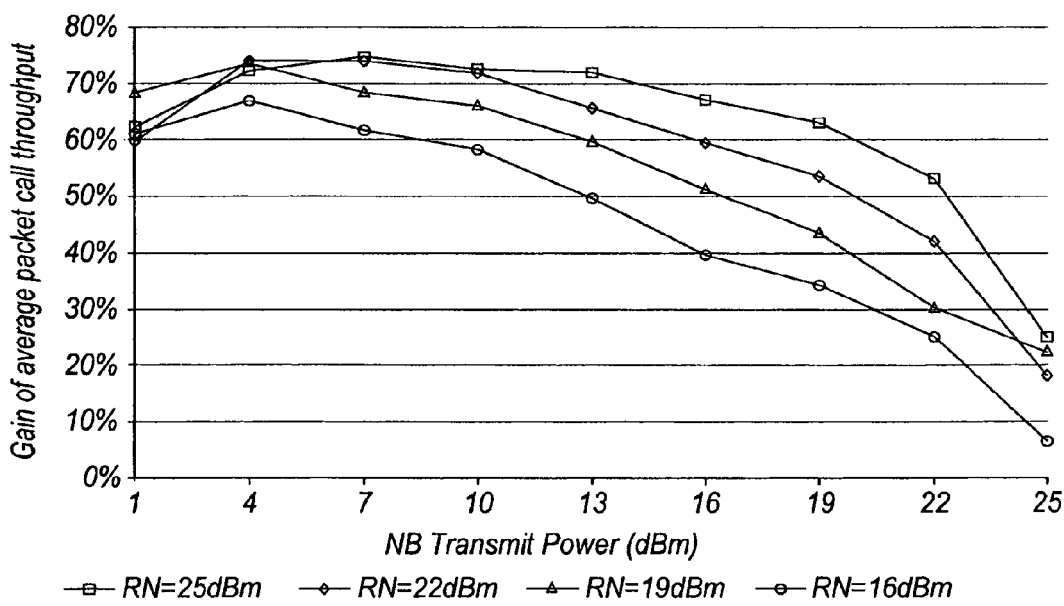
Fig. 29B  Gain in average packet call throughput for deployment scenario 2.

COMMUNICATION SYSTEM

CROSS-REFERENCE TO RELATED APPLICATIONS

This application is a divisional of U.S. patent application Ser. No. 11/453,055, filed Jun. 15, 2006, which is based upon and claims the benefit of priority from the prior European Patent Application No. 05253783.4, filed on Jun. 17, 2005, the entire contents of which are incorporated herein by reference.

FIELD

The present invention relates to a wireless communication system and related methods for transmitting a signal from a source apparatus to a destination apparatus, via at least one intermediate apparatus. In particular, the present invention relates to techniques which seek to improve the throughput of data in multi-hop communication systems.

BACKGROUND

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \quad (A)$$

Where d (meters) is the transmitter-receiver separation, b(db) and n are the pathloss parameters and the absolute pathloss is given by $l = 10^{(L/10)}$.

FIG. 1A illustrates a single-cell two-hop wireless communication system comprising a base station (known in the context of 3G communication systems as "node-B" (NB)) a relay node (RN) and a user equipment (UE). In the case where signals are being transmitted on the downlink (DL) from a base station to a destination user equipment (UE) via the relay node (RN), the base station comprises the source apparatus (S) and the user equipment comprises the destination apparatus (D). In the case where communication signals are being transmitted on the uplink (UL) from user equipment (UE), via the relay node, to the base station, the user equipment comprises the source apparatus and the base station comprises the destination apparatus. The relay node is an example of an intermediate apparatus (I) and comprises: a receiver, operable to receive a signal from the source apparatus; and a transmitter, operable to transmit this signal, or a derivative thereof, to the destination apparatus.

Table I below gives some examples of the calculated pathloss of a signal being transmitted over the different links: source to destination (SD), source to intermediate (SI) and intermediate to destination (ID), in a multi-hop transmission system where b and n are assumed to remain the same over each of the links.

TABLE I

| b(dB) | n | Separation (metres) | | | Pathloss in dB | | | Absolute Pathloss | | |
|---|---|---|---|---|---|---|---|---|---|---|
| | | SD | SI | ID | SD | SI | ID | SD | SI | ID |
| 15.3 | 3.76 | 1000 | 500 | 500 | 128.1 | 116.8 | 116.8 | 6.46E12 | 4.77E11 | 4.77E11 |
| 15.3 | 3.76 | 1000 | 600 | 600 | 128.1 | 119.76 | 119.76 | 6.46E12 | 9.46E11 | 9.46E11 |
| 15.3 | 3.76 | 1000 | 700 | 700 | 128.1 | 122.28 | 122.28 | 6.46E12 | 1.69E12 | 1.69E12 |

The examples calculated above demonstrate that the sum of the absolute path losses experienced over the indirect link SI+ID may be less than the pathloss experienced over the direct link SD. In other words it is possible for:

$$L(SI) + L(ID) < L(SD) \quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) should be achieved if a signal is sent from a source apparatus to a destination apparatus via an intermediate apparatus (e.g. relay node), rather than being sent directly from the source apparatus to the destination apparatus. If implemented, multi-hop communication systems could potentially allow for a reduction in the transmit power of transmitters which facilitate wireless transmissions, which would lead to a reduction in interference levels as well as decreasing exposure to electromagnetic emissions.

Clearly, due to the non-linear relationship between pathloss and distance, the position of an intermediate apparatus relative to the source and destination, will critically affect the potential gain that a multi-hop transmission may have as compared to a direct, or single-hop, transmission between the source and destination. This is illustrated in FIG. 2A which shows a graphical representation of the theoretical gain which may be achieved by multi-hop transmissions, and plots the total power loss (dB) against the relative normalised position of the intermediate apparatus between the source apparatus and the destination apparatus.

Considering firstly the case where the intermediate node is positioned on the line of the direct link between the source and destination (in which case the path extension factor (s)=1), it can be seen that the potential gain is reduced as the relay node is moved away from a mid-way position towards the source or destination apparatus. Likewise, as the position of the intermediate apparatus is moved away from the line of the direct link, thereby extending the total path length of the sum of the two transmission segments (and increasing the path extension factor to s=1.1, s=1.2 etc), it can be seen that the graphical region of theoretical gain is again reduced.

However, simulations carried out to test the applicability of multi-hop communication systems have revealed unexpectedly low gains in throughput of data. Indeed, the gains experienced are well below the potential gain suggested by a simple analysis based on the pathloss equation A. Consequently, and despite the potential advantages that multi-hop systems may demonstrate in terms of signal range extension, a possible reduction in the overall transmit power required to transmit a signal between a source and destination, and the connectivity of otherwise inaccessible nodes, wireless systems operators have been deterred from implementing multi-hop networks.

One of the reasons that such a discrepancy exists between the predicted gain and the simulated gain is that previous predictions have been based on the assumption that the pathloss parameters b and n are the same on all links. In actual fact, these values vary as a result of the antenna height of the source apparatus and destination apparatus as compared to the height of the relay node. Thus, a more realistic table of values is given below in table II. The values labelled 3GPP are obtained from adapting the model employed by the 3GPP to incorporate the fact that the antenna height of the intermediate apparatus is typically somewhere between the height of the antenna at the source and destination apparatus. The values labelled UoB are derived from modelling conducted by the University of Bristol based on a typical deployment in the city of Bristol.

TABLE II

| Pathloss Parameter | | Link | | |
| --- | --- | --- | --- | --- |
| | | S-D | S-I | I-D |
| 3GPP | b (dB) | 15.3 | 15.5 | 28 |
| | n | 3.76 | 3.68 | 4 |
| UoB | b (dB) | 13.07 | 16.29 | 10.04 |
| | n | 4.88 | 4.64 | 5.47 |

The graphical illustration of total pathloss verses normalised relay node position using the pathloss parameters tabulated in table II is shown in FIG. 2B. It can be seen that the perfect "bell-shape" of FIG. 2A is not achieved when a more realistic set of pathloss parameters are used to calculate the variation in total pathloss as the position of a theoretical relay node is adjusted. Indeed, the region of gain is reduced and it is apparent that relatively small changes in the position of a relay node or a user equipment, leading to a change in the absolute pathloss over the communication link, will have a significant effect on the quality of a communication signal at the receiving apparatus. Thus, the positioning of an intermediate apparatus or relay node is critical if a gain is to be achieved by the occurrence of a multi-hop transmission, as compared to a direct transmission between the source and destination.

However, even when predictions are based on a more accurate reflection of the pathloss parameters likely to be encountered in the real world, simulations of multi-hop systems have revealed unexpectedly poor correspondence between the predicted and simulated gain.

SUMMARY

Embodiments of the present invention seek to provide a communication system comprising a source apparatus, a destination apparatus and at least one intermediate apparatus, wherein the source apparatus and the or each intermediate apparatus each comprise a transmitter, operable to transmit a communication signal or a signal derived therefrom, in a communication direction towards said destination apparatus, and wherein the destination apparatus and the, or each, intermediate apparatus each comprise a receiver, operable to receive said communication signal, or a signal derived therefrom, wherein said communication system comprises a determining means, operable to determine a measure of, or a change in a measure of, the resource allocated to one or more of said transmitters that will tend to substantially attain or maintain a balance between:
i) a measure of the quality of the communication signal received at the destination apparatus; and
ii) measure of the quality of the communication signal received at the, or each, intermediate apparatus.

It will, of course, be appreciated that the communication signal actually received by the destination apparatus may be the communication signal transmitted by the source apparatus, or it may be a communication signal derived therefrom.

Embodiments of the present invention also seek to provide a method of transmitting a communication signal from a source apparatus to a destination apparatus, via one or more intermediate apparatus, wherein the source apparatus and the or each intermediate apparatus each comprise a transmitter, operable to transmit a communication signal in a communication direction towards said destination apparatus, and wherein the destination apparatus and the, or each, intermediate apparatus each comprise a receiver, operable to receive said communication signal, or a signal derived therefrom, the method comprising the determination of a measure of, or a change in the measure of, the resource allocated to one or more of said transmitters that will tend to substantially attain or maintain a balance between i) a measure of the quality of the communication signal received at the destination apparatus and a ii) measure of the quality of the communication signal received at the, or each, intermediate apparatus.

Thus, preferred embodiments of the present invention seek to maintain or achieve a "balance" in a measure of the quality of a communication signal being received at each of the receivers in a multi-hop system in order that the throughput of data across each of the links is equal or near equal. Preferably, the determining means is operable to determine a change in the resource allocated to the apparatuses which are operable to transmit a communication signal present communication system embodying the present invention, in order to reduce or prevent substantial imbalance (i.e. achieve or maintain a substantial "balance") between a measure of the quality of a communication signal received at the intermediate apparatus and a measure of the quality of a communication signal received at the destination apparatus.

Preferably, the destination apparatus and/or the or each intermediate apparatus each comprise indicator derivation means operable to derive one or more indicators of the quality of a communication signal respectively received at the destination apparatus or at the intermediate apparatus, as the case may be, the system further comprising:
i) an indicator deviation detection means operable to detect a deviation in an indicator derived by the destination apparatus and/or in an indicator derived by the, or each, intermediate apparatus from a desired value;
iii) determining means operable, following the detection of such a deviation, to determine a measure of, or a change in a measure of, a resource allocated to one or more of the transmitters that will tend to bring the said indicator to said desired value.

Alternatively, or additionally, the determining means is operable, following the detection of a change in one said indicator derived by the destination apparatus, to i) determine a measure of, or a change in a measure of, a resource allocated to the transmitters of the intermediate apparatus from which said destination apparatus is operable to receive the communication signal, or ii) determine a measure of, or a change in a measure of, a resource allocated to the transmitters of the, or each, intermediate apparatus and the source apparatus that will tend to bring said indicator to said desired value.

The existence of an imbalance arising in a communication system embodying the present invention may be apparent from a direct comparison of a measure of a quality of a communication signal received at the destination apparatus and a measure of the quality of a communication signal received at the, or one of the, intermediate apparatuses. Alternatively, an imbalance may be apparent when a comparison is made via a mapping function. Hence the situation may exist where measures of equal value do not equate to a balanced system, and likewise where measures of differing value may equate to a balanced system.

It is envisaged that embodiments of the present invention may be used, prior to deployment of a multi-hop system, to optimise the system and/or to substantially balance a measure of the quality of a communication signal received at the, or each intermediate apparatus and a measure of the quality of a communication signal received at the destination apparatus. It is also envisaged that embodiments of the present invention may be implemented within an existing multi-hop system in order to seek to achieve and maintain "balance" in a measure of the quality of a communication signal across all links. Thus, the present invention may be employed within a multi-hop communication system to establish a substantial "balance" between an indicator of the RSS (Received Signal Strength), QoS (Quality of Service) or the SINR (Signal-to-Interference Plus Noise Ratio) at the destination apparatus and an indicator of the RSS, or QoS or the SINR, at the, or each, intermediate apparatus. The resource allocated to the transmitters will advantageously be optimised initially with respect to a target received signal quality for one of the apparatuses operable to receive a communication signal in a multi-hop system. This will usually be the destination apparatus. Thus, an indicator of a measure of the variation of the quality of a communication signal received at the destination from a target received signal quality (="variation from target" indicator), will advantageously be minimal when a system has been optimised according to embodiments of the present invention. Thereafter, if a change is detected in the variation from target indicator, which may be in a positive or negative sense, e.g. if the quality of the communication signal has deteriorated or improved, or if the target set for the apparatus has changed, the variation from target indicator will increase. In this case, embodiments of the present invention which enable a deviation of the variation from target indicator from a desired value to be detected, will advantageously seek to bring the variation from target indicator to the desired value.

Simulations of multi-hop communication systems embodying the present invention have been found to demonstrate a significant gain over systems in which a signal is transmitted directly to a destination apparatus. Indeed, the results of system level simulations carried out to test a preferred embodiment of the present invention indicate that a communication system which is "balanced" within the context of the present invention, can be expected to fulfil the advantages associated with multi-hop transmissions and to provide an improvement in the throughput of data.

It is believed that one explanation for the improved throughput demonstrated by preferred embodiments of the present invention is that they permit a reduction in the absolute transmit power required in a multi-hop system. This is considered in more detail below.

Starting from the principle already demonstrated above, that by splitting a single direct transmission link into two shorter transmission links, a reduction in the total pathloss experienced by a signal is achieved. Then, the total transmit power required to transmit a communication signal from a source apparatus to a destination apparatus via at least one intermediate apparatus, will be less than is required to transmit the communication signal directly between the source apparatus and the destination apparatus. Thus, less transmit power is needed in order to ensure that the destination apparatus (and possibly also the intermediate apparatus) receives a minimum or "target" signal quality. If no adjustment is made to the transmit power, then significant excess transmit power (i.e. transmit power exceeding that required to achieve a good, or target, signal quality at the destination apparatus and/or the intermediate apparatus) will result. Rather than serving to further increase the gain achieved by a multi-hop communication as compared to a direct communication between a source apparatus and a destination apparatus, this excess transmit power will merely increase interference levels leading to a deterioration in the quality of the communication link. This deterioration will tend to counteract the potential gain of a multi-hop system which accounts for the poor simulation results of previously considered multi-hop communication systems.

Furthermore, the overall throughput across a two-hop network (for example) is limited by the lower of: the number of data packets received at the intermediate apparatus and the number of data packets received at the destination apparatus. The number of data packets received at a receiver is dependent upon the quality of the communication link that terminates at that receiver. This may be reflected, for example, by a measure of the quality of service (QoS), (e.g. the throughput), a measure of the received signal strength (RSS) or a measure of the signal-to-interference plus noise ratio (SINR) at a receiver of a particular communication link. Thus, in effect, the receiver which receives the lowest quality communication signal within a multi-hop system forms a "bottle neck" for data packet transmission, thereby wasting capacity for data transfer on other links within the multi-hop system. An increase in the resource allocated at a transmitter, which does not serve to improve the lowest quality communication signal, will result in additional resource allocation. Consequently, a further degradation is experienced in the performance of the system. This is illustrated in FIGS. 21A and 21B which plot the variation of the gain in average packet throughput observed by users of a two-hop system compared to that observed for a single hop system, against the transmit power of the source apparatus (NB). Each graph includes four different plots, each representing a different transmit power of the intermediate apparatus. It can be seen that as the transmit power of the base station is increased beyond an optimal point, then a significant degradation in gain will be experienced despite the emission of more signal energy.

It can therefore be appreciated that the improvements made by preferred embodiments of the present invention can be attributed to the way in which the various aspects of the present invention seek to ensure that any imbalance between a measure of the quality of a communication signal received at the destination apparatus and a measure of the quality of a communication signal received at the, or each, intermediate apparatus is substantially reduced or prevented. Thus, excess resource allocation which cannot improve the throughput of data packets and which will only serve to raise interference levels, is minimised.

There are a number of different events which, if they arise, can potentially lead to an "imbalance" (i.e. a difference between a measure of the quality of a communication signal received at the destination apparatus and a measure of the quality of a communication signal received at the or each intermediate apparatus) in an otherwise optimised multi-hop system:
  i) The pathloss arising over one of the links changes. This may be due to the position of one or both of the transmitter and receiver for that link changing, or due to a change in the environmental conditions or interference levels arising between the transmitter and the receiver.
  ii) It is usual for an apparatus which is operable to receive a communication signal, to have a target RSS, target QoS or target SINR. This is usually set by the network provider and may vary depending on the characteristics of the communication system or receiving apparatus, or depending on the type of data to be transmitted. The target RSS/SINR/QoS of a mobile phone or other user equipment may vary and any change in target can be accommodated for by adjusting the transmission resource allocated to the transmitting apparatus in such a way as to tend to minimise a measure of the variation of the quality of a communication signal received at the destination apparatus from a target received signal quality (i.e. "variation from target"). In the case of a multi-hop system, merely adjusting the transmission resource of one apparatus in order to accommodate a change in target of one of the receiving apparatuses, will lead to an imbalance within the system.

Embodiments of the present invention can be considers as relating to those which seek to bring a quality indicator derived by an apparatus operable to receive a communication signal to a desired value (which may be, for example, a target set by the receiving apparatus) by i) responding to a deviation in the indicator which arises due to a change in pathloss between the intermediate apparatus and the destination apparatus; or ii) responding to a potential imbalance which could result following a change in the target quality set by the apparatus.

There are a number of different types of resource which may be adjusted in order to attain or maintain balance within a multihop communication system. These include the transmit power allocated at the transmitter of the system, the transmission bandwidth, the number of antennas, the coding rate or the modulation scheme. The bandwidth is defined as the number of physical transmit bits allocated to a link within a scheduling time interval. In the case of a communication system which comprises means for adjusting the amount of bandwidth in order to attain or maintain "balance" within the communication system, the actual resource allocated depends on the channel access method employed by the communication system. For example in a time division multiple access (TDMA) system, the bandwidth would be adjusted by changing the number of time slots, or a length of time, for which the transmitter is allowed to transmit in order to communicate with the receiver. The longer the time or the greater the number of slots used, the greater the bandwidth is that is allocated to that particular communication link. Similarly, in the case of (an orthogonal) frequency division multiple access (OFDMA/FDMA) system the bandwidth allocation is determined by the allocation of a frequency bandwidth carrier or the number of carriers. Further, the amount of frequency associated with each carrier could be changed. Finally in the case of a CDMA system, the bandwidth can be adjusted by changing the number of available codes, or the spreading factor used for any particular code, that may be used to communicate between the source and destination. Any method of resource allocation effectively controls the rate at which data can be transferred from the source to the destination, in a similar manner to the case of transmit power.

Various aspects of the present invention will now be described which utilise the allocation of transmit power to attain a substantial balance between the quality indicators derived by apparatuses operable to receive a communication signal in a multi-hop communication system. Furthermore, embodiments of the present invention seek to provide a way of optimising a multi-hop system whereby any target quality set by receivers is substantially attained and the throughput of data across each link is substantially equal.

The determining means may form part of a control means, where the control means is the part of the system which will eventually be responsible for issuing a command to an apparatus, commanding the allocation of a particular resource to that apparatus. However, the control means may not be required if conditions relating, for example, to the maximum resource allocation of a particular apparatus, are not met. Alternatively, the determining means may be provided as a separate entity within the same apparatus as the control means, or within a different apparatus. Preferably, a control means is provided in a base station (known in the context of 3G communication system as a "Node-B"). This arrangement benefits from facilitating centralised control of the setting of the transmit power to be maintained, with minimal processing required in the relay station. This is beneficial to the operator of the wireless system as it keeps control located within a central entity making management of the network much simpler. Further, should the relay start to malfunction, then due to the fact that control is located in the base station (or Node-B) then corrective measures are possible by the operator. Moreover, the fact that processing in the intermediate apparatus is kept to a minimum is advantageous in terms of reducing power consumption and thus maximising battery life, should the intermediate apparatus be a mobile or remote device.

Embodiments of a first aspect of the present invention seek to provide a way of responding to an imbalance, or a potential imbalance, which may arise as a result of the events discussed above which lead to a deviation in the quality indicator derived by the destination apparatus from a desired value in order to improve the throughput of data being transmitted on the downlink (DL) from a base-station (source) to a destination user equipment via one or more intermediate apparatuses. In a standard communications system the downlink is the link between the NB and the UE. In the multi-hop case the DL refers to the link in which communication is directed towards the UE (e.g. RN to UE, RN to RN in the direction of UE and NB to RN).

Thus, embodiment of the first aspect maybe employed in the case of downlink transmissions wherein the source apparatus is part of a base station, the base station being operable to transmit a communication signal, via the or each intermediate apparatus, to the destination apparatus.

According to a first embodiment of the first aspect of the present invention there is provided a communication system comprising a base station, a destination apparatus and at least one intermediate apparatus, the base station being operable to transmit a communication signal, via the or each intermediate apparatus, to the destination apparatus, wherein the destination apparatus comprises indicator derivation means operable to derive one or more indicators of the quality of a communication signal received at the destination apparatus, the system comprising:
  i) indicator deviation detection means, operable to detect a deviation in the, or one of the, indicators derived by the destination apparatus from a desired value;
  ii) control means, provided in the base station, comprising a first calculation means operable, following detection of such a deviation, to calculate a new transmit power for the intermediate apparatus, or a new transmit power for the intermediate apparatus and the base station, that will tend to a) substantially reduce an imbalance between a measure of a quality of a communication signal received at the intermediate apparatus and a measure of the quality of a communication signal received at the destination apparatus; or b) substantially prevent said imbalance from arising.

Advantageously, the first embodiment of the first aspect of the present invention provides a way of restoring any deviation in an indicator derived by the destination apparatus to a desired value by i) responding to an imbalance which arises due to a change in pathloss between the intermediate apparatus and the destination apparatus by calculating a new transmit power for the intermediate apparatus; or ii) responding to a potential imbalance which could result following a change in the target of the destination apparatus by calculating a new transmit power for both the intermediate apparatus and the source apparatus.

Preferably, the imbalance which embodiments of the first aspect of the present invention seeks to reduce or prevent comprises a difference between a measure of the signal-to-interference plus noise ratio of a communication signal received at the destination apparatus and a measure of the signal-to interference plus noise ratio of a communication signal received at the, or one of the, intermediate apparatuses.

According to a second embodiment of the first aspect of the present invention there is provided a communication system comprising a base station, a destination apparatus and at least one intermediate apparatus, the base station being operable to transmit a communication signal, via the or each intermediate apparatus, to the destination apparatus, said base station comprising a control means, wherein each of the destination apparatus and the intermediate apparatus comprise: indicator derivation means operable to derive one or more indicators of the quality of a communication signal received at the destination apparatus or the intermediate apparatus respectively, wherein said intermediate apparatus and said destination apparatus are operable to transmit said indicators to said control means, the control means comprising:
  i) imbalance detection means operable to detect an imbalance between one said indicator derived by destination apparatus and one said indicator derived by the intermediate apparatus; and
  ii) calculation means operable, following detection of such an imbalance, to calculate a new transmit power for the base station which will tend to substantially reduce said imbalance.

Advantageously, this embodiment provides a way of adjusting the transmit power of the base station in order to tend to achieve or maintain balance between the quality of a communication signal received at the destination apparatus and the quality of a communication signal received at the intermediate apparatus. In particular, examples of the second embodiment of the first aspect of the present invention advantageously provide a means for responding to an imbalance which arises due to a change in pathloss between the base station and the intermediate apparatus.

Embodiments of a second aspect of the present invention seek to provide a way of responding to an imbalance, or a potential imbalance, which arises as a result of each of these possible events in order to improve the throughput of data being transmitted on the uplink (UL) from a source apparatus to a base station via one or more intermediate apparatuses. In a standard communications system the uplink is the link between the UE and the NB. In the multi-hop case the UL refers to the link in which communication is directed towards the NB (e.g. UE to RN, RN to RN in the direction of NB and RN to NB). Furthermore, embodiments of the present invention seek to provide a way of optimising a multi-hop system whereby any target quality set by one or more of the receivers is substantially attained and the throughput of data across each link is substantially equal.

According to a first embodiment of the second aspect of the present invention, there is provided a communication system comprising a source apparatus, a base station and at least one intermediate apparatus, the source apparatus being operable to transmit a communication signal, via the or each intermediate apparatus, to the base station, wherein the base station comprises indicator derivation means operable to derive one or more indicators of the quality of a communication signal received at the base station, the system comprising:
  i) indicator deviation detection means, operable to detect a deviation in the, or one of the, indicators derived by the base station;
  ii) control means, provided in the base station, comprising a first calculation means operable, following detection of such a change, to calculate a new transmit power for the intermediate apparatus, or a new transmit power for the intermediate apparatus and the source apparatus, that will tend to: a) substantially reduce an imbalance between a measure of a quality of a communication signal received at the intermediate apparatus and a measure of the quality of a communication signal received at the base station; or b) substantially prevent said imbalance from arising.

This embodiment of the second aspect of the present invention advantageously provides a way of responding to a deviation from a desired value which may be due to i) a change in pathloss between the intermediate apparatus and the base station by calculating a new transmit power for the intermediate apparatus; or ii) responding to a potential imbalance which could result following a change in the target of the base station apparatus by calculating the transmit power for the intermediate apparatus and/or the source apparatus.

Preferably, the imbalance which embodiments of the second aspect of the present invention seeks to reduce or prevent comprises a difference between a measure of the signal-to-interference plus noise ratio of a communication signal received at the base station and a measure of signal-to interference plus noise ratio of a communication signal received at the, or one of the, intermediate apparatuses.

According to a second embodiment of the second aspect of the present invention there is provided a communication system comprising a source apparatus, a base station and at least one intermediate apparatus, the source apparatus being operable to transmit a communication signal, via the or each intermediate apparatus, to the base station, said base station comprising a control means, wherein each of the base station and the intermediate apparatus comprise: indicator derivation means operable to derive one or more indicators of the quality of a communication signal received at the base station or the intermediate apparatus respectively, wherein said control means is operable to receive one said indication from each of said intermediate apparatus and said base station, the control means comprising:
  i) imbalance detection means operable to detect an imbalance between one said indicator derived by the base station and one said indicator derived by the intermediate apparatus; and
  ii) calculation means operable, following detection of such an imbalance, to calculate a new transmit power for the source apparatus which will tend to substantially reduce said imbalance.

Examples of this embodiment of the second aspect of the present invention advantageously provide a way of adjusting the transmit power of the source apparatus in order to tend to achieve or maintain balance between the quality of a communication signal received at the base station and the quality of a communication signal received at the intermediate apparatus. In particular, examples of the second embodiment of the second aspect of the present invention advantageously provide a means for responding to an imbalance which arises due to a change in pathloss between the source apparatus and the intermediate apparatus.

In the case of the first and second aspects, the desired value may be the value of the indicator of the quality of a communication signal derived for the destination apparatus which is at, or close to, the target value set for the destination apparatus, and when the system is substantially balanced (i.e. a measure of a quality of a communication signal received at the destination apparatus is in balance with a measure of a quality of communication signal received at the, or each, intermediate apparatus). Thus, the first embodiments of the first and second aspects of the present invention may be advantageously used to maintain the QoS across the communication link that terminates at the destination apparatus, or the quality of the communication signal received by the destination apparatus at, or near, the target value set for the destination apparatus. Thereafter, it may be necessary for the second embodiments of the first and second aspects of the present invention to optimise the systems ensuring a balance is achieved between the destination apparatus and the or each intermediate apparatus.

Thus, it should be appreciated that the indication deviation detection means may be used in a system which has already been balanced, or optimised. Thus, a deviation from the desired value, which may arise due to an event which results in a change in a measure of a quality of a communication signal at the destination apparatus will be detected, and the required change the resource allocated to the previous intermediate apparatus determined. The required change in resource allocation will be calculated by the first calculation means. If the change in indicator is due to a change in target, the first calculation means will also be operable to calculate the new transmit power for the source apparatus that will tend to prevent an imbalance, due to a new target quality at the destination apparatus being satisfied, from arising. If the target has not changed, but the pathloss has changed such that the quality of the communication signal has altered, the calculation means only need calculate a new transmit power for the intermediate apparatus in order for a balance to be maintained. Changes in pathloss between the source apparatus and the intermediate apparatus, which lead to a change in the RSS/SINR at the intermediate apparatus or in the QoS across the communication link that terminates at the intermediate apparatus, must be dealt with by systems/methods which embody the second aspect of the present invention, or which employ both a indicator deviation detection means and an imbalance detection means.

Alternatively, it is envisaged that embodiments of the present invention may be used to optimise a multi-hop communication system. Thus, for example, the first embodiments of the first and second aspects will advantageously allow the target set by the destination apparatus to be attained. Thereafter, the second embodiments of the first and second aspects may be used to optimise the multi-hop system.

Preferably, the imbalance detection means of the first and second aspects comprises a pathloss updating means operable, following receipt of said indicators from said destination apparatus and said intermediate apparatus, or following a change in one or both of said indicators received by said control means, to determine a measure of the pathloss experienced by a communication signal being transmitted between the source apparatus and the intermediate apparatus, and between the intermediate apparatus and the destination apparatus. A measure of the pathloss experienced by a communication signal being transmitted between the source apparatus and the intermediate apparatus may preferably be determined from a measure of the transmit power of the source apparatus when that communication signal was transmitted. A measure of the pathloss experienced by a communication signal being transmitted between the intermediate apparatus and the destination apparatus may preferably be obtained from a measure of the transmit power of the intermediate apparatus when that communication signal was transmitted. The intermediate apparatus may be operable to transmit a transmit power indicator which is indicative of a measure of a current transmit power of the intermediate apparatus to the pathloss updating means for use determining the pathloss between the intermediate apparatus and the destination apparatus. Alternatively, the measure of the transmit power of the intermediate apparatus may be determined from i) a measure of the transmit power of the intermediate apparatus at an initial time and ii) knowledge of changes in the transmit power of the intermediate apparatus which have occurred since said initial time.

Preferably, following a calculation of a new transmit power for the intermediate apparatus by the first calculation means, it is determined if the new transmit power of the intermediate apparatus is greater than a maximum transmit power of the intermediate apparatus. This may be determined by the apparatus following receipt of a command or by the control means before issuing a command. Preferably, if it is determined by the control means that the new transmit power is greater than the maximum transmit power for a given apparatus, the calculation means calculates a second new transmit power which does not exceed the maximum transmit.

Furthermore, the control means may preferably be operable to receive an input signal which allows the control means to determine if the request is due to a change in a variation from target indicator derived by the destination apparatus which arises due to a change in the target quality indicator set for the destination apparatus. If it is determined that the request is due to a change in the variation from target indicator derived by the destination apparatus, the first calculation means is further operable to calculate a new transmit power for the source apparatus, based on the new transmit power calculated for the intermediate apparatus, to thereby tend substantially prevent an imbalance between a measure of the quality of a communication signal received at the intermediate apparatus and a measure of the quality of a communication signal received at the destination apparatus from arising. Following a calculation of a new transmit power for the source apparatus, the control means is preferably operable to determine if said new transmit power for the base station is greater than a maximum transmit power for the source apparatus. If it is determined by the control means that the new transmit power is greater than the maximum transmit power of the source apparatus, the first calculation means calculates a second new transmit power for the source apparatus which does not exceed said maximum. The first calculation means is advantageously operable, following the calculation of a second new transmit power for the source apparatus, to calculate a second new transmit power for the intermediate apparatus which will tend to prevent an imbalance between a measure of the quality of a communication signal received at the destination apparatus and a measure of the quality of a communication signal received at the intermediate apparatus from arising.

It should be appreciated that embodiments of the first and second aspects of the present invention, which seek to detect a deviation in an indicator derived by the destination apparatus from a desired value, may or may not seek to balance, or prevent an imbalance, between that indicator and an indicator of the same type derived by the intermediate apparatus. Furthermore, in the case where a deviation in an indicator of the variation from target set by the destination apparatus is detected as a result of the target changing (whilst the SINR, for example, at the destination remains constant), no imbalance will exist between the indicators of derived by the destination apparatus and the intermediate apparatus (assuming the system was in balance prior to the change in target at the destination apparatus), and the control means will be operable to calculate the adjustment required in the transmit power of both the intermediate apparatus and the source apparatus which will tend to prevent an imbalance in SINR from arising.

Different embodiments of the present invention may tend to reduce or prevent an imbalance which arises or may arise, as the case may be, under different circumstances. The most likely event to occur in a structured multi-hop system (i.e. one in which the or each intermediate apparatus is fixed) is that the pathloss between the intermediate apparatus and the destination apparatus changes (which may be due to a change in the position of the destination apparatus or a change in environmental conditions) or that the target of the destination apparatus changes. Both of these events are advantageously dealt with by embodiments of the present invention which are triggered by detection of a change in the indicator derived by the destination apparatus. Preferably, these embodiments will comprise an indicator deviation detection means which monitors the, or one of the, indicators of the destination apparatus at all times. Thus, any change or deviation in the indicator derived by the destination apparatus from a desired value, can be detected quickly. Following the process of optimising a multi-hop system and particularly where the system is a structured multi-hop system, these embodiments alone may be sufficient to maintain a balance across the multi-hop system. However, if the pathloss between the source apparatus and the intermediate apparatus changes (which may be due to a change in the position of the intermediate apparatus in an ad-hoc network, or due to a change in the environmental conditions arising across that link), this must be dealt with by either by embodiments which detect an imbalance between quality indicators of the receiving apparatuses in a multi-hop network. Thus, it is preferable to provide a communication system which allows any of these situations, should they arise, to be dealt with. Thus, according to a preferred embodiment, in addition to an indicator deviation detection means and a determining means, the intermediate apparatus comprises indicator derivation means operable to derive one or more indicators of the quality of a communication signal received at the intermediate apparatus, wherein said intermediate apparatus and said destination apparatus are each operable to transmit one said indicator derived thereby to said control means, the control means further comprising:

i) imbalance detection means operable to detect an imbalance between one said indicator derived by the destination apparatus and one said indicator derived by the intermediate apparatus; and ii) second calculation means operable, following detection of such an imbalance, to calculate a new transmit power for the source apparatus which will tend to substantially reduce said imbalance.

The situation may arise where a change in the target of the destination apparatus is accommodated by a substantially simultaneous change in the pathloss between the intermediate apparatus and the destination apparatus. Thus, in the case where an indicator deviation detection means is provided in the destination apparatus such that the destination apparatus is operable to transmit a request to the control means for a change in the transmit power of the intermediate apparatus, no request for a change in transmit power of the intermediate apparatus will be generated by the destination apparatus if this situation does arise. This will lead to an imbalance in the system which will require detection by an imbalance detection means, since the new target of the destination apparatus will have been met (inadvertently) but no corresponding change will have been made to the transmit power of the source apparatus. This, relatively rare, situation can therefore be handled by a communication system which provides both an indicator deviation detection means and an imbalance detection means (operating periodically). The second calculation means is then operable to calculate the change in the transmit power of the base station that is required to in order to tend to balance a measure of the quality of a communication signal received at the intermediate apparatus and a measure of the quality of a communication signal received at the destination apparatus.

According to a further embodiment of the first aspect of the present invention there is provided a method of controlling the transmit power of one or more apparatus operable to transmit a communication signal in a multi-hop communication system, the communication system comprising a base station, a destination apparatus and at least one intermediate apparatus, the base station being operable to transmit a communication signal, via the or each intermediate apparatus, to the destination apparatus, the method comprising the steps of:

i) deriving, at the destination apparatus, one or more indicators of a quality of a communication signal received at the destination apparatus;

ii) detecting a deviation in the, or one of the, indicators derived by the destination apparatus from a desired value;

iii) calculating, following the detection of such a change, a new transmit power for the intermediate apparatus, or a new transmit power for the intermediate apparatus and the base station, which will tend to: a) substantially reduce an imbalance between a measure of a quality of a communication signal received at the intermediate apparatus and a measure of the quality of a communication signal received at the destination apparatus; or b) substantially prevent said imbalance from arising.

According to a further embodiment of the first aspect of the present invention there is provided a method of controlling the transmit power of one or more apparatus which is operable to transmit a communication signal in a multi-hop communication system, the communication system comprising a base station, a destination apparatus and at least one intermediate apparatus, the base station being operable to transmit a communication signal, via the or each intermediate apparatus, to the destination apparatus, the method comprising the steps of:

i) deriving, at each of the destination apparatus and the intermediate apparatus, an indicator of the quality of communication signal received at the destination apparatus, or at the intermediate apparatus, respectively;

ii) detecting an imbalance between one said indicator derived by the destination apparatus and one said indicator derived by the intermediate apparatus; and iii) calculating, following the detection of such an imbalance, a new transmit power for the base station, which will tend to substantially reduce said imbalance.

According to a further embodiment of the first aspect of the present invention there is provided a base station operable to transmit a communication signal to a destination apparatus, via at least one intermediate apparatus, the base station comprising:

i) receiving means, operable to receive an indicator from a destination apparatus and indicator deviation detection means, operable to detect a deviation in one said indicator from a desired value, the indicator being indicative of the quality of a communication signal received at the destination apparatus; or ii) receiving means, operable to receive a request for a new transmit power for the intermediate apparatus from the destination means; and iii) control means having a first calculation means operable, following detection of a change in one said indicator received from said destination apparatus, or following receipt of a request from said destination apparatus, as the case may be, to calculate a new transmit power for the intermediate apparatus, or a new transmit power for the intermediate apparatus and the base station, which will tend to: a) substantially reduce an imbalance between a measure of the quality of a communication signal received at the intermediate apparatus and a measure of a quality of a communication signal received at the destination apparatus; or b) substantially prevent said imbalance from arising.

Preferably, the receiving means of the base station is further operable to receive an indicator from the destination apparatus, the indicator being indicative of a quality of a communication signal received at the destination apparatus, the base station further comprising:

i) imbalance detection means operable to detect an imbalance between one said indicator received from the destination apparatus and one said indicator received from said intermediate apparatus; the control means further comprising second calculation means operable, following detection of such an imbalance, to calculate a new transmit power for the base station which will tend to substantially reduce said imbalance.

According to a further embodiment of the first aspect of the present invention there is provided a base station operable to transmit a communication signal to a destination apparatus, via at least one intermediate apparatus, the base station being provided with a control means comprising:

i) receiving means, operable to receive one or more indicators from each of the destination apparatus and the intermediate apparatus, the, or each, indicator being indicative of a quality of a communication signal received at the destination apparatus or the intermediate apparatus respectively;

ii) imbalance detection means operable to detect an imbalance between one said indicator received from the destination apparatus and one said indicator received from the intermediate apparatus; and iii) calculation means operable, following detection of such an imbalance, to calculate a new transmit power for the base station which will tend to substantially reduce said imbalance.

According to a further embodiment of the second aspect of the present invention there is provided a method of controlling the transmit power of one or more apparatus operable to transmit a communication signal in a multi-hop communication system, the communication system comprising a source apparatus, a base station and at least one intermediate apparatus, the source apparatus being operable to transmit a communication signal, via the or each intermediate apparatus, to the base station, the method comprising the steps of:

i) deriving one or more indicators of a quality of a communication signal received at the base station;

ii) detecting a deviation in the, or one of the, said indicators;

iii) calculating, following the detection of such a change, a new transmit power for the intermediate apparatus, or a new transmit power for the intermediate apparatus and the source apparatus, which will tend to: a) substantially reduce an imbalance between a measure of the quality of a communication signal received at the intermediate apparatus and a measure of the quality of a communication signal received at the base station; or b) substantially prevent said imbalance from arising.

According to another embodiment of the second aspect of the present invention there is provided a method of controlling the transmit power of one or more apparatus which is operable to transmit a communication signal in a multi-hop communication system, the communication system comprising a source apparatus, a base station and at least one intermediate apparatus, the source apparatus being operable to transmit a communication signal, via the or each intermediate apparatus, to the base station, the method comprising the steps of:

i) deriving, at each of the base station and the intermediate apparatus, one or more indicators of the quality of communication signal received at the base station, or at the intermediate apparatus;

ii) detecting an imbalance between one said indicator derived by the base station and one said indicator derived by the intermediate apparatus; and iii) calculating, following the detection of such an imbalance, a new transmit power for the source apparatus, which will tend to substantially reduce said imbalance.

According to another embodiment of the second aspect of the present invention there is provided a base station operable to receive, via at least one intermediate apparatus, a communication signal transmitted by a source apparatus, the base station comprising:

i) indicator derivation means, operable to derive one or more indicators of the quality of a communication signal received at the base station; or ii) indicator deviation detection means, operable to detect a deviation in one said indicator derived by the indicator derivation means; and iii) control means comprising first calculation means operable, following detection of such a change, to calculate a new transmit power for the intermediate apparatus, or a new transmit power for the intermediate apparatus and the source apparatus, which will tend to: a) substantially reduce an imbalance between a measure a quality of a communication signal received at the intermediate apparatus and a measure of the quality of a communication signal received at the base station; or b) substantially prevent said imbalance from arising.

Preferably, the base station is operable to receive an input signal which allows the control means to determine if the request is due to a deviation in the variation from target indicator derived by the base station which arises due to a change in the target received signal quality set for the destination apparatus. Furthermore, the control means further comprises command means operable to issue a command to said intermediate apparatus and/or said source apparatus, commanding a change in the transmit power of the intermediate apparatus, and/or the transmit power of the source apparatus in accordance with the new transmit power calculated by the first calculation means.

Preferably, the base station further comprises indicator receiving means, operable to receive an indicator from the intermediate apparatus, the indicator being indicative of a quality of a communication signal received at the intermediate apparatus, the base station further comprising an imbalance detection means operable to detect an imbalance between one said indicator derived by the base station and one said indicator received from the intermediate apparatus; and wherein the control means comprises second calculation means operable, following detection of such an imbalance, to calculate a new transmit power for the source apparatus which will tend to substantially reduce said imbalance. Preferably, the imbalance detection means comprises a pathloss updating means operable to determine a measure of the pathloss experienced by a communication signal being transmitted between the source apparatus and the intermediate apparatus, and between the intermediate apparatus and the base station.

According to another embodiment of a second aspect of the present invention, there is provided a base station operable to receive via, at least one intermediate apparatus, communication signal transmitted from a source apparatus, the base station comprising:
i) indicator derivation means, operable to derive one or more indicators of a quality of a communication signal received at the base station;
ii) receiving means, operable to receive one or more indicators from the intermediate apparatus, the or each indicator being indicative of a quality of a communication signal received at the intermediate apparatus;
iii) imbalance detection means operable to detect an imbalance between one said indicator derived by the base station and one said indicator received from the intermediate apparatus; and
iv) control means comprising second calculation means operable, following detection of such an imbalance, to calculate a new transmit power for the source apparatus which will tend to substantially reduce said imbalance.

Embodiments of the first and second aspect of the present invention are advantageous in that either regenerative or non-regenerative relays may be used. Furthermore, embodiments of the first and second aspects of the present invention enjoy the benefits of centralised control.

The first and second aspects above require the performance of an explicit calculation of the transmit power which is required in order that an indicator meets a desired value or in order to substantially balance the indicators derived by each of the receivers. Aspects will now be discussed which circumvent the need for an explicit calculation by facilitating an adjustment in the transmit power of the relevant apparatus which is relative to the degree of a deviation or the degree of an imbalance.

Embodiments of a third aspect of the present invention seek to provide a way of responding to an imbalance, or a potential imbalance, in order to improve the throughput of data being transmitted on the downlink (DL) from a base-station (source) to a destination user equipment via one or more intermediate apparatuses. In a standard communications system the downlink is the link between the NB and the UE. In the multi-hop case the DL refers to the link in which communication is directed towards the UE (e.g. RN to UE, RN to RN in the direction of UE and NB to RN). Furthermore, embodiments of the present invention seek to provide an array of optimising a multi-hop system whereby any target quality set by receivers is substantially attained and the throughput of data across each link is substantially equal.

According to a first embodiment of the third aspect of the present invention, there is provided communication system comprising a base station, a destination apparatus and at least one intermediate apparatus, the base station being operable to transmit a communication signal, via the or each intermediate apparatus, to the destination apparatus, the destination apparatus comprising indicator derivation means operable to derive one or more indicators of the quality of a communication signal received at the destination apparatus, the communication system further comprising:
i) a control means provided in the base station;
ii) indicator change deviation means operable to detect a deviation in one said indicator derived by the destination apparatus from a desired value;
iii) determining means operable, following the detection of such a deviation, to determine a change in the transmit power of the intermediate apparatus that will tend to bring the said indicator to said desired value, wherein the determining means further comprises request transmitting means operable to transmit a request for a change in the transmit power of the intermediate apparatus to the control means.

The first embodiments of the third aspect of the present invention advantageously provide a way of responding to a deviation in the indicators derived by the destination apparatus from a desired value which may be due to i) a change in pathloss between the intermediate apparatus and the destination apparatus; or ii) a change in the target of the destination apparatus by determining change that is required in the transmit power of the intermediate apparatus. Advantageously, the change in transmit power that is required will be relative to the degree of deviation detected by the indication deviation detection means.

Preferably the control means is operable, following receipt of a request for a change in the transmit power of the intermediate apparatus, to issue a command, to said intermediate apparatus, commanding a change the transmit power of the intermediate apparatus. The intermediate apparatus preferably comprises command receiving means operable to receive such a command from said control means of the base station. The intermediate apparatus is operable, following receipt of such a command, to change its transmit power in accordance with said command. Preferably the control means comprises input receiving means, operable to receive an input signal which is indicative of an imbalance between a measure of the quality of a communication signal received at the intermediate apparatus and a measure of the quality of a communication signal received at the destination apparatus. If the control means determines, following receipt of an input signal which indicates that such an imbalance exists, that the required change in transmit power of the intermediate apparatus would tend to increase any such imbalance, the control means is operable to ignore said request for a change in the transmit power of the intermediate apparatus.

According to a second embodiment of the third aspect of the present invention there is provided a communication system comprising a base station, a destination apparatus and an intermediate apparatus, the base station being operable to transmit a communication signal via the intermediate apparatus, to the destination apparatus, wherein each of the destination apparatus and the intermediate apparatus comprise: indicator derivation means operable to derive one or more indicators of the quality of a communication signal received at the destination apparatus or the intermediate apparatus respectively, wherein said intermediate apparatus and said destination apparatus are operable to transmit said indicators to an indicator receiving means of the base station, said communication system further comprising:
- i) imbalance detection means operable to detect an imbalance between one said indicator derived by the destination apparatus and one said indicator derived by the intermediate apparatus; and
- ii) determining means provided in said base station and operable, following detection of such an imbalance by said imbalance detection means, to determine a required change in the transmit power of the base station that will tend to reduce such an imbalance.

Embodiments of a fourth aspect of the present invention seek to provide a way of responding to an imbalance, or a potential imbalance, which arises as a result of each of these possible events in order to improve the throughput of data being transmitted on the uplink (UL) from a source apparatus to a base station via one or more intermediate apparatuses. In a standard communications system the uplink is the link between the UE and the NB. In the multi-hop case the UL refers to the link in which communication is directed towards the NB (e.g. UE to RN, RN to RN in the direction of NB and RN to NB). Furthermore, embodiments of the present invention seek to provide a way of optimising a multi-hop system whereby any target quality set by one or more of the receivers is substantially attained and the throughput of data across each link is substantially equal.

According to a first embodiment of a fourth aspect of the present invention there is provided a communication system comprising a source apparatus, an intermediate apparatus and a base station, the source apparatus being operable to transmit a communication signal, via the or each intermediate apparatus, to the base station, the base station comprising indicator derivation means operable to derive one or more indicators of the quality of a communication signal received at the base station, and wherein the communication system further comprises:
- i) control means provided in the base station;
- ii) indicator deviation detection means operable to detect a change in one said indicator derived by the base station from a desired value;
- iii) determining means operable, following the detection of such a change, to determine a required change in the transmit power of the intermediate apparatus that will tend to bring said indicator to said desired value, wherein said determining means further comprises request transmitting means operable to transmit a request for a change in the transmit power of the intermediate apparatus to the control means.

The first embodiment of the fourth aspect of the present invention advantageously provide a way of responding to a deviation in the indicators derived by the base station from a desired value which may be due to i) a change in pathloss between the intermediate apparatus and the base station; or ii) a change in the target of the base station by calculating a new transmit power for the intermediate apparatus and the source apparatus. Advantageously, the change in the transmit power that is required will be relative to the degree of deviation detected by the indicator deviation detection means.

Preferably the control means of the fourth aspect is operable, following receipt of a request for a change in the transmit power of the intermediate apparatus, to issue a command, to said intermediate apparatus, commanding a change the transmit power of the intermediate apparatus. The control means may advantageously comprises input signal receiving means, operable to receive an input signal which allows the control means to determine if an increase in transmit power of the intermediate apparatus is prohibited. Therefore, if the required change in transmit power of the intermediate apparatus comprises an increase in transmit power, and following a determination by the control means that an increase in transmit power of the intermediate apparatus is prohibited, the control means is operable to ignore said request. However, if the required change in transmit power of the intermediate apparatus comprises an increase in transmit power, and following a determination by the control means that an increase in transmit power of the intermediate apparatus is not prohibited, the control means is operable issue a command to the intermediate apparatus, commanding a change in transmit power of the intermediate apparatus. The intermediate apparatus preferably comprises command receiving means operable to receive such a command from the control means of the base station. According to a preferred embodiment said intermediate apparatus is operable to determine, based on a maximum transmit power of the intermediate apparatus, if the intermediate apparatus can carry out the change in transmit power according to the command. Then, if the intermediate apparatus determines that it cannot carry out the change in transmit power according to said command, said intermediate apparatus is operable to determine a revised change in transmit power of the intermediate apparatus which can be carried out by said intermediate apparatus. The intermediate apparatus is operable to cause the transmit power of the intermediate apparatus to change in accordance with said request, or said revised request, as the case may be.

According to a second embodiment of the fourth aspect of the present invention there is provided a communication system comprising a source apparatus, an intermediate apparatus and a base station, the source apparatus being operable to transmit a communication signal, via the or each intermediate apparatus, to the base station, the wherein each of the base station and the intermediate apparatus comprise: indicator derivation means operable to derive one or more indicators of the quality of a communication signal received at the base station or the intermediate apparatus respectively, the communication system further comprising:
- i) imbalance detection means operable to detect an imbalance between one said indicator derived by the base station and one said indicator derived intermediate apparatus; and
- ii) determining means operable, following detection of such an imbalance by said imbalance detection means, to determine a required change in the transmit power of the source apparatus that will tend to reduce such an imbalance; and
- iii) control means provided in said base station and operable, following determination of said change, to issue a command to said source apparatus commanding a change in the transmit power of the source apparatus.

The second embodiment of the fourth aspect of the present invention advantageously provides a way of adjusting the transmit power of the source apparatus in order to substantially restore a balance between a measure of a quality of a communication signal received at the base station and a measure of the quality of a communication signal received at the intermediate apparatus. The imbalance may be due to a change in pathloss between the source apparatus and the intermediate apparatus. Alternatively an imbalance may arise following operation by a communication system according to the first embodiment of the fourth aspect to respond to a change in the target quality indicator of the base station, since in restoring the variation from target indicator to its original measure (by changing the transmit power of the intermediate apparatus), the quality indictors of the intermediate apparatus and the base station apparatus will no longer be balanced.

Preferably the source apparatus is operable, following receipt of a command, and wherein said command is for an increase in transmit power, to determine if it can carry out the command based on the maximum transmit power of the source apparatus. If said source apparatus determines that it cannot carry out the said command, the source apparatus is operable to determine a revised change in transmit power that will tend to reduce the said imbalance, and to carry out said revised change. Furthermore, the control means is preferably operable, following issuance of a command to the source apparatus and wherein said command was for an increase in transmit power, to monitor the indicator derived by the intermediate apparatus in order to determine if said transmit power of said source apparatus has been changed in accordance with said command. If it is determined that a change in transmit power of the source apparatus has not been carried out in accordance with said request, the control means is operable to prohibit any subsequent increases in transmit power of said intermediate apparatus. If an increase in transmit power of said intermediate apparatus is prohibited, and if no subsequent imbalance is detected by said imbalance detection means, said control means is then operable to allow a subsequent increase in transmit power of said intermediate apparatus. If an increase in transmit power of said intermediate apparatus is prohibited, and if a subsequent imbalance is detected by said imbalance detection means such that said control means of said base station is caused to issue a command to said source apparatus and wherein said command is for a decrease in transmit power, said control means is operable to allow a subsequent increase in transmit power of said intermediate apparatus. Furthermore, if an increase in transmit power of said intermediate apparatus is prohibited, and if a subsequent imbalance is detected by said imbalance detection means such that said control means of said base station is caused to issue a command to said source apparatus and wherein said instruction is for an increase in transmit power which can be carried out by said source apparatus, said control means is operable to allow a subsequent increase in transmit power of said intermediate apparatus.

Embodiments of the third and fourth aspects of the present invention advantageously provide a way of adjusting the transmit power of the source apparatus in order to substantially restore or attain balance between a measure of a quality of a communication signal received at the destination apparatus and a measure of the quality of a communication signal received at the intermediate apparatus.

Furthermore, embodiments of the third and fourth aspects of the present invention also advantageously benefit from centralised control of the setting of the transmit power.

Embodiments of the third and fourth aspects which comprise indicator deviation detection means may be solely operable to restore balance across a multi-hop system following a change in the pathloss between the intermediate apparatus and the destination apparatus. However, as discussed above, if the pathloss between the source apparatus and the intermediate apparatus changes (which may be due to a change in the position of the intermediate apparatus in an ad-hoc network, or due to a change in the environmental conditions arising across that link), this must be dealt with by embodiments of the third and fourth aspects which provide an imbalance detection means and which are operable to adjust the transmit power of the source apparatus. Moreover, in order to restore balance to a multi-hop communication system following a change in the target quality set by the destination apparatus, it is necessary for both the transmit power of the intermediate apparatus and the source apparatus to be adjusted. Thus, in order to deal with a change in the target quality indicator of the destination apparatus, a communication system which includes both indicator deviation detection means and an imbalance detection means is advantageous. Preferably, the imbalance detection is performed periodically. Thus according to a preferred embodiment of the third and fourth aspects which provides a communication system having an indicator deviation detection means and a determining means, it is preferable also for said intermediate apparatus to comprise indicator derivation means operable to derive an indicator of the quality of a communication signal received by the intermediate apparatus, wherein said intermediate apparatus and said destination apparatus are operable to transmit said indicators to said control means, the communication system further comprising: imbalance detection means operable to detect an imbalance between the indicators of the destination apparatus and the intermediate apparatus; and wherein said control means is further operable, following detection of such an imbalance by said imbalance detection means, to determine a required change in the transmit power of the source apparatus that will tend to reduce such an imbalance. As previously discussed, the situation may arise where a change in the target of the destination apparatus is accommodated by a substantially simultaneous change in the pathloss between the intermediate apparatus and the destination apparatus. This, relatively rare, situation can be handled by an embodiment which includes both indicator deviation detection means and an imbalance detection means.

According to an embodiment of the third aspect of the present invention there is provided a method of controlling the transmit power of one or more apparatus operable to transmit a communication system comprising a base station, a destination apparatus and at least one intermediate apparatus, the base station being operable to transmit a communication signal, via the or each intermediate apparatus, to the destination apparatus, wherein the base station comprises a control means, the method comprising the steps of:
 i) deriving, at the destination apparatus, one or more indicators of the quality of a communication signal received at the destination;
 ii) detecting a deviation in the, or one of the, indicators derived by the destination apparatus from a desired value;
 iii) determining the required change in transmit power of the intermediate apparatus that will to tend to bring said indicator to said desired value; and
 iv) signalling a request for the required change in the transmit power of the intermediate apparatus to said control means.

According to a further embodiment of the third aspect of the present invention there is provided a method of controlling the transmit power of one or more apparatus operable to transmit a communication signal in a multi-hop communication system, the communication system comprising a base station, a destination apparatus and an intermediate apparatus, the method comprising the steps of:
 i) deriving, at the destination apparatus and the intermediate apparatus, one or more indicators of a quality of a communication signal received at the destination apparatus or the intermediate apparatus respectively;
 ii) transmitting said indicators to an indicator receiving means of the base station;
 iii) detecting an imbalance between the indicators of the destination apparatus and the intermediate apparatus; and iv) determining a required change in the transmit power of the base station that will tend to reduce such an imbalance.

According to another embodiment of the third aspect of the present invention there is provided a base station operable to transmit a communication signal to a destination apparatus, via one or more intermediate apparatus, the base station comprising:
- i) receiving means, operable to receive an indicator from a destination apparatus and indicator deviation detection means operable to detect a deviation in said indicator from a desired value, the indicator being indicative of a quality of a communication signal received at the destination apparatus; or
- ii) receiving means, operable to receive a request from a destination apparatus for a change in transmit power of the intermediate apparatus, the request being indicative of a change in an indicator of the quality of a communication signal received at the destination apparatus from a desired value; and
- iii) determining means operable, following detection of a change in one said indicator received from said destination apparatus, or following receipt of a request from said destination apparatus, as the case may be, to determine the required change in the transmit power of the intermediate apparatus that will tend to bring said indicator to said desired value.

A base station provided according to an embodiment of the third aspect of the present invention may comprise: i) a control means; ii) a determining means and a control means; or iii) an indicator deviation detection means, a determining means and a control means.

Preferably a base station embodying the third aspect of the present invention further comprises
- i) indicator receiving means operable to receive one or more indicators derived by each of said destination apparatus and said intermediate apparatus, said indicators being indicative of a quality of a communication signal received at the destination apparatus or the intermediate apparatus respectively;
- ii) imbalance detection means operable to detect an imbalance between the indicators of the destination apparatus and the intermediate apparatus; and
- iii) control means provided in said base station and operable, following detection of such an imbalance by said imbalance detection means, to determine a required change in the transmit power of the base station that will tend to reduce such an imbalance.

According to a further embodiment of the third aspect of the present invention there is provided a base station operable to transmit a communication signal to a destination apparatus, via one or more intermediate apparatus, in a multi-hop communication system, the base station comprising:
- i) indicator receiving means operable to receive one or more indicators derived by each of said destination apparatus and said intermediate apparatus, said indicators being indicative of the quality of a communication signal received at the destination apparatus or the intermediate apparatus respectively;
- ii) imbalance detection means operable to detect an imbalance between the indicators of the destination apparatus and the intermediate apparatus; and
- iii) determining means provided in said base station and operable, following detection of such an imbalance by said imbalance detection means, to determine a required change in the transmit power of the base station that will tend to reduce such an imbalance.

A destination apparatus for receiving a signal from a source apparatus, via an intermediate apparatus, in a multi-hop communication system, may also be provided, the destination apparatus, comprising:
- i) indicator derivation means operable to derive one or more indicators of a quality of a communication signal received at the destination apparatus; and
- ii) indicator deviation detection means operable to detect a deviation in one said indicator from a desired value.

An intermediate apparatus may also be provided, comprising:
- i) receiving means operable to receive a communication signal from a base station;
- ii) transmitting means operable to transmit the communication signal, or a signal derived therefrom, to a destination apparatus;
- iii) request receiving means operable to receive a request for a required change in transmit power from said destination apparatus; and
- iv) transmitting means, operable to transmit said request, or a request derived therefrom, to a control means of the base station. Preferably, the intermediate apparatus comprises a regenerative relay node.

According to an embodiment of the fourth aspect of the present invention there is provided a method of controlling the transmit power of an intermediate apparatus in a multi-hop communication system, the communication system comprising a source apparatus, a base station and at least one intermediate apparatus, the source apparatus being operable to transmit a communication signal, via the or each intermediate apparatus, to the base station, the method comprising the steps of:
- i) deriving, at the base station, one or more indicators of a quality of a communication signal received at the base station;
- ii) detecting a deviation in the, or one of the, indicators derived by the base station from a desired value; and
- iii) determining a required change in the transmit power of the intermediate apparatus that will tend to bring said indicator to said desired value.

According to a further embodiment of the fourth aspect of the present invention there is provided a method of controlling the transmit power of a source apparatus in a multi-hop communication system, the multi-hop communication system comprising a source apparatus, a base station and at least one intermediate apparatus, the source apparatus being operable to transmit a communication signal, via the or each intermediate apparatus, to the base station, the method comprising the steps of:
- i) deriving, at each of the base station and the intermediate apparatus, one or more indicator(s) of a quality of a communication signal received at the base station, or at the intermediate apparatus, respectively;
- ii) detecting an imbalance between one said indicator derived by the base station and one said indicator derived by the intermediate apparatus;
- iii) determining a required change in the transmit power of the source apparatus that will tend to reduce such an imbalance; and
- iv) issuing a command to said source apparatus commanding a change in the transmit power of said source apparatus.

According to another embodiment of the fourth aspect of the present invention there is provided a base station operable to receive, via one or more intermediate apparatus a communication signal from a source apparatus, the base station comprising:

i) indicator derivation means operable to derive one or more indicators of a quality of a communication signal received at the base station;
ii) indicator deviation detection means, operable to detect a deviation in the, or one of the, indicators derived by the indicator derivation means; from a desired value;
iii) determining means operable, following detection of such a change by said indicator deviation detection means, to determine a required change in the transmit power of the intermediate apparatus that will tend to bring the said indicator towards said first determining means being operable to transmit a request for a change in the transmit power of the intermediate apparatus to said control means;
iv) control means, operable to receive such a request from said determining means.

The control means of the base station may advantageously further comprise input signal receiving means, operable to receive an input signal which allows the control means to determine if an increase in transmit power of the intermediate apparatus is prohibited.

Preferably, the base station may further comprise:
i) receiving means, operable to receive an indicator derived by said intermediate apparatus, which indicator is indicative of a quality of a communication signal received at the intermediate apparatus;
ii) imbalance detection means operable to detect an imbalance between an indicator derived by the base station and an indicator received from the intermediate apparatus;
wherein said determining means is operable, following detection of such an imbalance by said imbalance detection means, to determine a required change in the transmit power of the source apparatus that will tend to reduce such an imbalance, said control means being further operable, following determination of said required change, to issue a command to said source apparatus commanding a change in the transmit power of said source apparatus.

According to another embodiment of the fourth aspect of the present invention there is provided a base station operable to receive, via one or more intermediate apparatus, a communication signal from a source apparatus, the base station comprising:
i) indicator derivation means operable to derive one or more indicator of the quality of a communication signal received at the base station;
ii) indicator receiving means operable to receive one or more indicator from the intermediate apparatus, wherein the or each indicator is indicative of the quality of a communication signal received at the intermediate apparatus;
iii) imbalance detection means operable to detect an imbalance between an indicator derived by the base station and an indicator received from the intermediate apparatus; and
iv) determining means operable, following detection of such an imbalance by said imbalance detection means, to determine a required change in the transmit power of the source apparatus that will tend to reduce such an imbalance; and
v) said control operable, following determination of said change, to issue a command to said source apparatus commanding a change in the transmit power of said source apparatus.

Embodiments of the third and fourth aspects of the present invention are particularly suited to structured multi-hop systems which employ regenerative relays with either TDD or FDD duplexing to separate communication signals received at the intermediate apparatus from signals transmitted from the intermediate apparatus.

Aspects will now be described in which the control means is provided in an intermediate apparatus. A particular advantage of this arrangement is that due to the location of the control means in the intermediate apparatus, embodiments of the present invention may be readily applicable to so-called "ad-hoc" networks, where a base station may not exist and connections between any two apparatuses may be formed via any other apparatus capable of relaying (receiving and transmitting) signals. Thus, the position of a relay node in an ad-hoc network may not be fixed. For example, the function of a relay node may be performed by a mobile user equipment. Furthermore, the present invention may be used in conjunction with either UL or DL data transmissions.

Embodiments of the fifth aspect of the present invention seek to provide a way of responding to an imbalance, or a potential imbalance, in order to improve the throughput of data being transmitted on the downlink (DL) from a base-station (source) to a destination user equipment via one or more intermediate apparatuses or the uplink (UL) from a destination apparatus to a base station. In a standard communications system the downlink is the link between the NB and the UE. In the multi-hop case the DL refers to the link in which communication is directed towards the UE (e.g. RN to UE, RN to RN in the direction of UE and NB to RN). In a standard communications system the uplink is the link between the UE and the NB. In the multi-hop case the UL refers to the link in which communication is directed towards the NB (e.g. UE to RN, RN to RN in the direction of NB and RN to NB). Furthermore, embodiments of the present invention seek to provide a way of optimising a multi-hop system whereby any target quality set by one or more of the receivers is substantially attained and the throughput of data across each link is substantially equal.

According to a first embodiment of a fifth aspect of the present invention there is provided a communication system comprising a source apparatus, a destination apparatus and at least one intermediate apparatus, the source apparatus being operable to transmit a communication signal via the or each intermediate apparatus, to the destination apparatus, wherein the destination apparatus is operable to derive one or more indicators of the quality of a communication signal received at the destination apparatus, the communication system further comprising:
i) a control means provided in the intermediate apparatus;
ii) indicator deviation detection means operable to detect a change in one said indicator derived by the destination apparatus from a desired value;
iii) determining means operable, following the detection of such a change, to determine a change in the transmit power of the intermediate apparatus that will tend to bring said indicator derived by the destination apparatus to said desired value, wherein the determining means further comprises request transmitting means operable to transmit a request for a change in the transmit power of the intermediate apparatus to the control means.

This embodiment of the fifth aspect of the present invention advantageously provides a way of responding to a deviation in the indicators derived by the destination apparatus from a desired value which may be due to i) a change in pathloss between the intermediate apparatus and the destination apparatus; or ii) a change in the target of the destination apparatus by determining a change that is required in the transmit power of the intermediate apparatus and/or the source apparatus. Advantageously, the change in transmit power that is required will be relative to the degree of the deviation detected by the indicator deviation detection means.

Preferably, the control means is operable, following receipt of a request for a change in the transmit power of the intermediate apparatus, to check that the intermediate apparatus is able to satisfy the request based on a maximum transmit power for the intermediate apparatus. If necessary, a revised request is derived. Preferably, the control means is operable to receive an input signal which allows the control means to determine if an increase in transmit power of the intermediate apparatus is prohibited. If the request received from the determining means is for an increase in transmit power, and following a determination by the control means that an increase in transmit power for the intermediate apparatus is prohibited, the control means is operable to ignore the request from said determining means such that no change will be made to the transmit power of said intermediate apparatus.

According to a second embodiment of the fifth aspect of the present invention there is provided a communication system comprising a source apparatus, a destination apparatus and an intermediate apparatus, the source apparatus being operable to transmit a communication signal via the intermediate apparatus, to the destination apparatus, wherein each of the destination apparatus and the intermediate apparatus comprise: indicator derivation means operable to derive one or more indicators of the quality of a communication signal received at the destination apparatus or the intermediate apparatus respectively, the communication system further comprising:
  i) a control means provided in said intermediate apparatus;
  ii) imbalance detection means operable to detect an imbalance between an indicator derived by the destination apparatus and an indicator derived by the intermediate apparatus; and
  iii) determining means, operable following detection of such an imbalance by said imbalance detection means, to determine a required change in the transmit power of the source apparatus that will tend to reduce such an imbalance, wherein the control means is operable, following determination of said change, to issue a command to said source apparatus commanding a change in the transmit power of the source apparatus.

The second embodiment of the fifth aspect of the present invention advantageously provide a way of adjusting the transmit power of the source apparatus in order to substantially restore or attain a balance between a measure of a quality of a communication signal received at the destination apparatus and a measure of the quality of a communication signal received at the intermediate apparatus. The imbalance may arise due to a change in pathloss between the source and the intermediate apparatus. Alternatively an imbalance may arise following operation by a communication system according to the first embodiment of the fifth aspect of the present invention to respond to a change in the target quality indicator of the destination apparatus, since in restoring the variation from target indicator to its original measure (by changing the transmit power of the intermediate apparatus), the quality indictors of the intermediate apparatus and the destination apparatus will no longer be balanced.

Preferably, the source apparatus is operable, following receipt of a command, and wherein said command is for an increase in transmit power, to determine if it can carry out the request based on a maximum transmit power of the source apparatus. If the source apparatus determines that it cannot carry out the said command, it is operable to determine a revised change in transmit power that will tend to reduce the said imbalance, and to carry out said revised change.

The control means of the fifth aspect is preferably operable, following issuance of a command to said source apparatus and wherein said command was for an increase in transmit power, to monitor the indicator derived by the intermediate apparatus in order to determine if said transmit power of said source apparatus has been changed in accordance with said command. If it is determined that a change in transmit power of the source apparatus has not been carried out in accordance with said command, said control means is operable to prohibit any subsequent increases in transmit power of said intermediate apparatus. This advantageously ensures that when the maximum transmit power of the source apparatus has been reached, the transmit power of the intermediate apparatus is not further increased as this will compound the imbalance caused due to the fact that the source apparatus is not able to further increase its transmit power.

There are a number of events which lead to the prohibition being lifted. If an increase in transmit power of said intermediate apparatus is prohibited, and if no subsequent imbalance is detected by said imbalance detection means, said control means apparatus is operable to allow a subsequent increase in transmit power of said intermediate apparatus. If an increase in transmit power of said intermediate apparatus is prohibited, and if a subsequent imbalance is detected by said imbalance detection means such that said intermediate apparatus is caused to issue a command to said source apparatus and wherein said request is for a decrease in transmit power, said control means is operable to allow a subsequent increase in transmit power of said intermediate apparatus. If an increase in transmit power of said intermediate apparatus is prohibited, and if a subsequent imbalance is detected by said imbalance detection means such that said intermediate apparatus is caused to issue a command to said source apparatus and wherein said command is for an increase in transmit power which can be carried out by said source apparatus, said control means is operable to allow a subsequent increase in transmit power of said intermediate apparatus.

According to an embodiment of the fifth aspect of the present invention, there is provided a method of controlling the transmit power of one or more apparatus operable to transmit a communication signal in a multi-hop communication system, the communication system comprising a source apparatus, a destination apparatus and at least one intermediate apparatus, the source apparatus being operable to transmit a communication signal, via the or each intermediate apparatus, to the destination apparatus, the intermediate apparatus having a control means, wherein the method comprises the steps of:
  i) deriving, at the destination apparatus, one or more indicators of the quality of a communication signal received at the destination apparatus;
  ii) detecting deviation in the, or one of the, indicators derived by the destination apparatus from a desired value;
  iii) issuing a request to said control means for a required change in transmit power of the intermediate apparatus that will tend to bring said indicator derived by the destination apparatus to said desired value.

According to another embodiment of the fifth aspect of the present invention there is provided a method of controlling the transmit power of one or more apparatus operable to transmit a communication signal in a multi-hop communication system, the communication system comprising a source apparatus, a destination apparatus and at least one intermediate apparatus, the method comprising the steps of:

i) deriving, at the destination apparatus and the intermediate apparatus, a signal indicator of the quality of communication signal received at the destination apparatus, or at the intermediate apparatus, respectively;

ii) detecting an imbalance between an indicator derived by the destination apparatus and an said indicator derived by the intermediate apparatus;

iii) determining a required change in the transmit power of the source apparatus that will tend to reduce such an imbalance; and iv) issuing a command to said source apparatus commanding a change in the transmit power of the source apparatus.

According to another embodiment of the fifth aspect of the present invention there is provided an intermediate apparatus comprising receiving means, operable to receive a communication signal from a source apparatus, or from a previous intermediate apparatus, and transmitting means, operable to transmit said communication signal, or a signal derived therefrom, to a destination apparatus or a subsequent intermediate apparatus, the intermediate apparatus comprising:

i) control means;

ii) indicator receiving means, operable to receive an indicator from a destination apparatus or, as the case may be, from a subsequent intermediate apparatus which receives said communication signal after said intermediate apparatus and before said destination apparatus, and to detect a deviation in said indicator from a desired value, the indicator being indicative of the quality of a communication signal received at said destination apparatus or said subsequent intermediate apparatus; or iii) receiving means, operable to receive a request from a destination apparatus or, as the case may be from a subsequent intermediate apparatus, which receives said communication signal after said intermediate apparatus and before and said destination apparatus, for a change in transmit power of the intermediate apparatus; and iv) determining means operable following detection of a change in said indicator from said destination apparatus, or following receipt of a request from said destination apparatus, to determine a required change in the transmit power of the intermediate apparatus that will tend to bring said indicator derived by the destination apparatus to said desired value, said determining means being operable to transmit a request for a change in the transmit power of the intermediate apparatus to the control means.

Preferably, the control means of the fifth aspect is operable, following receipt of a request from said destination apparatus or said subsequent intermediate apparatus, as the case may be, to check that the intermediate apparatus is able to satisfy the request. Preferably the control means is operable to receive an input signal which allows the control means to determine if an increase in transmit power of the intermediate apparatus is prohibited, and wherein, if the request received from said destination apparatus is for an increase in transmit power, and following a determination by the control means that an increase in transmit power for the intermediate apparatus is prohibited, the control means is operable to ignore said request such that no change will be made to the transmit power of said intermediate apparatus.

Preferably, the intermediate apparatus of the fifth aspect is operable to derive one or more indicators of quality of a communication signal received by the intermediate apparatus. Then, the intermediate apparatus may further comprise:

i) an imbalance detection means operable to detect an imbalance between one said indicator derived by the destination apparatus or said subsequent intermediate apparatus, as the case may be, and one said indicator derived by the intermediate apparatus;

ii) determining means, operable following detection of such an imbalance by said imbalance detection means, to determine a change in the transmit power of the source apparatus that will tend to reduce such an imbalance; the control means comprising a source command means, operable following determination of said change, to issue a command to said source apparatus commanding a change in the transmit power of the source apparatus.

According to another embodiment of the fifth aspect of the present invention, there is provided an intermediate apparatus comprising receiving means, operable to receive a communication signal from a source apparatus, or from a previous intermediate apparatus, and transmitting means, operable to transmit said communication signal, or a signal derived therefrom, to a destination apparatus or a subsequent intermediate apparatus, the intermediate apparatus further comprising:

i) indicator derivation means operable to derive an indicator of the quality of a communication signal received by the intermediate apparatus;

ii) receiving means operable to receive, from the destination apparatus or, as the case may be, from a subsequent intermediate apparatus which receives said communication signal after said intermediate apparatus and before said destination apparatus, an indicator of the quality of a communication signal received by the destination apparatus or by said subsequent intermediate apparatus;

iii) imbalance detection means operable to detect an imbalance between an indicator derived by the intermediate apparatus and an indicator received from the destination apparatus or said subsequent apparatus, as the case may be;

iv) determining means, operable following detection of such an imbalance by said imbalance detection means, to determine a change in the transmit power of the source apparatus or, as the case may be, of a previous intermediate apparatus which receives said communication signal before said intermediate apparatus and after said source apparatus, that will tend to reduce such an imbalance; and v) command means, operable following determination of said change, to issue a command to said source apparatus or said previous intermediate apparatus, as the case may be, commanding a change in the transmit power of the source apparatus or said previous intermediate apparatus.

A communication system may be provided according to an embodiment of the present invention which comprises a plurality of intermediate apparatuses, each embodying the fifth aspect of the present invention. Thus the receiving means is operable to a) receive an indicator from a destination apparatus or, as the case may be, from a subsequent intermediate apparatus which receives said communication signal after said intermediate apparatus and before said destination apparatus, and to detect a deviation in said indicator from a desired value, the indicator being indicative of the quality of a communication signal received at said destination apparatus or said subsequent intermediate apparatus, or b) receive a request from a destination apparatus or, as the case may be from a subsequent intermediate apparatus, which is positioned between said intermediate apparatus and said destination apparatus; and wherein the determining means is operable following detection of such a deviation, or following receipt of a request from said destination apparatus, to determine a required change in the transmit power of the intermediate apparatus that will tend to bring said indicator derived by the destination apparatus to said desired value.

According to another embodiment of the second aspect of the present invention, there is provided a communication system comprising source apparatus, a destination apparatus and a plurality of intermediate apparatuses, the source apparatus being operable to transmit a communication signal via each of the intermediate apparatuses, to the destination apparatus, each intermediate apparatus comprising an intermediate apparatus according to an embodiment of the fifth aspect, wherein:

i) the receiving means is operable to a) receive an indicator from a destination apparatus or, as the case may be, from a subsequent intermediate apparatus which receives said communication signal after said intermediate apparatus and before said destination apparatus, and to detect a deviation in said indicator from a desired value, the indicator being indicative of the quality of a communication signal received at said destination apparatus or said subsequent intermediate apparatus, or b) receive a request from a destination apparatus or, as the case may be from a subsequent intermediate apparatus, which receives said communication signal after said intermediate apparatus and before and said destination apparatus;

ii) the determining means is operable, following detection of such a deviation, or following receipt of a request from said destination apparatus, as the case may be, to determine a required change in the transmit power of the intermediate apparatus that will tend to bring said indicator derived by the destination apparatus to said desired value.

A communication system may be provided according to an embodiment of the present invention which comprises a plurality of intermediate apparatuses, each embodying the fifth aspect of the second aspect of the present invention.

Embodiments of the third, fourth and fifth aspects of the present invention, which seek to adjust the quality indicators at the intermediate apparatus and the destination apparatus by making a relative adjustment of the transmit power of the base station and the intermediate apparatus respectively, and without explicitly calculating the transmit powers of the base station and intermediate apparatus, preferably utilise a relay node of the regenerative type where the received signal is decoded to the bit level, making a hard decision. A regenerative relay node is operable to receive a communication signal transmitted by the source apparatus and to decode the signal to bit level before transmitting a new signal to the next station in the multi-hop system (which may be the destination UE or another intermediate apparatus). The desired aim of the present invention is to set the allocation of resource at each transmitting apparatus such that the throughput across each link in the multi-hop system is equal. As the throughput is a function of the quality indicator derived for the receiver of a particular communication link, it follows that in order to balance the throughput across the multi-hop links, the received quality indicator at each node must be balanced. In the case of regenerative relays the SINR, for example, at a given apparatus is not a function of the SINR at any other node. This of course assumes equal SINR performance at all nodes. Thus, it is possible to ensure that the SINR required in order to ensure the system is substantially balanced, and that the target SINR at the destination is met, is achieved by simply adjusting the transmit power relative to the difference between the actual and required SINR. Further if the target SINR changes at one apparatus, then it is possible to adjust the transmit power at all nodes in a manner relative to the required change. Consequently, there is no need to calculate the actual transmit power and the implementation of embodiments of the present invention is advantageously computationally simple. It is envisaged that the function of an intermediate apparatus or relay node may be provided by a mobile phone, or other user equipment.

In the case of the third, fourth and fifth aspects, the "desired value" may be the value of the indicator of the quality of a communication signal derived by the destination apparatus which is at, or close to, the target value set by the destination apparatus, and when the system is substantially balanced (i.e. a measure of a quality of a communication signal received at the destination apparatus is in balance with a measure of a quality of communication signal received at the, or each, intermediate apparatus). Thus, the first embodiments of the third, fourth and fifth aspects of the present invention may be advantageously used to maintain the quality of the communication signal received by the destination apparatus at, or near, the target value set by the destination apparatus. Thereafter, it may be necessary for the second embodiments to optimise the system ensuring a balance is achieved between the destination apparatus and the or each intermediate apparatus.

Thus, it should be appreciated that the indication deviation detection means may be used in a system which has already been balanced, or optimised. Thus, a deviation from the desired value, which may arise due to an event which results in a change in a measure of a quality of a communication signal at the destination apparatus will be detected, and the required change in the resource allocated to the previous intermediate apparatus determined.

Various aspects of the present invention will now be described which utilise the allocation of bandwidth across each of the links in order to maintain or attain a substantial balance between indicators of the quality of service (QoS) across each of the links. Thus, according to these aspects, there is provided a communication system comprising a source apparatus, a destination apparatus and at least one intermediate apparatus, wherein the source apparatus and the or each intermediate apparatus each comprise a transmitter, operable to transmit a communication signal or a signal derived therefrom, in a communication direction towards said destination apparatus, and wherein the destination apparatus and the, or each, intermediate apparatus each comprise a receiver, operable to receive said communication signal, or a signal derived therefrom, wherein said communication system further comprises:

i) a QoS derivation means operable to derive an indicator of the quality of service experienced by one or more of said receivers; and ii) a determining means, operable to determine a measure of, or a change in a measure of, the bandwidth allocated to one or more of said transmitters that will tend to substantially attain or maintain a balance between a measure of the QoS experienced at the destination apparatus and a measure of the QoS experienced at the, or at least one of the, intermediate apparatus(es).

According to a sixth aspect of the present invention, the determining means is provided in parts associated with the base station. In the case of downlink transmissions, the base station will comprise the source apparatus. In the case of uplink transmissions, the base station will comprise the destination apparatus. Embodiments of the sixth aspect therefore benefit from centralised control of the bandwidth allocated across each of the links of a multi-hop communication system.

According to a seventh aspect of the present invention, the determining means is provided in parts associated with the, or at least one of the, intermediate apparatuses. Thus, embodiments of the seventh aspect therefore benefit from decentralised or "distributed" control of the bandwidth allocated to each of the links in a multi-hop system. As such, embodiments of the seventh aspect are readily applicable to ad-hoc networks, where a base station may not exist and connections between any two apparatuses may be formed via any other apparatus capable of relaying (receiving and transmitting) signals. Thus, the position of a relay node in an ad-hoc network may not be fixed and the function of a relay node may, for example, be performed by a mobile user equipment. Embodiments of the seventh aspect may be used in conjunction with either UL or DL transmissions of communication signals.

In the sixth and seventh embodiments the indicator of the quality of the communication signal (QoS) may be derived for a given communication link by a QoS derivation means which may be associated with i) the receiver of the communication link for which the QoS indicator is to be derived; ii) the transmitter of the communication link for which the QoS indicator is to be derived; or iii) an apparatus other than the transmitter or receiver of the communication link for which the QoS indicator is to be derived. In the case of i) or ii), the QoS derivation means determines a direct indicator of the quality of service across the link by means of measurements taken locally at the receiver or the transmitter respectively. In the case of iii) the QoS derivation means determines an indirect indicator of the quality of service across the link by means of measurements made at the receiver/transmitter and then reported to the QoS derivation means. It is also possible for the QoS indicator could be derived from a combination of local and reported measurements.

For example, in the case of a downlink communication signal being transmitted between a relay node (acting as an intermediate apparatus) and a destination user equipment, the QoS indicator may be derived at the user equipment or remotely at the transmitting relay node by direct measurements made at the UE/RN. Alternatively, the QoS indicators can be derived remotely by a QoS derivation means associated with a previous relay node (in the case where the communication system comprises more than two links) or with the base station, by means of measurements made at the receiver/transmitter and then reported to said QoS derivation means.

In the case where QoS indicators are derived directly (either at the relevant receiver or remotely at the relevant transmitter), throughput can be determined directly by noting the number of successfully received bits per second or per scheduling interval. Delay can be determined by monitoring the time between successive packets being successfully received. Jitter can be determined by the variation in the time between packets being received.

In the case where the QoS indicators for a particular receiver may be derived indirectly, this may be achieved by providing the remote apparatus with a means to monitor the effective throughput on the link(s) for which the QoS indicator(s) are being determined. The QoS indicators of a link may be derived in a number of ways. For example:

(a) by knowing the SINR at the receiver, modulation and coding scheme used on the link, channel conditions, the type of coding used at the transmitter, as well as the number of bits transmitted across the link, it is possible to calculate the bit error rate and thus determine the throughput achieved and arrive at the required QoS indicator. For example, assuming the QoS indicator is defined as:

$$\text{QoS}_{indicator} = f(\text{throughput}, \text{delay}, \text{jitter}) \qquad (C)$$

where throughput is defined as $$Throughput = \frac{b \cdot (1 - P_e)}{t} \qquad (D)$$

where b is the number of bits transmitted in a particular transmission interval of length t and $P_e$ is the probability of a bit being received in error (or the bit error rate (BER)), where $P_e$ is a function of the SINR and modulation and coding scheme:

$$P_e = f(\text{MCS}, \text{SINR}, \text{Channel}, \text{CodingType}) \qquad (E)$$

where MCS is the modulation and coding scheme and link level simulations are typically used to determine the mapping between $P_e$ and the variables listed in equation (E).

Therefore, it follows that if $P_e$ can be determined through knowledge of the variables in equation (E) then it is possible to calculate the throughput using equation (D) and hence determine the QoS indicator.

(b) by monitoring the rate at which packet acknowledgements are received (ACKs) at the transmitter or apparatus where the ARQ or HARQ process is managed, it is possible to know the rate at which packets are successfully received. As the number of bits associated with each packet is known, it is possible to determine the throughput by simply accumulating the number of bits successfully ACK'ed within a given time interval, t:

$$Throughput = \frac{NumberOfBitsACK'ed}{t} \qquad (F)$$

It is also possible to monitor the delay and jitter through reception of the ACKs. For example, by observing the time between entry of a packet into the transmission queue and reception of an ACK from the receiver for the packet the delay can be determined. Further, by monitoring the variation in the delay between entry into the queue and ACK reception for each packet, it is possible to determine the jitter.

If the indicator deviation is due to a change in the pathloss such that the quality of the communication signal received by the destination deviates from target, the first embodiments of any of the above aspects will advantageously restore balance to the system by adjusting the transmit power of the preceding intermediate apparatus. However, if the indicator deviation is due to a change in the target quality set by the destination apparatus, whilst the first embodiments may be advantageously employed to adjust the transmit power at the intermediate apparatus in order that the new target can be attained, the corresponding second embodiments of any of the above aspects are needed in order to restore a balance by determining the corresponding change in transmit power for the other transmitters in the multi-hop system.

In any of the above aspects, the intermediate apparatus preferably comprises a receiver operable to receive the signal transmitted by the source apparatus; and a transmitter operable to transmit the received signal, or a signal derived therefrom, to the destination apparatus. Duplexing of signals to separate communication signals received by the intermediate apparatus from communication signals transmitted by the intermediate apparatus may be Frequency Division Duplex (FDD) or Time Division Duplex (TDD). One or more of the intermediate apparatuses may preferably comprise a so-called relay node (RN) or relay-station (RS). A relay node has the capability of receiving a signal for which it is not the intended final destination and then transmitting the signal on to another node such that it progress towards the intended destination. A relay node may be of the regenerative type, where the received signal is decoded to the bit level, making a hard decision. If the received packet is found to be in error then retransmission is requested, hence the RN incorporates ARQ or H-ARQ. ARQ or H-ARQ is a receiver technique for managing retransmission request and subsequent reception of retransmitted signals. Once the packet is successfully received, it is then scheduled for retransmission towards the destination, based on any radio resource management strategies incorporated into the RN. Alternatively a relay node may be of the non-regenerative type, whereby data is amplified at the relay node and the signal is forwarded to the next station. It is envisaged that the function of an intermediate apparatus or relay node may be provided by a mobile phone, or other user equipment.

Whilst embodiments of the third, fourth and fifth aspects of the present invention may only realistically operate where regenerative relays are employed as the intermediate apparatus, they benefit from a relatively simple determination of the transmit powers which does not require the performance of an explicit calculation. Transmit powers are advantageously determined by adjusting the transmit power of the relevant transmitter relative to the degree of indicator change detected by the indicator deviation detection means, in order to restore the indicator which has experienced a change to its value, and thereby balance the received SINR. Similarly embodiments of the sixth and seventh aspects also rely on the determination of the change in bandwidth required by considering of the degree of deviation detected by the indicator deviation detection means.

Communication methods carried out in a base station embodying any of the aspect of the present invention, an intermediate apparatus embodying any aspect of the present invention or in a destination apparatus embodying any aspect of the present invention are also provided.

In accordance with any of the embodiments, one of the quality indicators derived by a receiver, or an apparatus operable to receive a communication signal, comprises a measure of the strength of a communication signal received at the receiver (eg RSS). Alternatively or additionally, one of the indicators derived by the receiver may comprise a measure of the signal-to-interference plus noise ratio (SINR) of a communication signal received at that apparatus, or it may comprise a measure of the variation of the quality of a communication signal received at a given apparatus from a target received signal quality set for the receiving apparatus. An indicator of the variation from target may be a variation from target RSS, a variation from target SINR or a variation from a target which is based on a combination of RSS and SINR.

The indicator of the quality of the communication signal received at a receiver of a communication apparatus in a multi-hop communication system embodying the present invention may be an indicator of the quality of service (QoS) experienced by the receiver. The QoS indicator can be made up of one or a number of metrics which are each indicative of a particular quality in the service experienced over a given communication link. For example, the QoS may comprise a single indicator which may be, for example, a measure of the throughput (i.e. user throughput or packet throughput), a measure of the packet delay, a measure of the jitter (i.e. the variation in packet delay) or a measure of the packet error rate (probability a received packet will be in error). Each of these individual metrics are indicative of the QoS experienced across a communication link between a transmitter and a receiver and may form the QoS indicator in a multi-hop communication system of the present invention.

Alternatively, the QoS indicator may comprise more than one of these metrics. Thus, complex definitions of the QoS may be formed wherein the QoS may be a function of some or all of these input metrics with some differential weighting applied to each. For example, a throughput lower than that required (i.e. lower than target) would give rise to a bad QoS which would be reflected, for example, in the time taken to transfer a file over the internet, in the speed of webpage viewing or the quality of video streaming. A longer delay than required would make interactive services poor giving rise to a long delay on voice or video calls or to a poor experience for online gaming. Jitter would also have an impact on interactive services and would also affect streaming services (i.e. video download or broadcast) as larger buffering would be required to smooth the burstiness. Further, if the QoS is greater than required across a particular communication link, then it may be desirable to reduce the amount of bandwidth associated with the user to thereby free the communication resource for other users.

Embodiments of the sixth and seventh aspect of the resent invention therefore seek to utilise the allocation of bandwidth across each of the links in order to maintain or attain a substantial balance between indicators of the quality of service (QoS) across each of the links.

As previously explained, the way in which bandwidth allocated to a given transmitter will depend upon the channel access method employed by the communication system.

The bandwidth may be adjusted simply by allocating more or less transmission resource (bits) to a transmitter within any one scheduling or transmission interval.

Embodiments of the present invention may be implemented within a wireless communication system employing any multiple access technique, including but not limited to: frequency division multiple access (FDMA), time division multiple access (TDMA) code division multiple access (CDMA) and orthogonal frequency division multiple access (OFDMA). In the case of a CDMA system, in which all transmissions occur in the same frequency band and each transmission is assigned a unique channelisation code, the Gp factor represents the spreading factor or length of the code used to spread the transmitted signal otherwise known as the processing gain. In the case of orthogonal spreading codes, up to Gp channels are available for simultaneous transmission.

The actual calculation to be performed by embodiments of the present invention which utilise a calculation may be derived in a number of possible ways. One derivation, which is based on a consideration of the SINR at each of the receiving elements in a multi-hop network, is given below and leads to a number of possible solutions for calculating the optimal transmit power of the transmitting elements comprised in a multi-hop network for various deployment scenarios. The skilled person will appreciate that alternative solutions may be derived from consideration of other types of measures of the quality of a communication signal at the receivers of a multi-hop network and the underlying principal of the present invention that these measures should be balanced.

It will be proved later that different calculations may be performed by the calculation means depending on the duplexing method employed to separate transmissions between two links, and the characteristics of the intermediate apparatus employed in the present communication system. Furthermore, solutions may be based on a single cell model, a two cell model or a multi-cell model.

For example, according to embodiments of the first aspect of the present invention, which is intended to be used to optimise DL communications, the following calculation may be performed.

In the case where the intermediate apparatus comprises a regenerative relay node and an FDD duplexing method is employed to separate signals received by the relay node from those transmitted by the relay node, the transmit power of the base station can be advantageously found using equation (5) and the transmit power of the intermediate apparatus can be advantageously found using equation (6).

In the case where the intermediate apparatus comprises a regenerative relay node and a TDD duplexing method is employed to separate signals received by the relay node from those transmitted by the relay node, the transmit power of the base station can be advantageously found using equation (7) and the transmit power of the intermediate apparatus can be advantageously found using equation (8).

In the case where the intermediate apparatus comprises a non-regenerative relay node and an FDD duplexing method is employed to separate signals received by the relay node from those transmitted by the relay node, the transmit power of the base station can be advantageously found using equation (29) and the transmit power of the intermediate apparatus can be found using equation (31).

In the case where the apparatus comprises a non-regenerative relay node and a TDD duplexing method is employed to separate signals received by the relay node from those transmitted by the relay node, the transmit power of the base station can be advantageously found using equation (44) and the transmit power of the intermediate apparatus can be advantageously found using equation (47).

It should be appreciated that the term "user equipment" encompasses any device which is operable for use in a wireless communication system. Furthermore, although the present invention has been described primarily with reference to terminology employed in presently known technology, it is intended that the embodiments of the present invention may be advantageously applied in any wireless communication systems which facilitates the transmission of a communication signal between a source and destination, via an intermediate apparatus.

In any of the above aspects, the various features may be implemented in hardware, or as software modules running on one or more processors, or as a combination of the two. The invention also provides operating programs (computer programs and computer program products) for carrying out any of the methods described herein, and computer readable media having stored thereon programs for implementing the techniques described herein. A program embodying the invention may be stored on a computer-readable medium, or it could, for example, be in the form of a signal such as a downloadable data signal provided from an Internet web site, or it could be in any other form.

BRIEF DESCRIPTION OF DRAWINGS

For a better understanding of the present invention and to show how the same may be carried into effect, reference will now be made, by way of example, to the accompanying drawings in which:

FIG. 1A illustrates a single cell/relay model of a wireless communication system;

FIG. 1B illustrates a two cell/relay model of a wireless communication system;

FIGS. 29A and 29B show a graphical illustration of the variation in the average gain in throughput observed by users of a multi-hop system as compared to that observed for a single hop system;

Figure 2A:
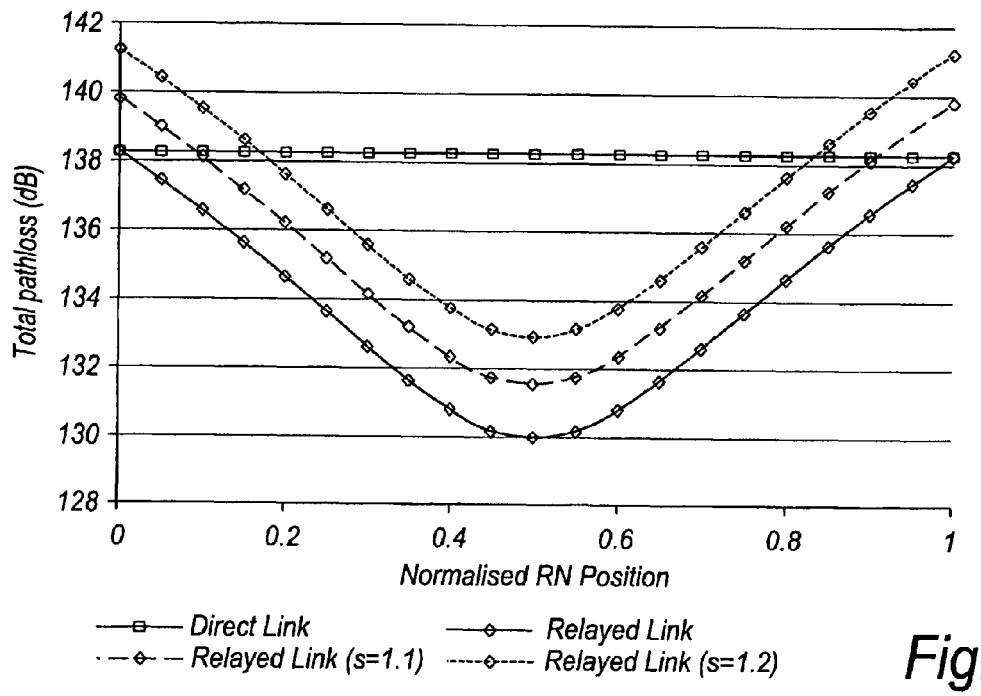
FIGS. 2A and 2B each show a graphical representation of the theoretical gain that may be achieved by a multi-hop communication system based on pathloss equation (A)
Figure 2B:
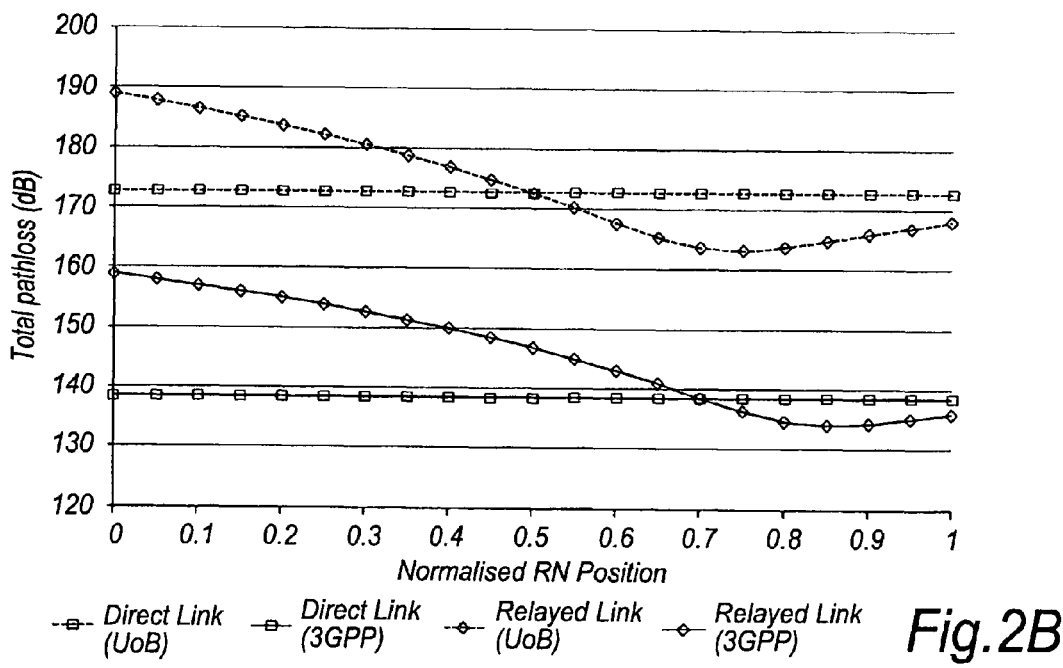

The reference numerals listed below denote parts shown in the accompanying drawings having the same, or similar, function:

1. indicator derivation means;
2. indicator change detection means;
3. determining means;
4. first calculation means;
5. second calculation means;
6. request receiving means;
7. control/command means;
8*a*. request relay;
8*b*. request modifying means;
9. indicator receiving means;
10. imbalance detection means;
11. base station;
12. intermediate apparatus; and
13. source apparatus.

DESCRIPTION OF EMBODIMENT(S)

Figure 3:
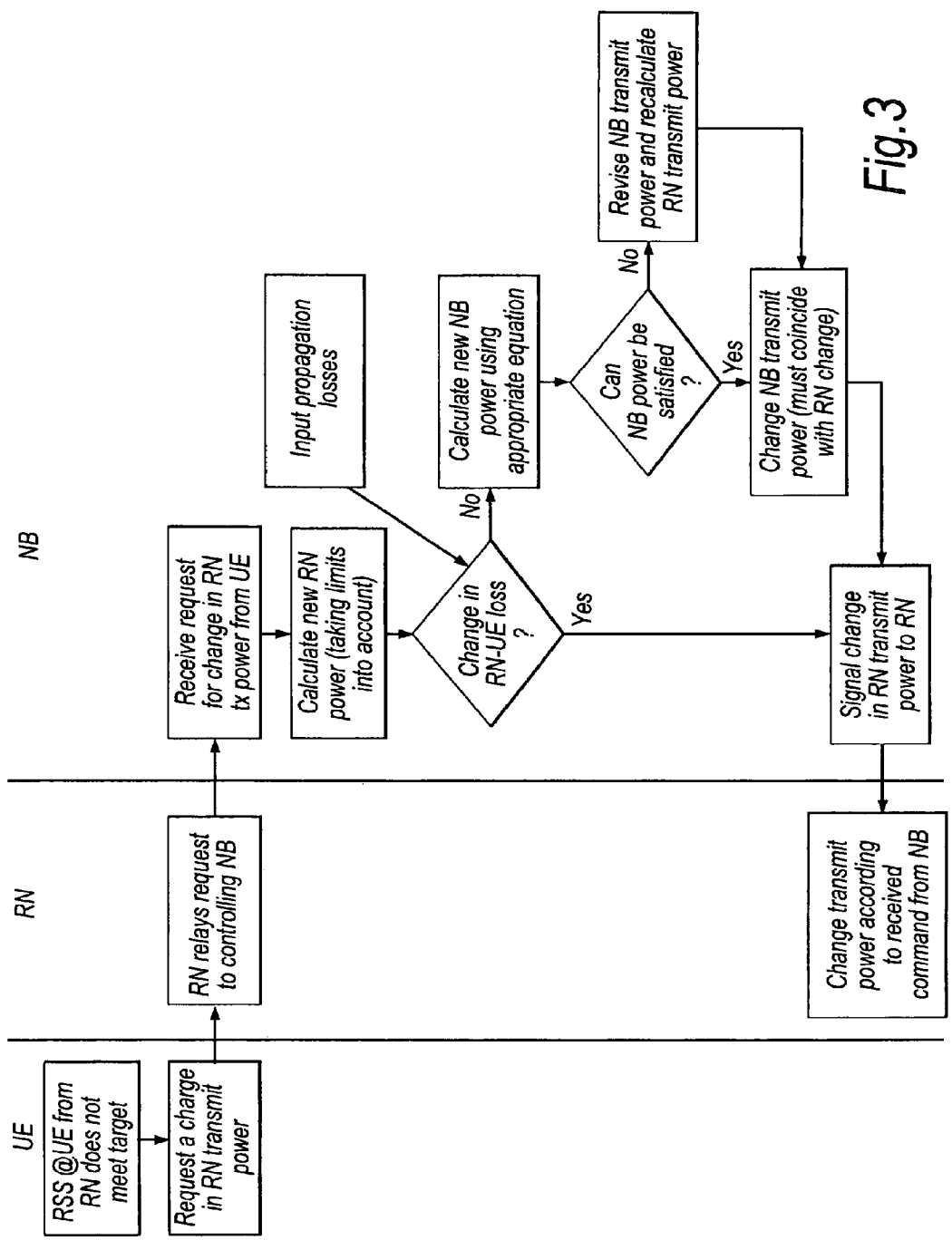
FIG. 3 illustrates a first algorithm embodying the first aspect of the present invention.

A first example of an algorithm which implements an embodiment of the first aspect of the present invention will now be described with reference to FIG. 3 in which the source apparatus comprises a node-B (NB), the intermediate apparatus comprises a relay node (RN) which may be of the regenerative or non-regenerative type, and the destination apparatus comprises a user equipment (UE). The user equipment continually monitors the RSS and derives indicators of the received signal strength and the variation from target received signal strength. The destination apparatus is provided with an indicator deviation detection means for detecting a change in one or both of these indicators. The Node-B is provided with a control means having a first calculation means according to an embodiment of the first aspect of the present invention.

The details of the algorithm are summarised as follows:

Downlink Algorithm 1: Part 1
Trigger: NB receives request for change in RN transmit power from UE

| Algorithm Input | Required by | Origin |
|---|---|---|
| Request for change in RN Transmit Power | NB | Change derived in UE and signalled to NB via RN |
| RN Transmit Power | NB | Tracked/calculated in the NB |
| RN-UE Propagation Loss | NB | Calculated in the NB (see second part) |

-continued

Downlink Algorithm 1: Part 1
Trigger: NB receives request for change in RN transmit power from UE

| Algorithm Output | Derivation | Destination & Signalling Requirement |
|---|---|---|
| New NB transmit power | Explicit calculation | Used by NB |
| New RN transmit power | Explicit calculation | Relative change in RN power signalled to RN |

In order to enable calculation of the new RN transmit power, the control means in the NB requires knowledge of the current RN transmit power. Two techniques for obtaining this information are available: 1) The NB has knowledge of the initial transmit power of the RN as well as the maximum; this knowledge is either inherent or signalled when the RN connects to the NB. The NB then tracks the RN transmit power as commands to change it are issued or 2) The RN reports the current transmit power to the NB preventing the need for tracking in the NB. This algorithm assumes the first technique is used since it benefits from lower signalling complexity.

The following sequence takes place following detection of a deviation in an indicator from a desired value (which in this case is the target RSS) in order for a first calculation means provided in the NB to calculate a new transmit power for the intermediate apparatus which will tend to substantially reduce an imbalance between a measure of the quality of a communication signal received at the intermediate apparatus and a measure of the quality of a communication signal received at the destination apparatus; or a new transmit power for the intermediate apparatus and the base station which will substantially prevent said imbalance from arising.

1. The destination apparatus transmits a request for a change in the RN transmit power to the RN;
2. The RN propagates this request to the NB which comprises a first calculation means;
3. Based on a knowledge of the current RN transmit power, the first calculation means calculates the new RN transmit power required to satisfy the change requested by the UE. The NB takes into account the finite limit of the RN transmit power, adjusting the new transmit power as appropriate;
4. Then:

i) if it is detected that no change has occurred in the RN-UE propagation loss (as determined by an input signal derived by a second algorithm embodying the first aspect of the present invention) then the request has been generated because of a change in the target at the UE, not a change in the RN-UE propagation loss. In this case the first calculation means also calculates a new transmit power for the NB. The NB then checks that the NB transmit power change can be satisfied (i.e. in the case of an increase the maximum transmit power is not exceeded). If the maximum is exceeded then the power change is adjusted so this will not occur. The RN transmit power is then recalculated so that balance will be attained. The NB then signals a command to the RN for the RN to adjust its transmit power in accordance with the new transmit power calculated by the first calculation means and changes its own transmit power so as to coincide with the RN transmit power change; or ii) If it is detected that a change has occurred in the RN-UE propagation loss, the NB signals a command to the RN for the RN to adjust its transmit power in accordance with the new transmit power calculated by the first calculation means.

The algorithm described above will manage the case of the propagation loss varying between the RN and UE and the case of the UE modifying its target RSS or SINR. In order to handle the case of the propagation loss varying between the NB and RN and the case that both the target in the UE and the propagation loss between the RN and UE varies, such that no request for change in RN transmit power is generated, an algorithm which implements another embodiment of the first aspect of the present invention operates periodically as discussed below.

Figure 4:
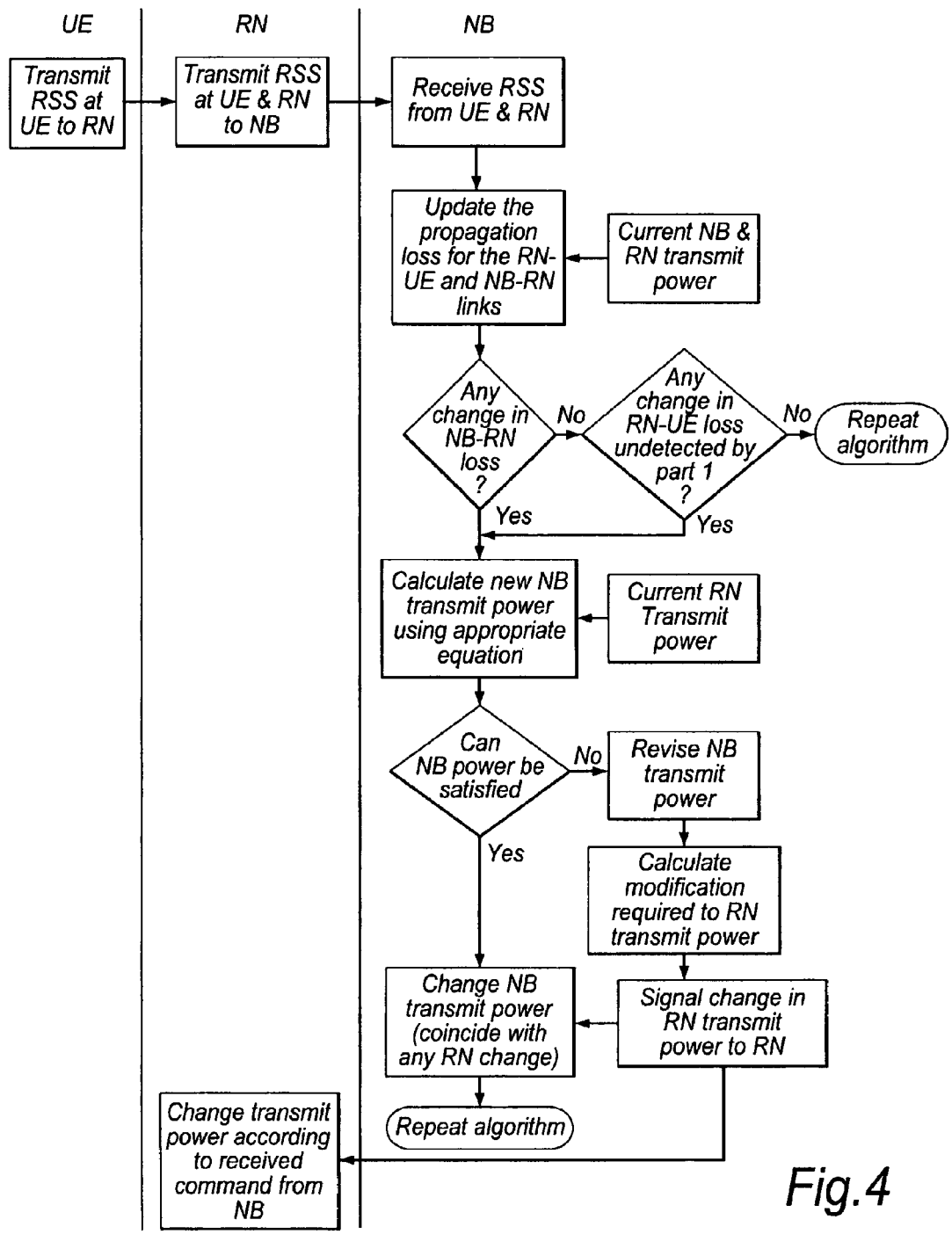
FIG. 4 illustrates a second algorithm embodying the first aspect of the present invention.

This algorithm is executed periodically in addition to the algorithm discussed above with reference to FIG. 4. Alternatively, it is also possible for the algorithm described with reference to FIG. 4, or the following algorithm to be implemented separately in a wireless multi-hop communication system.

Downlink Algorithm 1: Part 2
Trigger: Periodically executed in NB

| Algorithm Input | Required by | Origin |
| --- | --- | --- |
| RSS at UE | NB | Signalled from UE via RN |
| RSS at RN | NB | Signalled from RN |
| NB Transmit Power | NB | Known already |
| RN Transmit Power | NB | Tracked/calculated in the NB |
| Algorithm Output | Derivation | Destination & Signalling Requirement |
| New NB transmit power | Explicit calculation | Used by NB |
| New RN transmit power | Explicit calculation | Relative change in RN power signalled to RN |
| Propagation losses | Explicit calculation | Derived from difference between Tx and Rx power. Used in NB. |

The algorithm assumes that indicators of the received signal strength at the UE and RN are reported to the NB in order to facilitate calculation of the propagation loss across the two links by the second calculation means. The NB is provided with a second calculation means according to an embodiment of the first aspect of the present invention.
1. The NB monitors the indicators of the received signal strength from both the UE and RN. Using this in conjunction with the knowledge of the RN and NB transmit power it updates the propagation loss for the NB-RN and RN-UE links;
2. If a change in either the NB-RN or RN-UE propagation loss is detected then the updated propagation loss is used by the second calculation means, in conjunction with the knowledge of the RN transmit power, to calculate the optimal NB transmit power. If no change in propagation loss is detected then the current iteration of the algorithm terminates;
3. If a change in propagation loss is detected, then:
i) if the calculated NB transmit power can be met (i.e. the maximum transmit power of the NB will not be exceeded) then NB signals a command to the RN for the RN to adjust its transmit power in accordance with the new transmit power calculated by the second calculation means; or
ii) if the calculated NB transmit power can not be met then the NB transmit power is modified to one that can. The second calculation means then calculates the new RN transmit power that ensures optimal balance. The NB then signals a command to the RN for the RN to adjust its transmit power in accordance with the new transmit power calculated by the second calculation means and changes its own transmit power so as to coincide with the RN transmit power change.

Figure 5A:
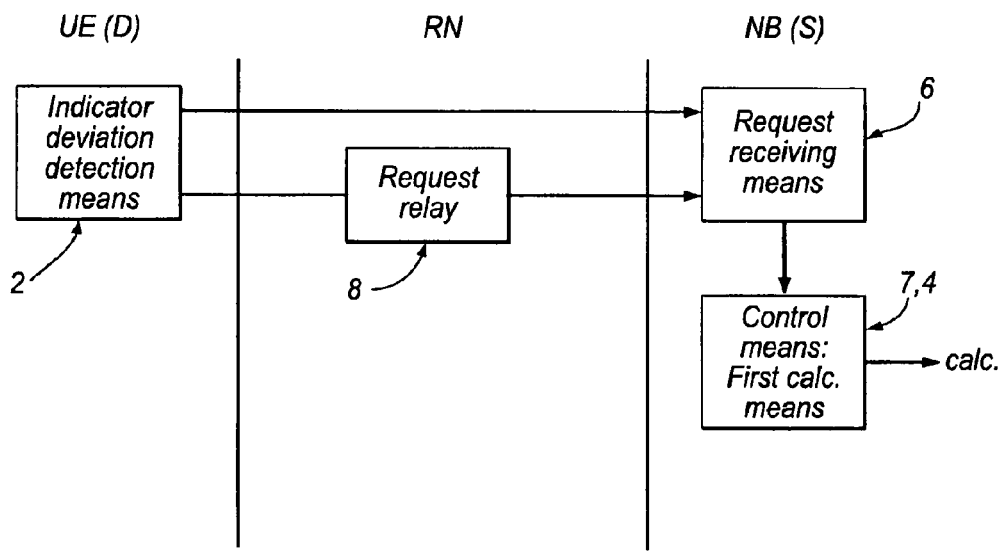
FIGS. 5A and 5B illustrate parts of a communication system embodying the first aspect of the present invention.

There are a number of ways in which the signalling required to carry out embodiments of the first aspect of the present invention may be implemented and these are illustrated in FIGS. 5A and B which show parts of a communication system embodying the first aspect of the present invention in which the same reference numerals are used to refer to parts which provide the same function.

FIG. 5A shows a communication system in which, in addition to an indicator derivation means (not shown), the destination apparatus is provided with an indicator deviation detection means (2) and is operable, following detection of a change in the indicator derived by the destination apparatus, to transmit a request for a determination of a change in the transmit power of the intermediate apparatus. The base station (NB) comprises a request receiving means (6) and a control means (7) which comprises the first calculation means (4). The request transmitted by the destination apparatus may be transmitted via a request relay means (8) provided in the intermediate apparatus.

Figure 5B:
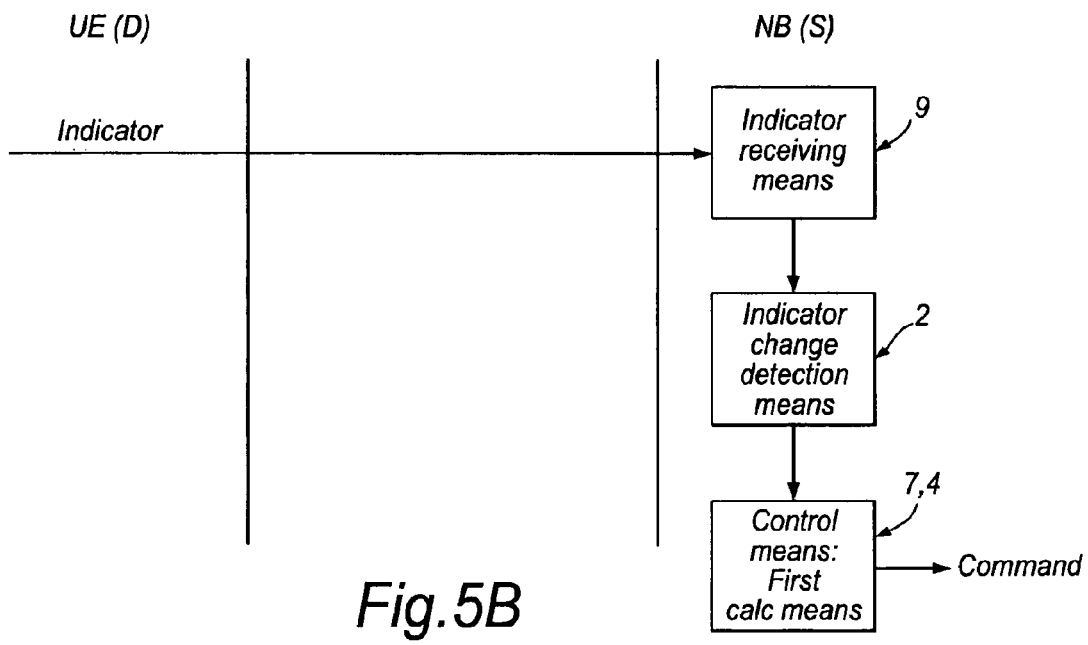

FIG. 5B shows a communication system in which the base station (NB) comprises an indicator receiving means (9), an indicator deviation detection means (2), and a control means (7) which comprises a first calculation means.

Figure 6:
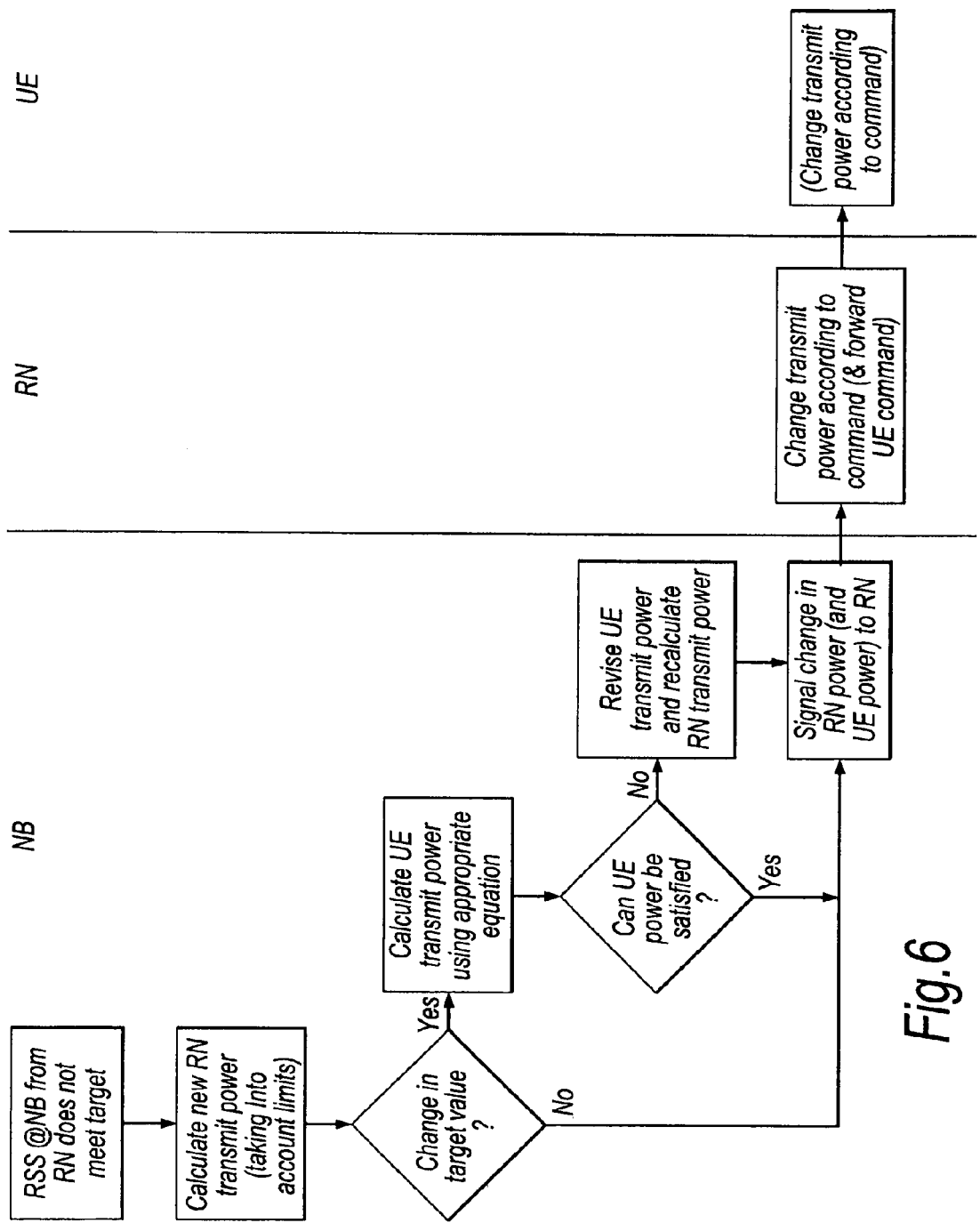
FIG. 6 illustrates a first algorithm embodying the second aspect of the present invention.

An example of an algorithm which implements an embodiment of the second aspect of the present invention will now be described with reference to FIG. 6, in which the source apparatus comprises a user equipment (UE), the intermediate apparatus comprises a relay node (RN), which is of the regenerative type, and the destination apparatus comprises a base station (NB). The base station continually monitors the RSS and derives indicators of the RSS and the variation from target RSS. The base station is provided with indicator deviation detection means for detecting a change in one or both of these indicators. The base station is also provided with a control means having a first calculation means according to an embodiment of the second aspect of the present invention.

In order to enable an explicit calculation of a new RN transmit power following a change in an indicator derived by the NB, the control means in the NB requires knowledge of the current RN transmit power. Two techniques for obtaining this information are available: 1) The NB has knowledge of the initial transmit power of the RN as well as the maximum; this knowledge is either inherent or signalled when the RN connects to the NB. The NB then tracks the RN transmit power as commands to change it are issued or 2) The RN reports the current transmit power to the NB preventing the need for tracking in the NB. This algorithm assumes the first technique is used since it benefits from lower signalling complexity.

The details of the algorithm are summarised as follows:

Uplink Algorithm 1: Part 1
Trigger: Request for change in RN transmit power in NB

| Algorithm Input | Required by | Origin |
| --- | --- | --- |
| Request for change in RN Transmit Power | NB | Derived in NB |
| RN Transmit Power | NB | Tracked/calculated in the NB |
| UE Transmit Power | NB | Tracked/calculated in the NB |
| Algorithm Output | Derivation | Destination & Signalling Requirement |
| New RN transmit power | Explicit calculation | Relative change in RN transmit power signalled to RN |
| New UE transmit power | Explicit calculation | Relative change in UE transmit power signalled to UE via RN |

The following sequence takes place following detection of a change in an indicator derived by the base station in order to i) substantially reduce an imbalance between a measure of the quality of a communication signal received at the intermediate apparatus and a measure of the quality of a communication signal received at the base station; or (NB) ii) to substantially prevent said imbalance from arising.

1. The control means of the NB calculates a new transmit power for the RN taking into account the transmit power limits of the RN;
2a. If the change detected by the indicator deviation detection means of the base station is a result of the pathloss changing between the intermediate apparatus and the base station (such that the indicator of SINR will change), the control means of the base station transmits a command to the RN commanding a change in the transmit power of the RN; or
2b. If the change detected by the indicator deviation detection means of the base station is a result of a change in the target quality indicator set for the base station (such that the indicator of variation from target RSS will change) then:
   i) the first calculation means also calculates a new transmit power for the source apparatus (UE) which corresponds to the calculated new transmit power for the RN. In the case of a CDMA system, the first calculation means modifies the calculated value of the new transmit power of the source apparatus so as to minimise the so-called "near-far" effect. Thus, the transmit power of the UE may be increased or decreased from the optimal value. The modification will depend on the requirements of the operator of the system since the effect of improper power balancing reduction in performance gain from multi-hopping must be weighted against a reduction in performance at a receiver in a multi-user scenario due to all the received signal levels not being equal.
   ii) the NB checks that the adjustment in the transmit power of the UE needed to meet the calculated new transmit power can be met, taking into account the maximum transmit power of the UE. If it is determined that the calculated new transmit power of the UE cannot be met, the first calculation means calculates a revised new transmit power for both the RN and the UE. In the case of a CDMA system, the first calculation means modifies the calculated value of the new transmit power of the source apparatus so as to minimise the so-called "near-far" effect; and
   iii) the control means issues a command to the RN and the UE commanding a change in the transmit power of the RN and the UE in accordance with the new transmit powers calculated by the first calculation means.

Figure 7:
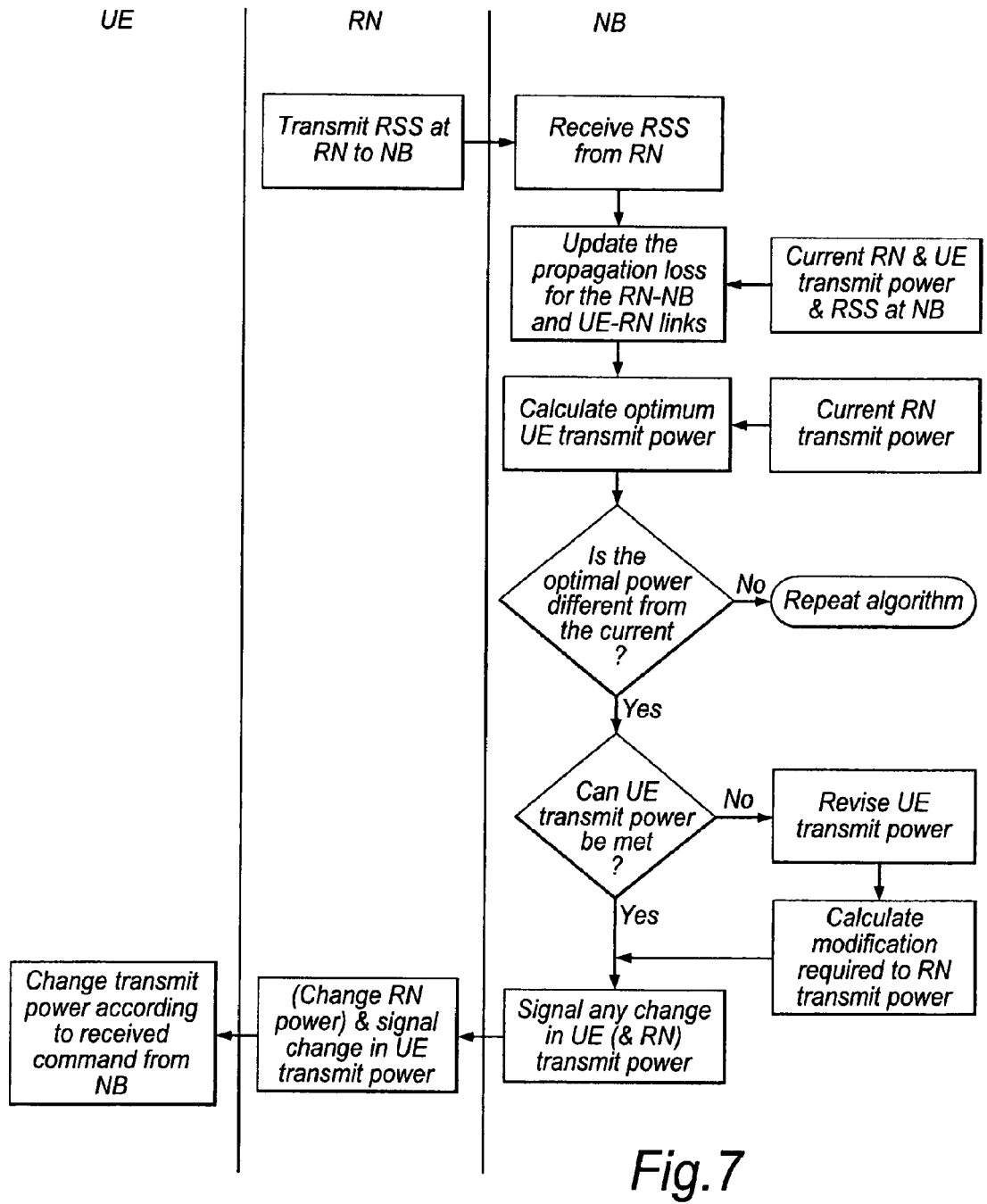
FIG. 7 illustrates a second algorithm embodying the second aspect of the present invention.

The algorithm described above will manage the case of the propagation loss varying between the RN and the NB and the case of the NB modifying its target RSS. In order to handle the case of the propagation loss varying between the UE and the RN, and the case that both the target in the NB and the propagation loss between the RN and NB varies, such that the above algorithm will not operate to determine the new transmit power for the UE, an algorithm which implements another embodiment of the second aspect of the present invention operates periodically as discussed below (FIG. 7).

The details of the algorithm may be summarised as follows:

| Uplink Algorithm 1: Part 2 Trigger: Periodically executed in NB | | |
|---|---|---|
| Algorithm Input | Required by | Origin |
| RSS at RN | NB | Signalled from RN |
| RSS at NB | NB | Monitored in the NB |
| RN Transmit Power | NB | Tracked/calculated in the NB |
| UE Transmit Power | NB | Tracked/calculated in the NB |
| Algorithm Output | Derivation | Destination & Signalling Requirement |
| New UE transmit power | Explicit calculation | Relative change in UE power signalled to UE via RN |
| New RN transmit power | Explicit calculation | Relative change in RN power signalled to RN |
| Propagation losses | Explicit calculation | Derived from difference between Tx and Rx power. Used in NB. |

This algorithm may be advantageously executed in addition to the algorithm discussed above with reference to FIG. 6. Alternatively, it is also possible for the following algorithm described with reference to FIG. 7 be implemented separately in a wireless multi-hop communication system.

The algorithm assumes that an indicator of the quality of a communication signal (RSS) derived by the RN is reported to the NB. The NB monitors the indicator derived by the RN and by an indicator derivation means of the NB, in order to facilitate calculation of the propagation loss across the two links by the second calculation means. The NB requires knowledge of the RN transmit power and the UE transmit power and this knowledge may be obtained by one of two techniques: 1) The NB has knowledge of the initial transmit power of the RN/UE as well as the maximum; this knowledge is either inherent or signalled when the RN/UE connects to the NB. The NB then tracks the RN/UE transmit power as commands to change it are issued or 2) The RN/UE reports the current transmit power to the NB preventing the need for tracking in the NB. This algorithm assumes the first technique is used since it benefits from lower signalling complexity.

1. The NB monitors the indicators of the received signal strength derived by both the NB and RN. Using this in conjunction with the knowledge of the RN and UE transmit power it updates the propagation loss for the UE-RN and RN-NB links;
2. If a change in either the UE-RN or RN-NB propagation loss is detected then the updated propagation loss is used by the second calculation means, in conjunction with the knowledge of the RN transmit power, to calculate the optimal UE transmit power. In the case of a CDMA system, the first calculation means modifies the calculated value of the new transmit power of the source apparatus so as to minimise the so-called "near-far" effect. If no change in propagation loss is detected then the current iteration of the algorithm terminates;
3. The NB checks whether the calculated optimal transmit power differs from the current UE transmit power.
3a. If it does not differ, then the current iteration of the algorithm terminates; or
3b. If it does differ, then:
   i) if the calculated new UE transmit power can be met (i.e. the maximum transmit power of the UE will not be exceeded) then NB signals a command to the UE for the UE to adjust its transmit power in accordance with the new transmit power calculated by the second calculation means; or
   ii) if the calculated UE transmit power cannot be met then the UE transmit power is modified to one that can. The second calculation means then calculates the new RN transmit power that ensures optimal balance. The NB then signals a command to the UE and the RN commanding an adjustment in transmit power in accordance with the new transmit powers calculated by the second calculation means.

Figure 8:
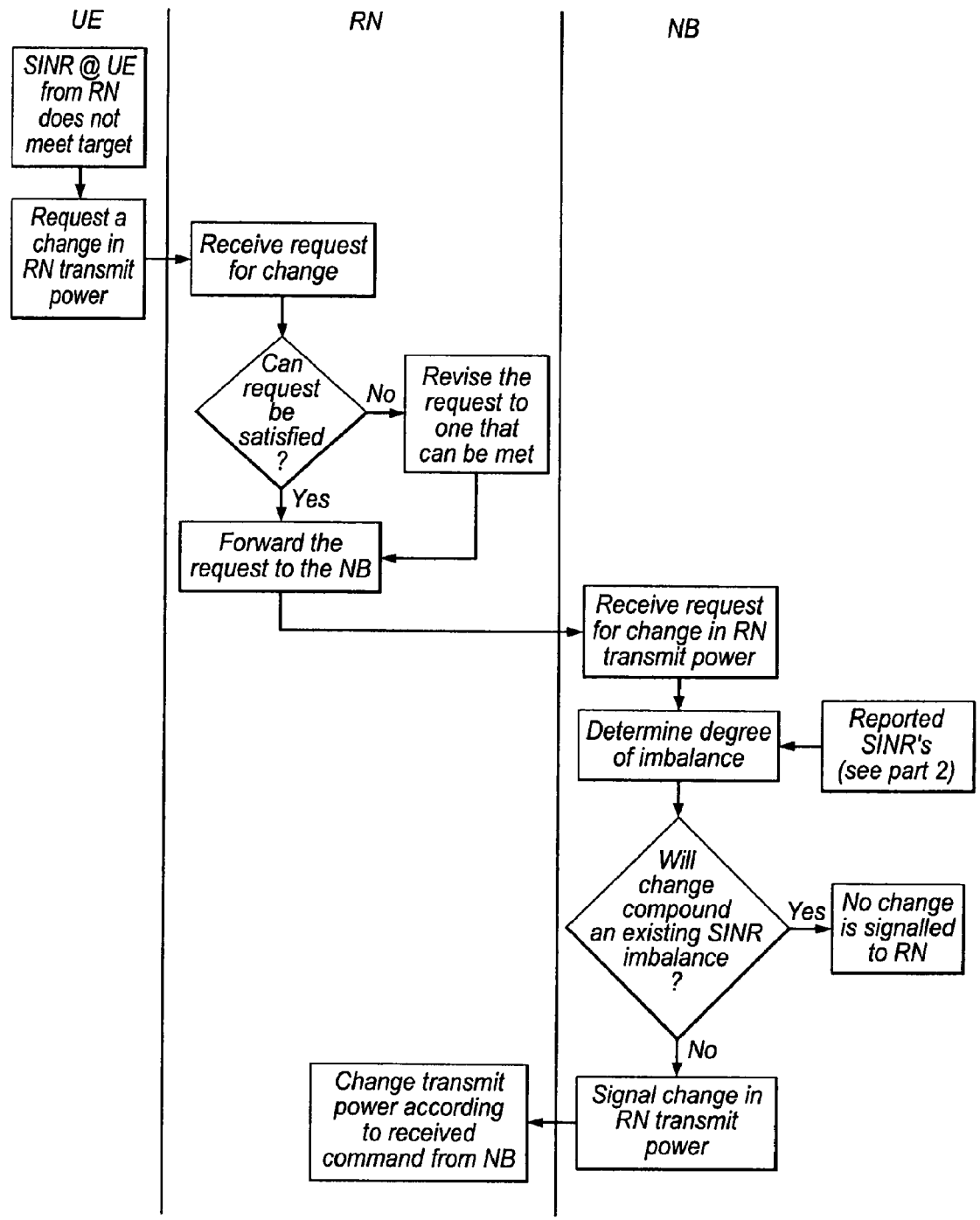
FIG. 8 illustrates a first algorithm embodying the third aspect of the present invention.

An example of an algorithm which implements an embodiment of the third aspect of the present invention will now be described with reference to FIG. 8 in which the source apparatus comprises a node-B (NB), the intermediate apparatus comprises a relay node (RN) is of the regenerative type, and the destination apparatus comprises a user equipment (UE). The destination user equipment continually monitors the SINR and derives indicators of the SINR and the variation from target SINR.

The details of the algorithm are summarised as follows:

| Downlink Algorithm 2: Part 1 Trigger: RN receives request for change in RN transmit power from UE | | |
| --- | --- | --- |
| Algorithm Input | Required by | Origin |
| Request for change in RN Transmit Power | NB | Change derived in UE, modified at RN and signalled to NB |
| SINR at UE (see part 2) | NB | |
| SINR at RN (see part 2) | NB | |
| Algorithm Output | Derivation | Destination & Signalling Requirement |
| Change in RN transmit power | Relative change | Derived at UE, checked by RN, approved by NB and actioned by RN |

The following sequence takes place following deviation of a change in an indicator derived by the destination from a desired value which in this case is the target SINR of the destination apparatus in order to determine a change in the transmit power of the intermediate apparatus which will tend bring the indicator derived by the destination apparatus back to said desired value.

1. The destination apparatus detects a change in an indicator of SINR or in an indicator of the variation from target SINR such that the SINR at the destination apparatus does not meet its target.
2. The destination apparatus transmits a request for a change in the RN transmit power to the RN;
3. The RN determines if it can satisfy this request.
   3a. If the request can be satisfied, it is propagated to the NB; or
   3b. If it cannot be satisfied, the RN determines a revised request and propagates this to the NB.
4. A control means provided in the NB receives a request for a change in the RN transmit power.
5. The NB receives an input signal comprising an indication of the SINR at the UE and the SINR at the RN and determines if an imbalance exists between the SINR at the UE and the SINR at the RN.
   5a. If an imbalance exists and the requested change in the transmit power of the intermediate apparatus will compound such an imbalance between the SINR at the UE and the SINR at the RN, the control means ignores said request; or
   5b. If no imbalance exists, or if an imbalance exists but the requested change in the transmit power of the intermediate apparatus will not compound such an imbalance between the SINR at the UE and the SINR at the RN, the control means issues a command to the RN, commanding a change in the transmit power of the RN;
6. The RN receives a command from the control means of the NB and adjusts its transmit power in accordance with the command.

Figure 9:
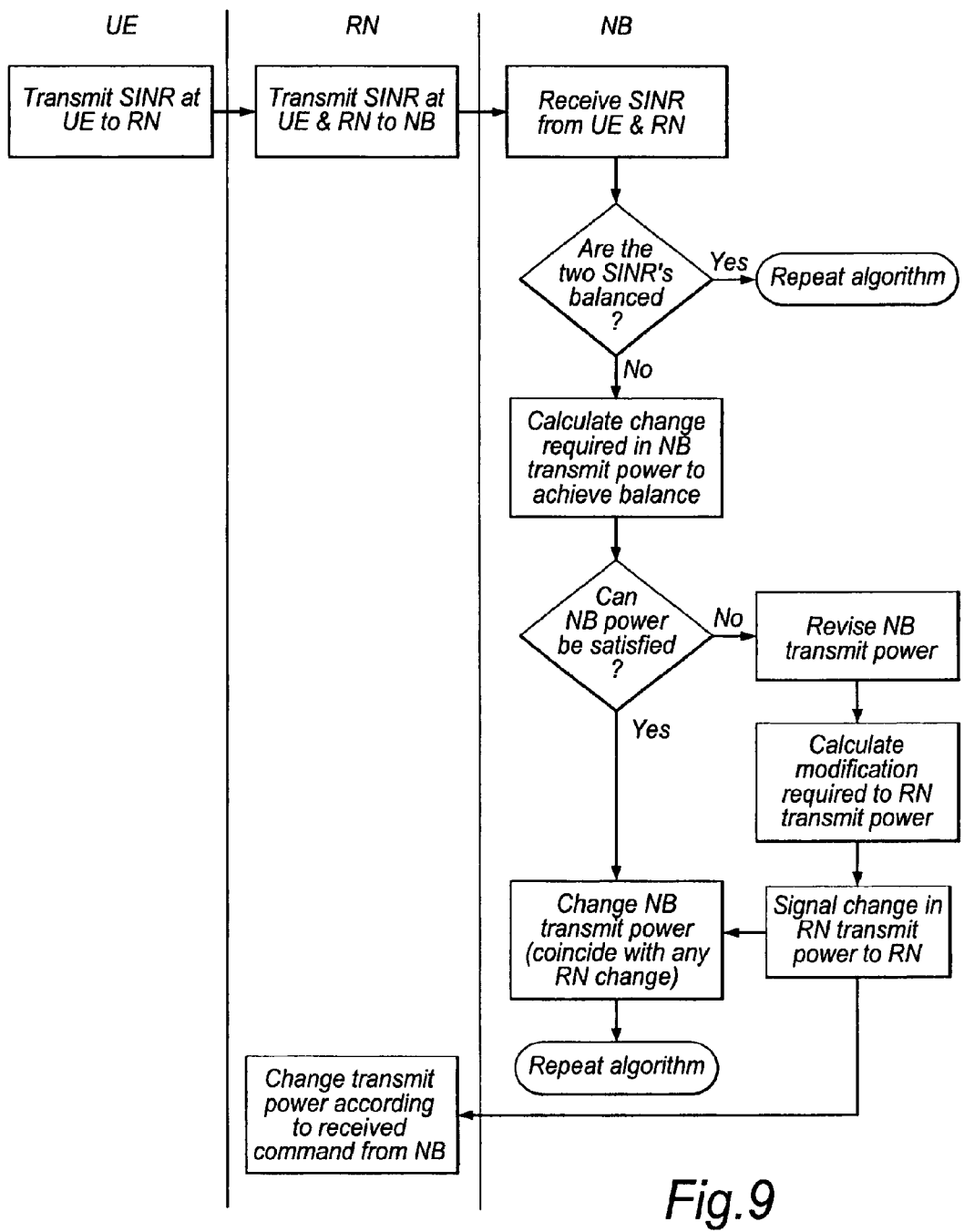
FIG. 9 illustrates a second algorithm embodying the third aspect of the present invention.

The algorithm described above will manage the case of the propagation loss varying between the RN and UE and the case of the UE modifying its target RSS or SINR. In order to handle the case of the propagation loss varying between the NB and RN and the case that both the target in the UE and the propagation loss between the RN and UE varies, such that no request for change in RN transmit power is generated, an algorithm which implements another embodiment of the third aspect of the present invention operates periodically as discussed below (FIG. 9)

The details of the algorithm are summarised as follows:

| Downlink Algorithm 2: Part 2 Trigger: Periodically executed in NB | | |
| --- | --- | --- |
| Algorithm Input | Required by | Origin |
| SINR at UE | NB | Signalled from UE via RN |
| SINR at RN | NB | Signalled from RN |
| Algorithm Output | Derivation | Destination & Signalling Requirement |
| Change in NB transmit power | Relative change | Used by NB |
| Change in RN transmit power | Relative change | Change signalled to RN |

This algorithm is executed periodically in addition to the algorithm discussed above with reference to FIG. 8. Alternatively, it is also possible for this algorithm, shown in FIG. 9, to be implemented separately in a wireless multi-hop communication system. The algorithm assumes that indicators of the SINR at the UE and RN are reported to the NB.

1. The NB monitors the indicators of the SINR from both the UE and RN. If these are found to vary such that they are imbalanced, a control means of the NB determines the change in transmit power that is required to restore a balance in SINR.
2. The NB determines if it can carry out the required change in transmit power that will restore balance.
   2a. If it is determined that the NB cannot carry out the required change, the NB determines a revised change in transmit power. The control means issues i) a command to the NB commanding a change in transmit power of the NB and ii) a command to the RN commanding a change in transmit power of the RN; or
   2b. If it is determined that the NB can carry out the required change, the NB control means issues a command to the NB commanding a change in transmit power of the NB.

Figure 10A:
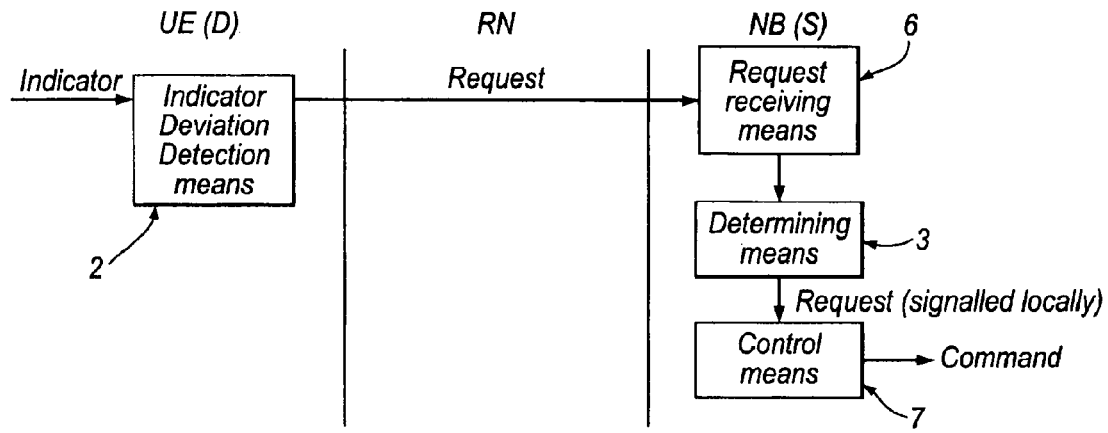
FIGS. 10A, 10B and 10C show parts of a communication system embodying the third aspect of the present invention.
Figure 10B:
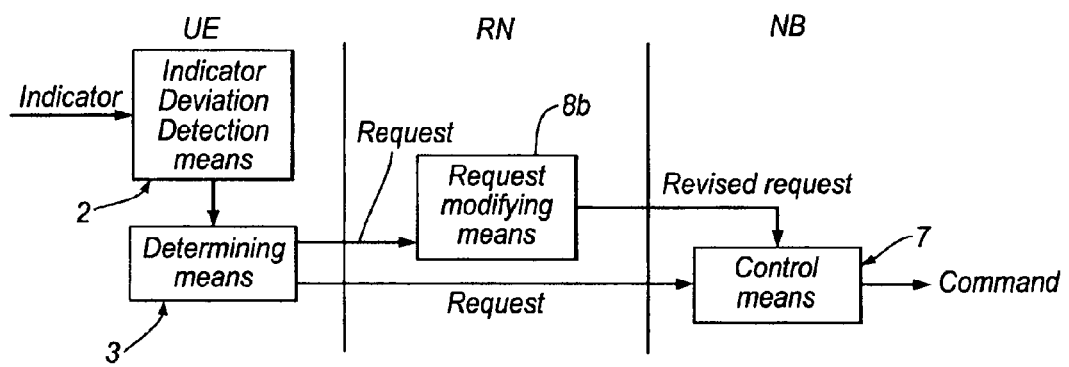
Figure 10C:
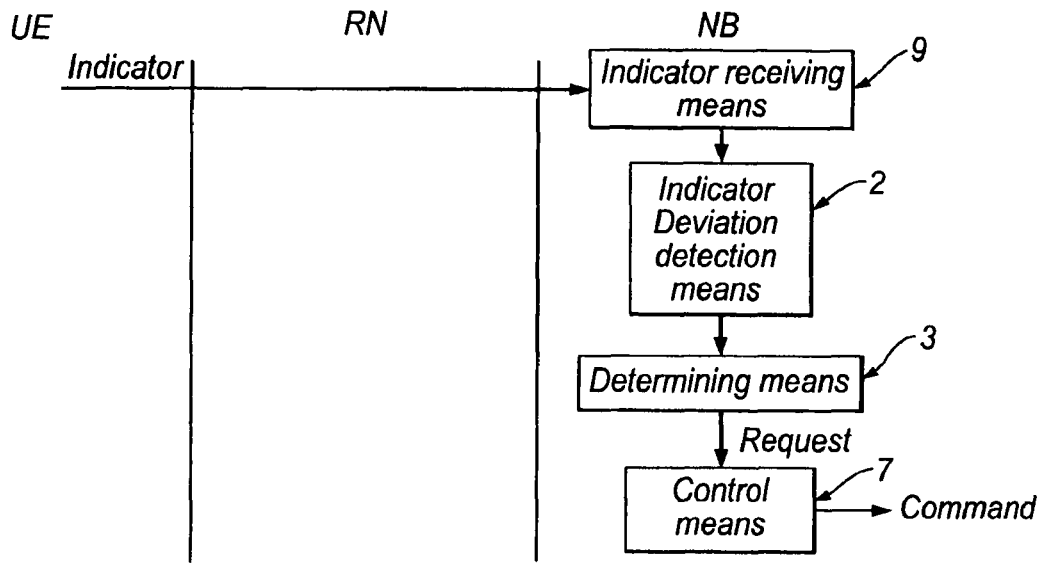

There are a number of ways in which the signalling required to carry out embodiments of the third aspect of the present invention may be implemented and these are illustrated in FIGS. 10A, 10B and 10C which show parts of a communication system embodying the third aspect of the present invention in which the same reference numerals are used to refer to parts which provide the same function.

FIG. 10A shows a communication system in which, in addition to an indicator derivation means (not shown), the destination apparatus is provided with an indicator deviation (2) detection means and is operable, following detection of a change in the indicator derived by the destination apparatus, to transmit a request for a determination of a change in the transmit power of the intermediate apparatus. The base station (NB) comprises a request receiving means (6) and a determining means (3) which is operable to determine a change in the transmit power of the intermediate apparatus that will tend to bring said indicator derived by the destination apparatus towards said desired value. Thus, said request for a change in the transmit power of the intermediate apparatus is transmitted locally from said determining means of the base station to said control means (7) of the base station.

FIG. 10B shows a communication system wherein, in addition to an indicator derivation means (not shown), the destination apparatus is provided with an indicator deviation detection means (2) and a determining means (3). Thus, said request is transmitted from the determining means of the destination apparatus to the control means (7) of the base station. As shown in FIG. 10B, the request may be transmitted via the intermediate apparatus (RN) which may comprise request modifying means (8b), operable to determine if the request for a change in the transmit power of the intermediate apparatus can be satisfied and, if necessary, to modify the request to one that can be met.

FIG. 10C shows a communication system in which the base station (NB) comprises an indicator receiving means (6), an indicator deviation detection means (2), a determining means (3) and a control means (7). Thus, said request for a change in the transmit power of the intermediate apparatus is transmitted locally from said determining means of the base station to said control means (7) of the base station.

It can be seen from FIGS. 10A, 10B and 10C that a base station provided according to an embodiment of the third aspect of the present invention may comprise: i) a control means; ii) a determining means and a control means; or iii) an indicator deviation detection means, a determining means and a control means. Similarly a destination apparatus provided in accordance with an embodiment of the first aspect of the present invention may comprise, indicator derivation means; indicator derivation means and indicator deviation detection means; or indicator derivation means, indicator deviation detection means and determining means.

Figure 11:
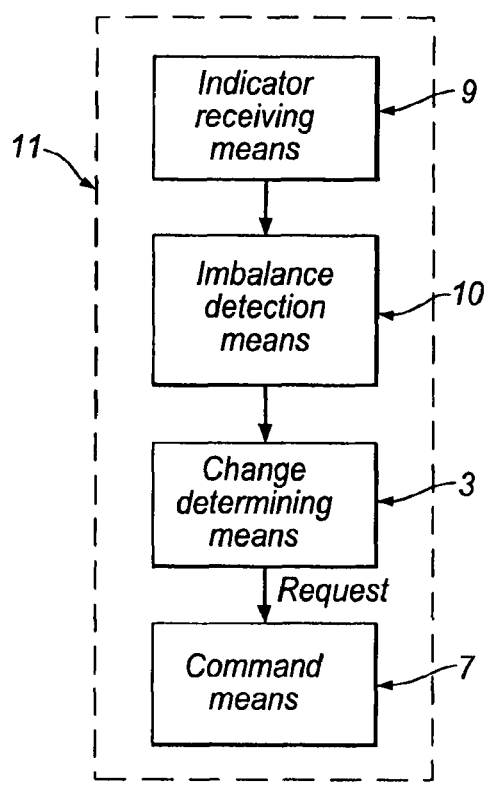
FIG. 11 shows parts of a base station embodying the third aspect of the present invention.

FIG. 11 shows parts of a base station, generally designated 11, embodying the third aspect of the present invention which comprises an indicator receiving means (9), and imbalance detection means (10) and a change determining means (3) and a command means (7).

Figure 12:
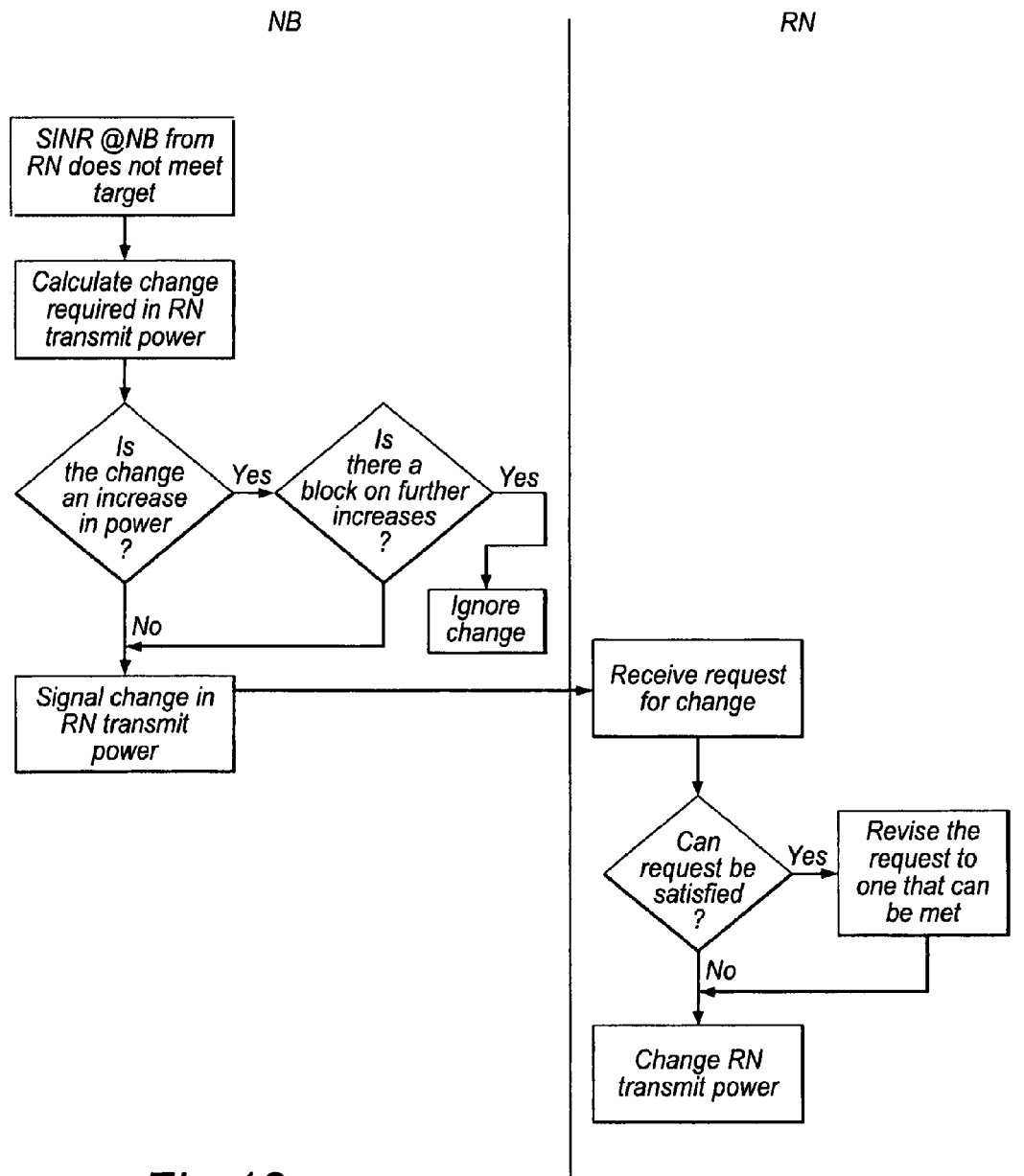
FIG. 12 illustrates a first algorithm embodying the fourth aspect of the present invention.

An example of an algorithm which implements an embodiment of the fourth aspect of the present invention will now be described with reference to FIG. 12, in which the source apparatus comprises a user equipment (UE), the intermediate apparatus comprises a relay node (RN) which is of the type, and the destination apparatus comprises a base station (NB). The base station continually monitors the SINR and derives indicators of the SINR and the variation from target SINR.

The following sequence takes place following detection of a change in an indicator derived by the base station from a desired value in order to determine a change in the transmit power of the intermediate apparatus which will tend bring the indicator derived by the destination apparatus back to said desired value.

The details of the algorithm are summarised as follows:

| Uplink Algorithm 3: Part 1 Trigger: Periodically executed in NB | | |
|---|---|---|
| Algorithm Input | Required by | Origin |
| Request for change in RN Transmit Power | RN | Change derived in NB and processed by RN |
| Block in increase in RN Transmit Power | RN | Block is set/cleared in part 2 of the algorithm |
| Algorithm Output | Derivation | Destination & Signalling Requirement |
| Change in RN transmit power | Relative change | Relative change derived at NB and made by RN |

1. The base station detects a change in an indicator of SINR or in an indicator of the variation from target SINR such that the SINR at the destination apparatus does not meet its target.

2. The determining means of the destination determines the required change in the transmit power of the intermediate apparatus (RN).

3. A request is transmitted locally to a control means of the destination apparatus for a change in the RN transmit power.

4. If the request is for a decrease in the RN transmit power, the control means issues a command to the intermediate apparatus for a decrease in the transmit power of the RN.

5. If the request is for an increase in the RN transmit power, the control means checks whether a prohibition, or block, is currently in place which prohibits increases in the RN transmit power. Then:

5a. If it is determined that a prohibition is in place, the control means ignores the request; or 5b. If it is determined that no prohibition is in place, the control means issues a command to the intermediate apparatus; commanding an increase in the transmit power of the RN.

6. The RN receives a command from the control means of the NB and checks whether it can change its transmit power in accordance with the command. Then:

6a: If the RN determines that it cannot change its transmit power in accordance with the command, it determines a revised change in transmit power and adjusts its transmit power in accordance with the revised transmit power; or 6b: If the RN determines that it can change its transmit power in accordance with the command, the RN changes its transmit power accordingly.

Figure 13A:
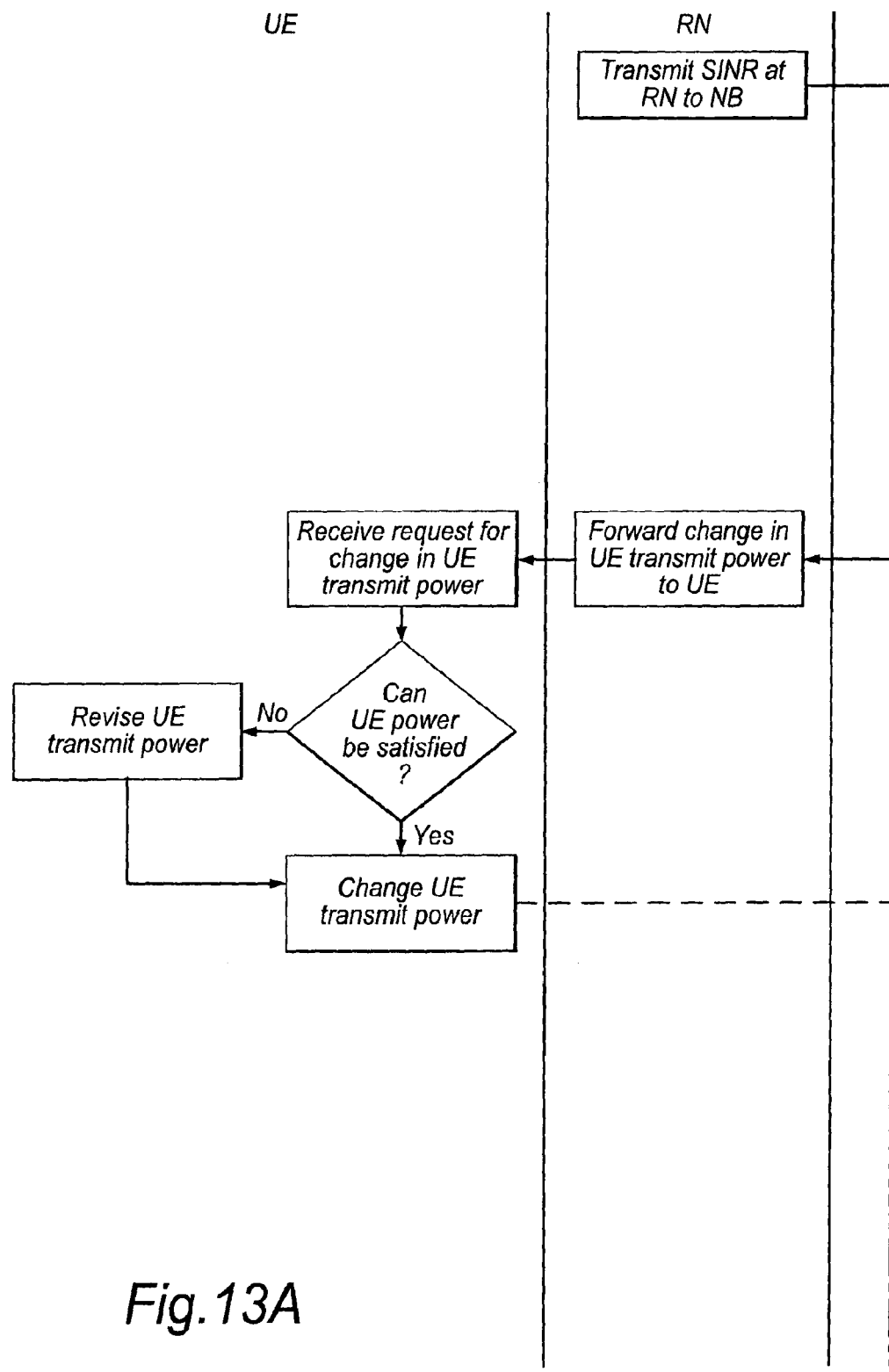
FIGS. 13A and 13B illustrate a second algorithm embodying the fourth aspect of the present invention.
Figure 13B:
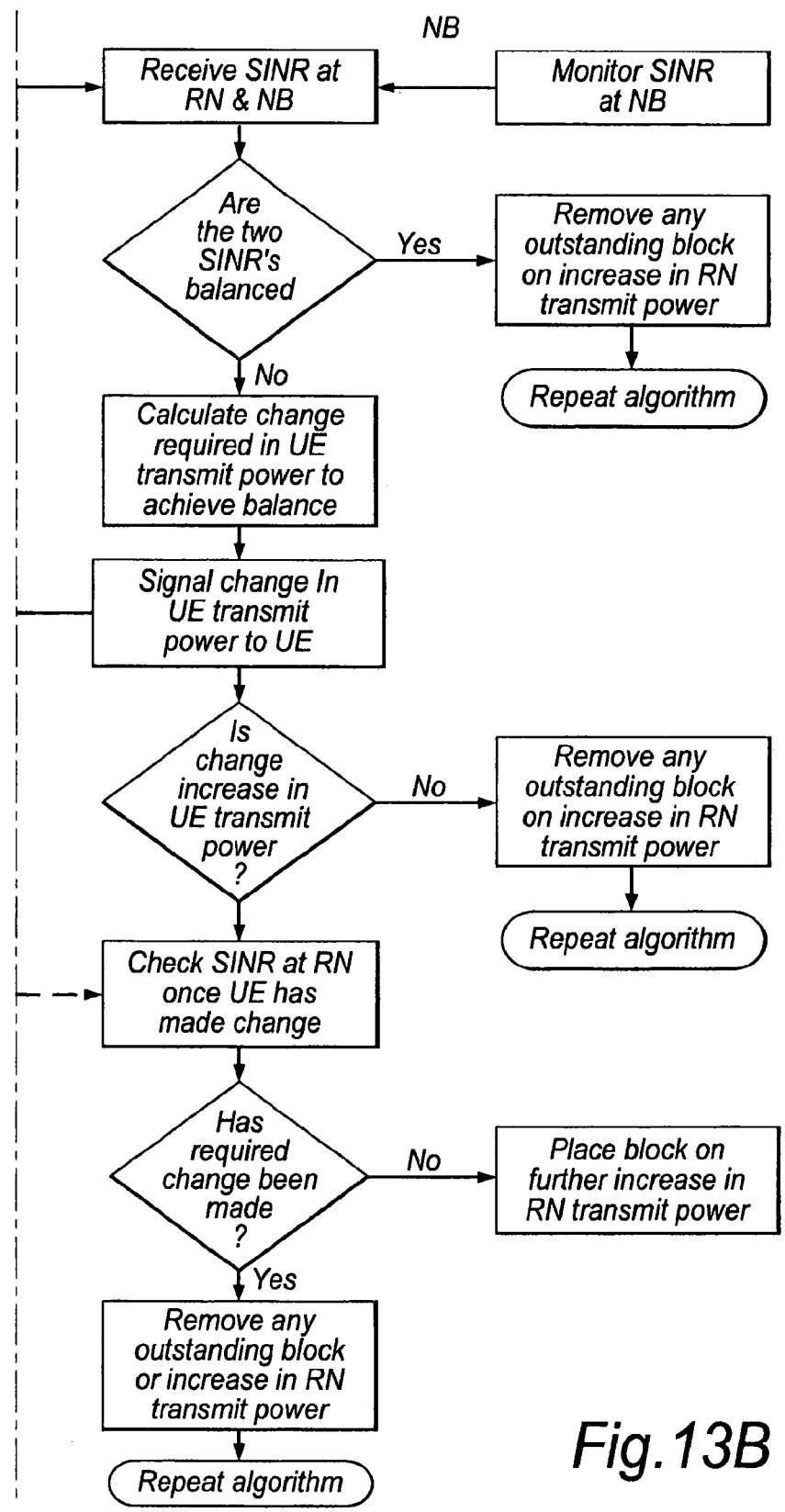

The algorithm described above will manage the case of the propagation loss varying between the RN and NB and the case of the NB modifying its target RSS or SINR. In order to handle the case of the propagation loss varying between the UE and RN and the case that both the target in the NB and the propagation loss between the RN and NB varies, such that no request for change in RN transmit power is generated, an algorithm which implements a second embodiment of the fourth aspect of the present invention operates periodically as discussed below (FIG. 13)

The details of the algorithm are summarised as follows:

| Uplink Algorithm 3: Part 2 Trigger: Periodically executed in NB | | |
|---|---|---|
| Algorithm Input | Required by | Origin |
| SINR at NB | NB | Known at NB |
| SINR at RN | NB | Signalled from RN |
| Algorithm Output | Derivation | Destination & Signalling Requirement |
| Change in UE transmit power | Relative change | Signalled to UE via RN |
| Block on RN power increase | True/false test | Part 1 of the algorithm |

This algorithm is executed periodically in addition to the algorithm discussed above with reference to FIG. 12. Alternatively, it is also possible for this algorithm to be implemented separately in a wireless multi-hop communication system.

The algorithm assumes that indicators of the SINR at the NB and RN are reported to the NB.

1. The NB monitors the indicators of the SINR from both the NB and RN. Then:

1a. if these are found to vary such that they are imbalanced, a control means of the NB determines the change in transmit power of the UE that is required to restore a balance in SINR; or 1b. If these are found to be balanced, a control means of the NB lifts any existing prohibition on an increase in the transmit power of the RN.

2. The control means issues a command to the UE, via the intermediate apparatus, commanding a change in the transmit power of the UE.

3. The UE receives the command from the NB and determines if it can carry out the required change in transmit power. Then:

3a. If it is determined that the UE cannot carry out the required change, the UE determines a revised change in transmit power and changes its transmit power in accordance with this revised change; or 3b. If it is determined that the UE can carry out the required change, the UE changes its transmit power in accordance with the required change.

4. If the command issued by the control means was for a decrease in the transmit power of the source apparatus, the control means lifts any existing prohibition on an increase in the transmit power of the RN.

5. If the command issued by the control means was for an increase in transmit power, the control means monitors the SINR indicator derived at the intermediate apparatus to determine if the commanded change in transmit power of the source apparatus has been effected. Then:

5a. if it is determined that the change was not effected by the UE, the control means places a prohibition on further increases in the transmit power of the RN; or 5b. If it is determined that the change was effected by the UE, the control means lifts any existing prohibition on an increase in the transmit power of the RN.

Figure 14:
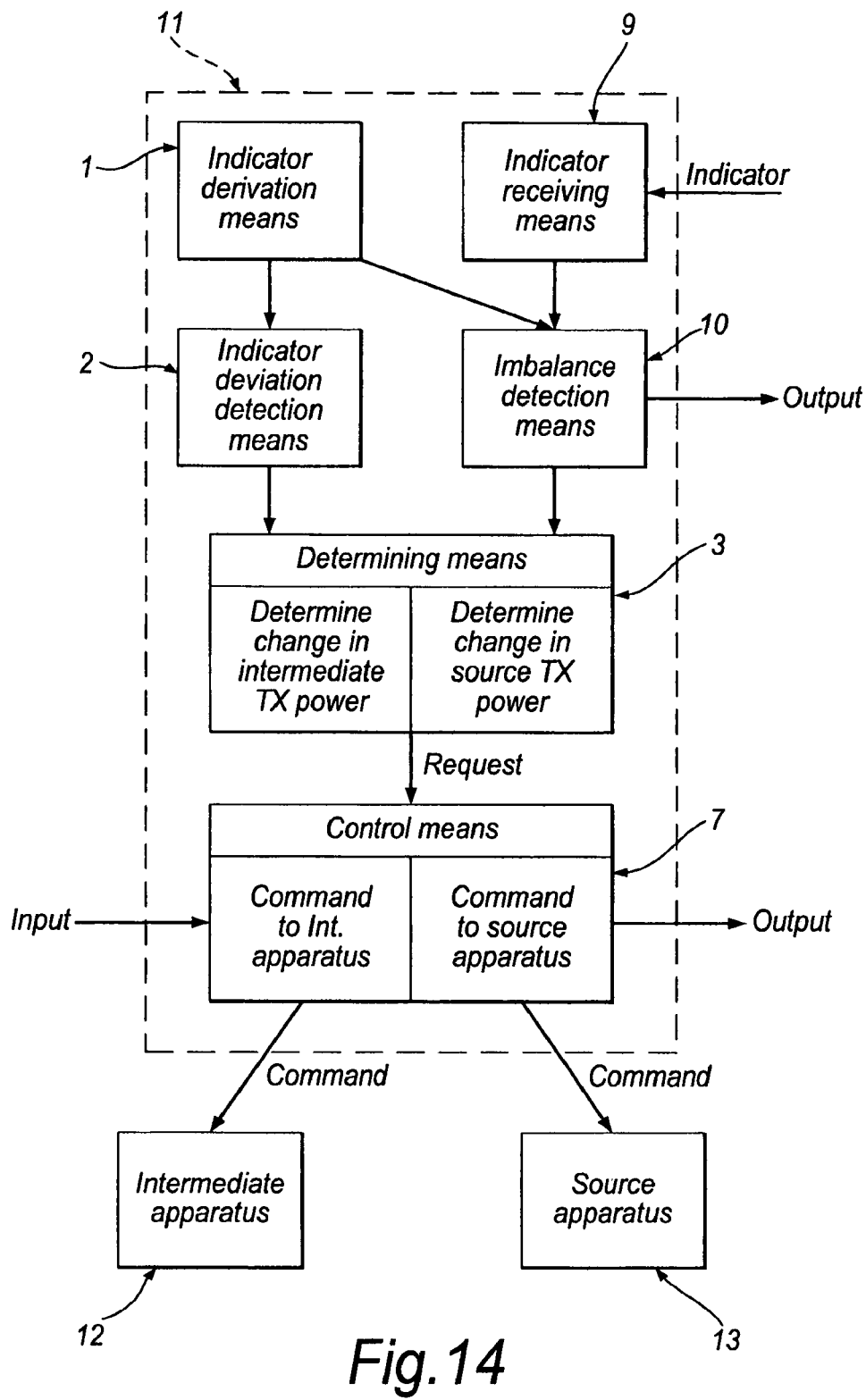
FIG. 14 shows parts of a base station embodying the fourth aspect of the present invention.

FIG. 14 shows parts of a base station, generally designated 11, embodying the fourth aspect of the present invention and comprises:

indicator derivation means (1), operable to derive one or more indicators of the quality of a communication signal received at the base station; indicator deviation detection means (2) operable to detect a change in the, or one of the, indicators derived by the base station; indicator receiving means (9), operable to receive an indicator derived by the intermediate apparatus;

imbalance detection means (10) operable to detect an imbalance between an indicator derived by the indicator derivation means and an indicator received by the indicator receiving means;

determining means (3), operable to determine a change in the transmit power of the intermediate apparatus and/or a change in the transmit power of the source apparatus, as the case may be, following detection of an indicator change by the indicator deviation detection means (2) and/or following detection of an imbalance by the imbalance detection means (10); and control means (7), operable to receive a request from the determining means and, subject to various checks being performed by the control means, to issue a command to the intermediate apparatus and/or the source apparatus, as the case may be, commanding a change in the transmit power of the intermediate apparatus and/or the source apparatus respectively.

Following the detection of an imbalance and the issuance of a command to the source apparatus for an increase in the transmit power of the source apparatus, the control means (8) is operable to prohibit an increase in the transmit power of the intermediate apparatus (output) if it is detected by the control means that the command for an increase in the transmit power of the source apparatus was not met. Then, following the detection of a change in the indicator derived by the base station, and prior to issuing a command to the intermediate apparatus for an increase in the transmit power of the intermediate apparatus, the control means is operable to check (input) if any prohibition has been placed on increases in the transmit power of the intermediate apparatus.

Figure 15A:
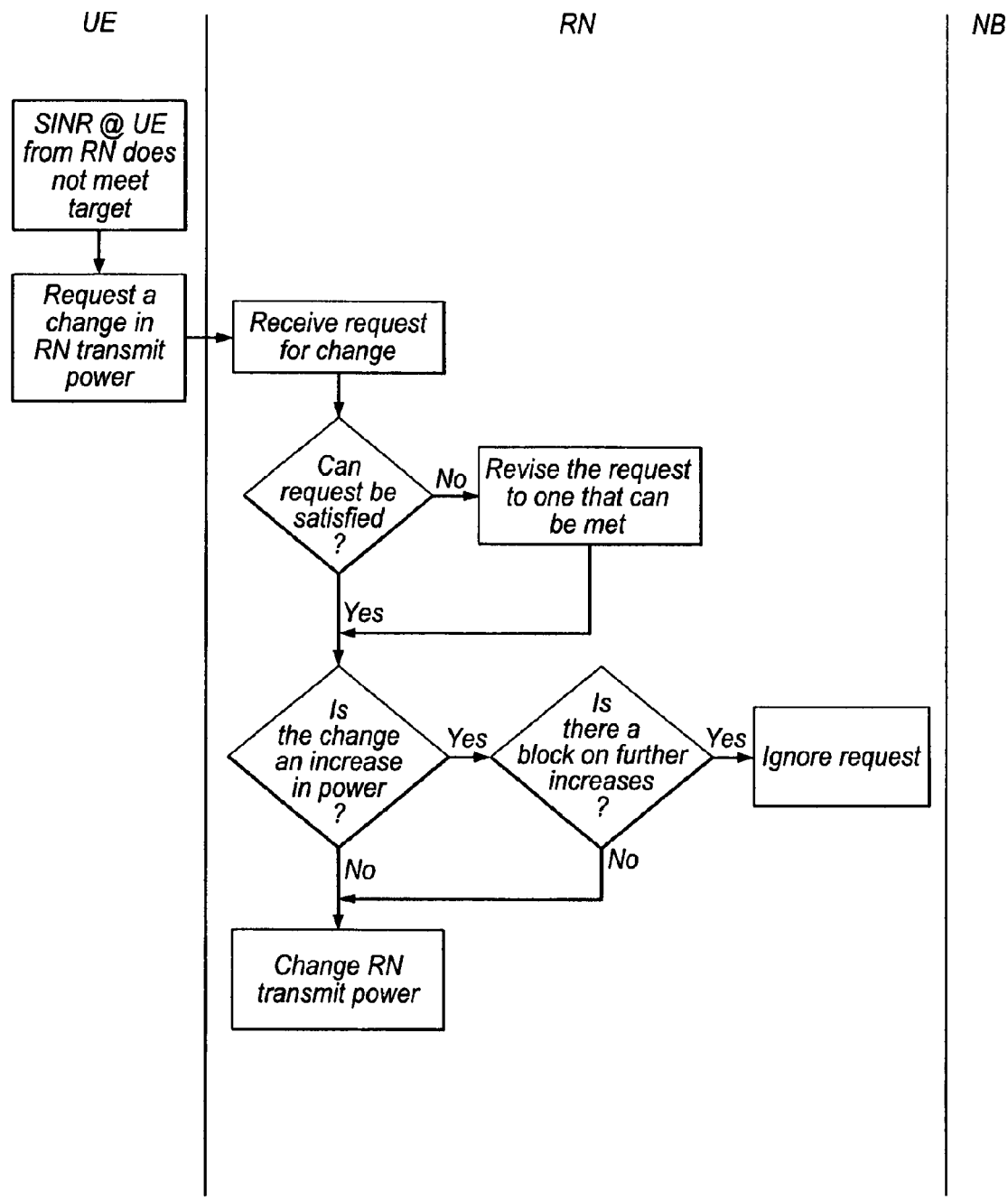
FIGS. 15A and 15B illustrate a first algorithm embodying the fifth aspect of the present invention.

An example of an algorithm which implements an embodiment of the fifth aspect of the present invention will now be described with reference to FIG. 15A in the case of downlink transmission in which the source apparatus comprises a node-B (NB), the intermediate apparatus comprises a relay node (RN) which is of the regenerative type, and the destination apparatus comprises a user equipment (UE). The user equipment continually monitors the SINR and derives indicators of the SINR and the variation from target SINR. The destination apparatus is provided with an indicator deviation detection means for detecting a change in one or both of these indicators. The intermediate apparatus is provided with a control means according to an embodiment of the fifth aspect of the present invention.

The details of the algorithm are summarised as follows:

| Downlink Algorithm 3: Part 1 Trigger: RN receives request for change in RN transmit power from UE | | |
|---|---|---|
| Algorithm Input | Required by | Origin |
| Request for change in RN Transmit Power | RN | Change derived in UE and processed by RN |
| Block in increase in RN Transmit Power | RN | Block is set/cleared in part 2 of the algorithm |
| Algorithm Output | Derivation | Destination & Signalling Requirement |
| Change in RN transmit power | Relative change | Relative change derived at UE and made by RN |

The following sequence takes place following detection of a change in an indicator derived by the destination apparatus (UE) from a desired value which in this case is the target SINR. The destination apparatus (UE), following detection of a change, determines the change in the transmit power of the intermediate apparatus which will tend bring the indicator derived by the destination apparatus back to said desired value. Then:

1. The destination apparatus (UE) transmits a request for a change in the RN transmit power to the RN;
2. The RN checks whether the request can be satisfied. If the received request cannot be satisfied by the RN then it is modified to one that can be met.
3. If the requested change in transmit power of the RN is an increase, then a check is made to determine whether a block, or prohibition, has been placed on further increases. In this embodiment, the block is placed by the algorithm illustrated by FIG. 15B which is a second embodiment of the fifth aspect of the present invention. If a block is in place then the request is ignored, otherwise the RN transmit power is changed accordingly.

Figure 15B:
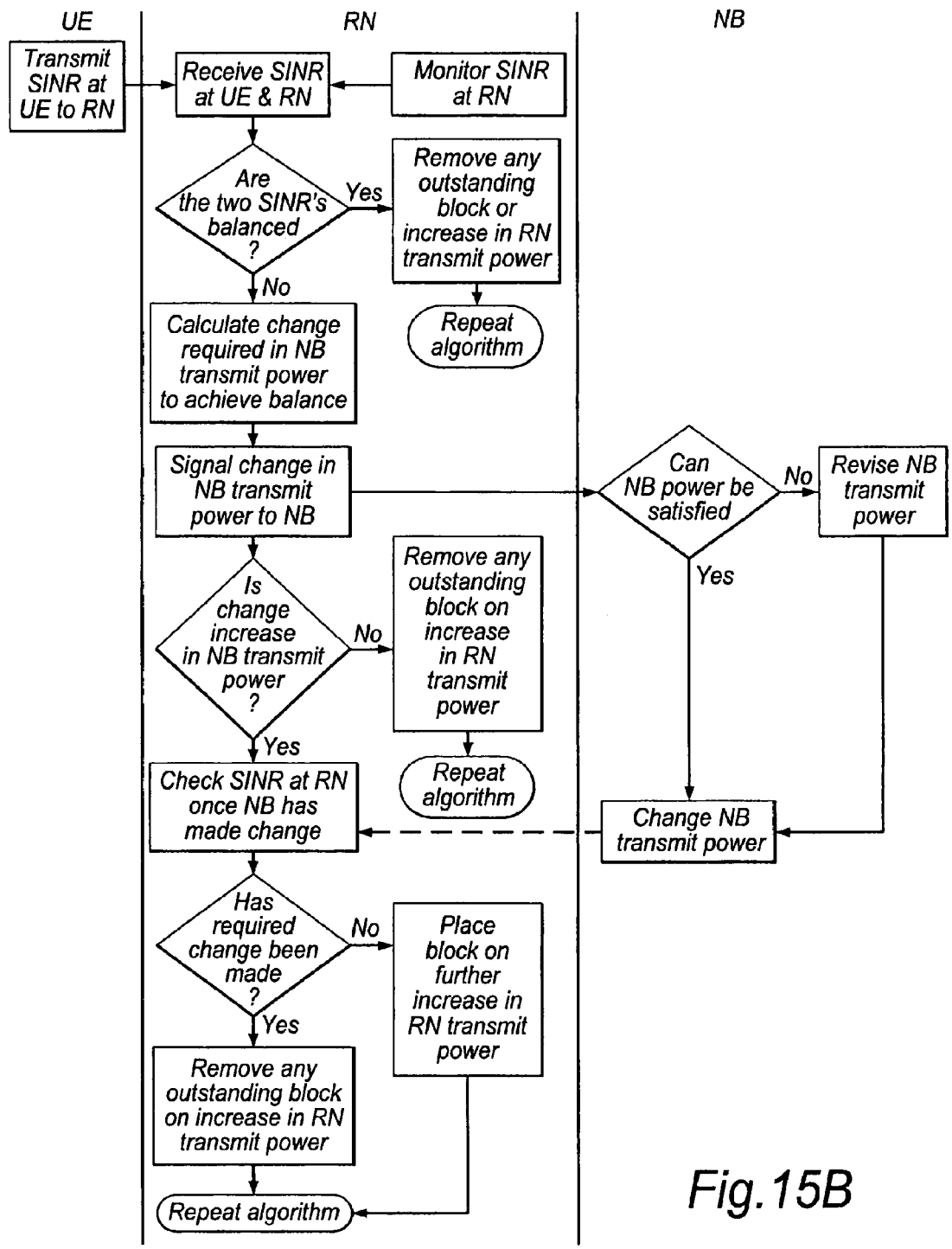

The algorithm described above will manage the case of the propagation loss varying between the RN and UE and the case of the UE modifying its target RSS or SINR. In order to handle the case of the propagation loss varying between the NB and RN and the case that both the target in the UE and the propagation loss between the RN and UE varies, such that no request for change in RN transmit power is generated, an algorithm as shown in FIG. 15B which implements another embodiment of the fifth aspect of the present invention operates periodically as discussed below.

In this embodiment, the following algorithm is executed in addition to the algorithm discussed above with reference to FIG. 15A. Thus, the intermediate apparatus comprises indicator derivation means for deriving an indicator of the RN. The intermediate apparatus further comprises imbalance detection means and a second determining means according to an embodiment of the fifth aspect of the present invention. Alternatively, it is also possible for the algorithm described with reference to FIG. 15A, or the following algorithm shown in FIG. 15B, to be implemented separately in a wireless multi-hop communication system.

The details of the algorithm are summarised as follows:

| Downlink Algorithm 3: Part 2 Trigger: Periodically executed in RN | | |
|---|---|---|
| Algorithm Input | Required by | Origin |
| SINR at UE | RN | Signalled from UE |
| SINR at RN | RN | Known at RN |
| Algorithm Output | Derivation | Destination & Signalling Requirement |
| Change in NB transmit power | Relative change | Signalled to NB |
| Block on RN power increase | True/false test | Part 1 of the algorithm |

1. The RN monitors the reported SINR from both the UE and the SINR at the RN. If an imbalance exists then the second determining means of the RN calculates the change in NB transmit power that is required to restore a balance in SINR.
2. The RN then signals a command to the NB for a change in the transmit power of the NB according to the change determined in step 1.
3. The NB receives the request and checks that the request can be met. If it can not then it is revised. The NB then changes its transmit power accordingly.
4. If the request from the RN was for an increase in NB transmit power then the RN monitors the received SINR to check that the required change was made. If it is detected that the required change was not made then a block, or prohibition, is placed on further increases in RN transmit power. If this block was not placed then as the NB cannot increase its transmit power, any increase in RN transmit power will cause an imbalance that cannot be rectified, as this would require a further increase in the NB transmit power, compounding any imbalance.

Note that the block on further RN power increase is removed if: it is detected that the SINRs are balanced; a decrease in NB transmit power is requested; or a requested change in NB transmit power is detected to have been made.

Figure 16A:
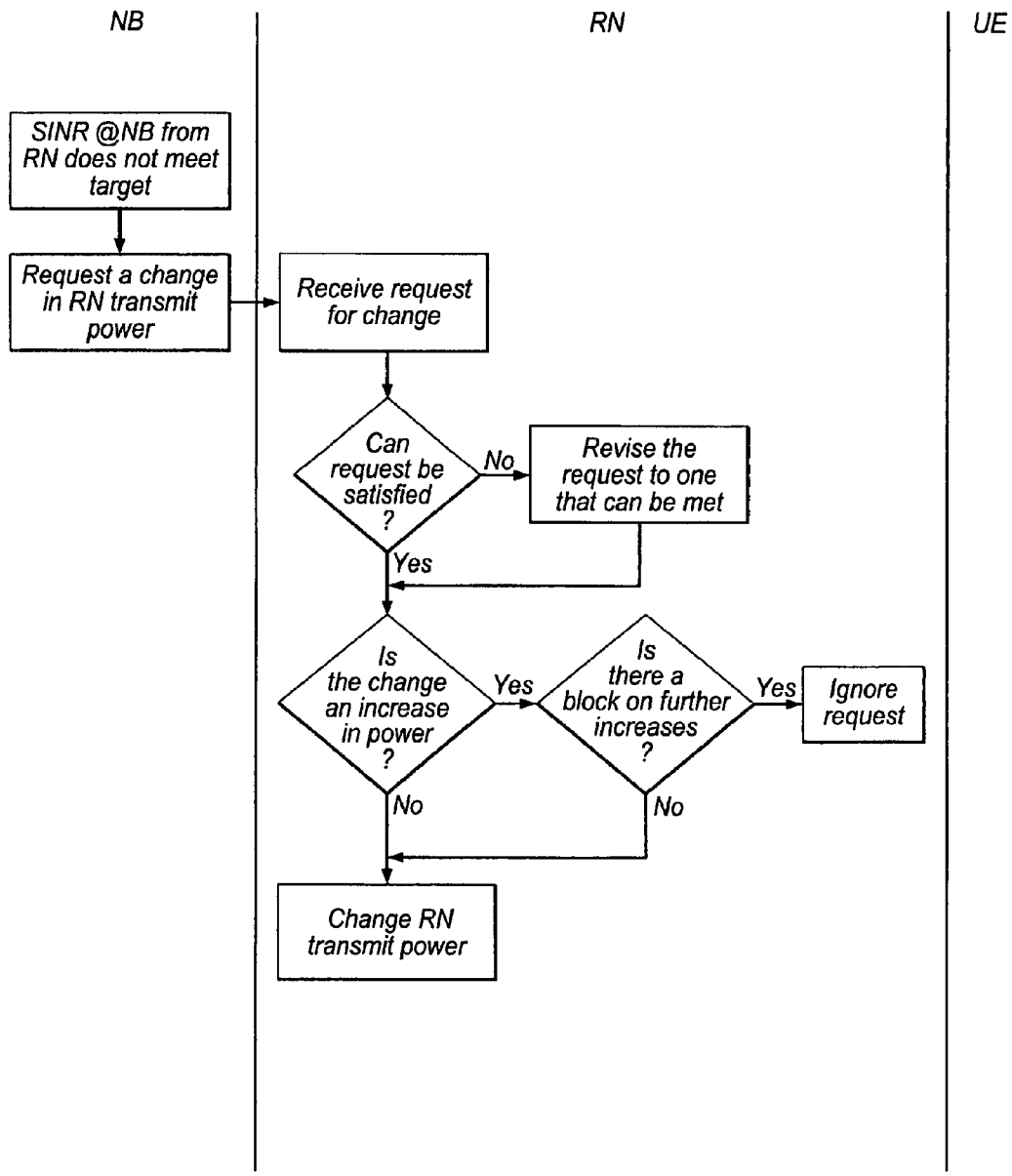
FIGS. 16A and 16B illustrates a second algorithm embodying the fifth aspect of the present invention FIGS. 17A, 17B and 17C which show parts of a communication system embodying the fifth aspect of the present invention

Another embodiment of the fifth aspect of the present invention will now be described with reference to FIG. 16A in the case of uplink transmissions in which the source apparatus comprises a user equipment (UE), the intermediate apparatus comprises a relay node (RN) which is of the regenerative type, and the destination apparatus comprises a Node-B (NB). The NB continually monitors the SINR and derives indicators of the SINR and the variation from target SINR. The NB is provided with an indicator deviation detection means for detecting a change in one or both of these indicators. The intermediate apparatus is provided with a control means according to an embodiment of the fifth aspect of the present invention.

The details of the algorithm are summarised as follows:

| Uplink Algorithm 4: Part 1 Trigger: RN receives request for change in RN transmit power from NB | | |
|---|---|---|
| Algorithm Input | Required by | Origin |
| Request for change in RN Transmit Power | RN | Change derived in NB and processed by RN |
| Block in increase in RN Transmit Power | RN | Block is set/cleared in part 2 of the algorithm |
| Algorithm Output | Derivation | Destination & Signalling Requirement |
| Change in RN transmit power | Relative change | Relative change derived at NB and made by RN |

The following sequence takes place following detection of a change in an indicator derived by the destination apparatus (NB) from a desired value. The destination apparatus (NB), following detection of a change, determines the change in the transmit power of the intermediate apparatus which will tend bring the indicator derived by the destination apparatus back to said desired value. Then:

1. The destination apparatus (NB) transmits a request for a change in the RN transmit power to the RN;
2. The RN checks whether the request can be satisfied. If the received request cannot be satisfied by the RN then it is modified to one that can be met.
3. If the requested change in transmit power of the RN is an increase, then a check is made to determine whether a block, or prohibition, has been placed on further increases. In this embodiment, the block is placed by the algorithm illustrated by FIG. 15B which embodies the second aspect of the present invention. If a block is in place then the request is ignored, otherwise the RN transmit power is changed accordingly.

Figure 16B:
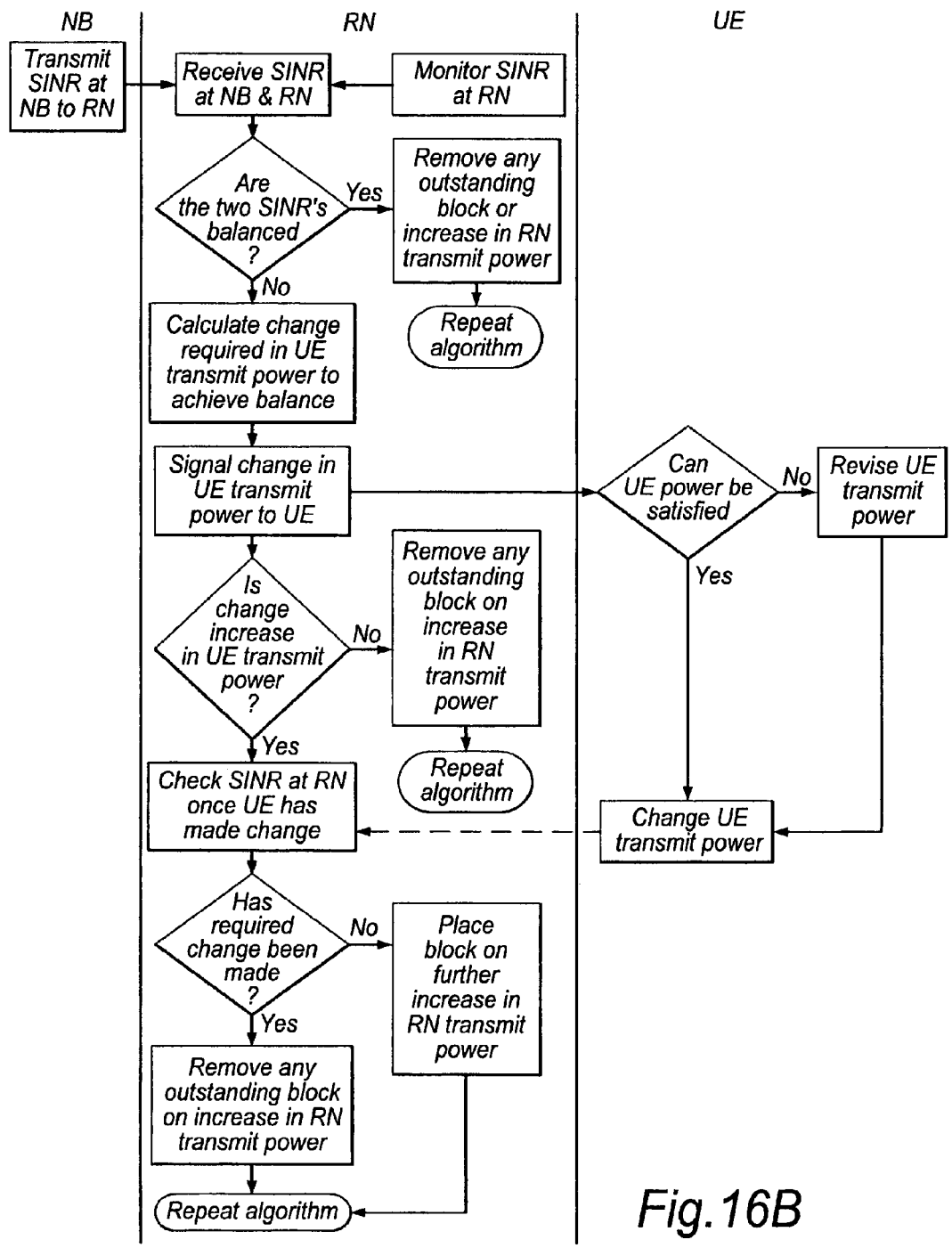

The algorithm described above with reference to FIG. 16A will manage the case of the propagation loss varying between the RN and NB and the case of the NB modifying its target RSS or SINR. In order to handle the case of the propagation loss varying between the UE and RN and the case that both the target in the NB and the propagation loss between the RN and NB varies, such that no request for change in RN transmit power is generated, an algorithm as shown in FIG. 16B which implements a further embodiment of the fifth aspect of the present invention operates periodically as discussed below.

In this embodiment, the following algorithm is executed in addition to the algorithm discussed above with reference to FIG. 16A. Thus, the intermediate apparatus comprises indicator derivation means for deriving an indicator of the RN. The intermediate apparatus further comprises imbalance detection means and a second determining means according to an embodiment of the second aspect of the present invention. Alternatively, it is also possible for the algorithm described with reference to FIG. 16A, or the following algorithm shown in FIG. 16B to be implemented separately in a wireless multi-hop communication system.

The details of the algorithm are summarised as follows:

| Uplink Algorithm 4: Part 2 Trigger: Periodically executed in RN | | |
|---|---|---|
| Algorithm Input | Required by | Origin |
| SINR at NB | RN | Signalled from NB |
| SINR at RN | RN | Known at RN |
| Algorithm Output | Derivation | Destination & Signalling Requirement |
| Change in UE transmit power | Relative change | Signalled to UE |
| Block on RN power increase | True/false test | Part 1 of the algorithm |

1. The RN monitors the reported SINR from both the NB and the SINR at the RN. If an imbalance exists then the second determining means of the RN calculates the change in UE transmit power that is required to restore a balance in SINR.
2. The RN then signals a command to the UE for a change in the transmit power of the UE according to the change determined in step 1.
3. The UE receives the request and checks that the request can be met. If it can not then it is revised. The UE then changes its transmit power accordingly.
4. If the request from the RN was for an increase in UE transmit power then the RN monitors the received SINR to check that the required change was made. If it is detected that the required change was not made then a block, or prohibition, is placed on further increases in RN transmit power.

Note that the block on further RN power increase is removed if: it is detected that the SINRs are balanced; a decrease in UE transmit power is requested; or a commanded change in UE transmit power is detected to have been made.

Figure 17A:
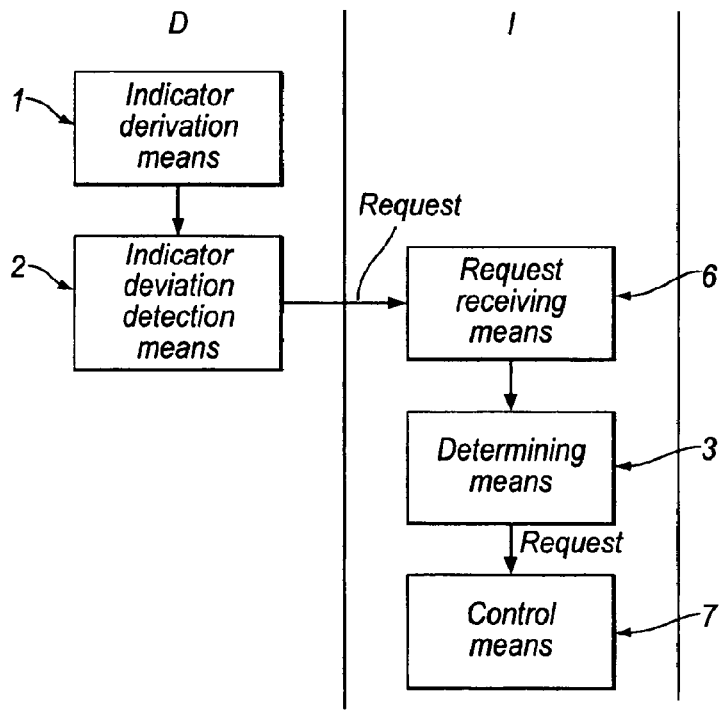
Figure 17B:
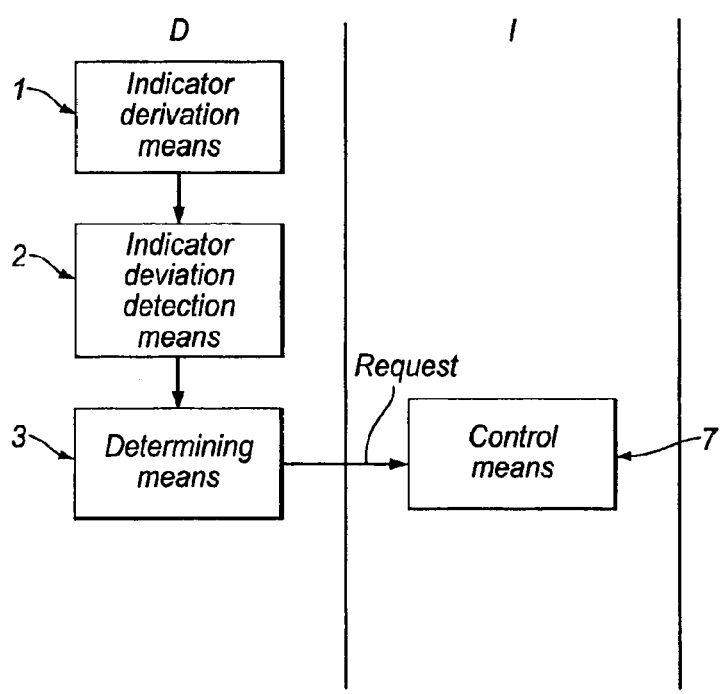
Figure 17C:
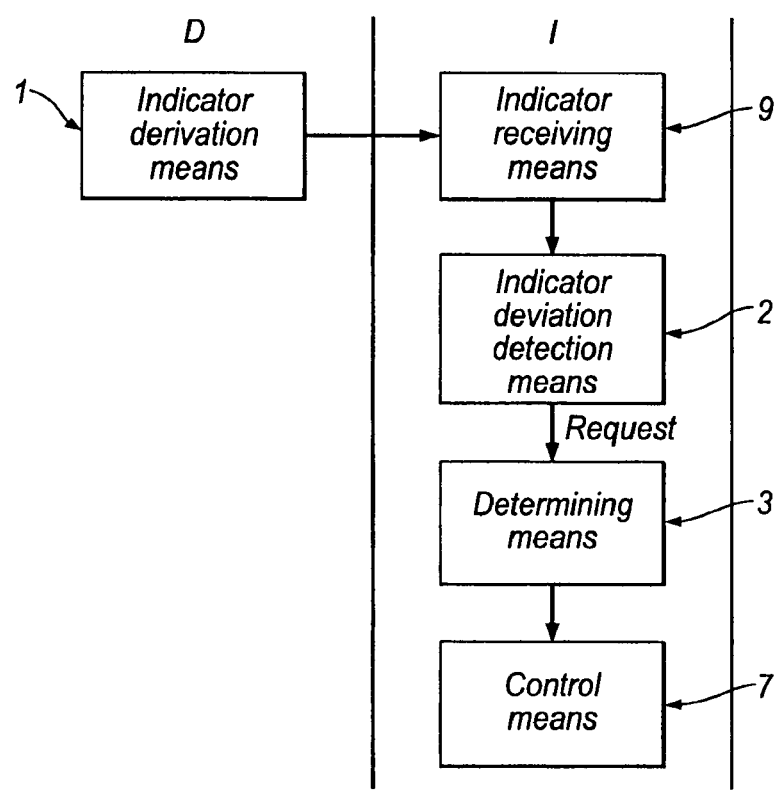

There are a number of ways in which the signalling required to carry out embodiments of the fifth aspect of the present invention may be implemented and these are illustrated in FIGS. 17A, 17B and 17C which show parts of a communication system embodying the fifth aspect of the present invention in which the same reference numerals are used to refer to parts which provide the same function.

FIG. 17A shows a communication system in which the destination apparatus (D) is provided with an indicator derivation means (1), an indicator deviation detection means (2) and is operable, following detection of a change in the indicator derived by the destination apparatus, to transmit a request for a determination of a change in the transmit power of the intermediate apparatus to the intermediate apparatus. The intermediate apparatus (I) comprises a request receiving means (6) and a determining means (3) which is operable to determine a change in the transmit power of the intermediate apparatus that will tend to bring said indicator derived by the destination apparatus towards said desired value. Thus, said request for a change in the transmit power of the intermediate apparatus is transmitted locally from said determining means of the source apparatus to said control means (7) of the intermediate apparatus.

FIG. 17B shows a communication system wherein, in addition to an indicator derivation means (1), the destination apparatus is provided with an indicator deviation (2) detection means and a determining means (3). Thus, said request is transmitted from the determining means of the destination apparatus to the control means (7) of the intermediate apparatus.

FIG. 17C shows a communication system in which the intermediate apparatus (I) comprises an indicator receiving means (9), an indicator deviation detection means (2), a determining means (5) and a control means (7). Thus, said request for a change in the transmit power of the intermediate apparatus is transmitted locally from said determining means of the source apparatus to said control means (7) of the source apparatus.

It can be seen from FIGS. 17A, 17B and 17C that an intermediate apparatus provided according to an embodiment of the fifth aspect of the present invention may comprise: i) a control means; ii) a determining means and a control means; or iii) an indicator deviation detection means, a determining means and a control means. Similarly a destination apparatus provided in accordance with an embodiment of the fifth aspect of the present invention may comprise, indicator derivation means; indicator derivation means and indicator deviation detection means; or indicator derivation means, indicator deviation detection means and determining means.

An example of a communication system according to an embodiment of the sixth aspect of the present invention will now be described with reference to FIG. 18A in which the source apparatus comprises a node-B (NB), the intermediate apparatus comprises a relay node (RN) and the destination apparatus comprises a user equipment (UE). Embodiments of the sixth aspect of the present invention seek to attain or maintain a balance between the QoS experienced on each of the communication links of a multi-hop communication system by adjusting the bandwidth allocated to one or more of the transmitters. The determination of the required bandwidth allocation or the change in the required bandwidth allocation is carried out in parts associated with the NB.

The present embodiment seeks to attain or maintain a balance between the QoS experienced on the DL communication links (NB-RN and RN-UE) by adjusting the bandwidth allocated to the RN-UE communication link.

The details of the algorithm are summarised as follows:

| Downlink Algorithm 1A: Part 1 (Centralised with UE QoS derived in UE) Trigger: RN receives request for change in BW allocated by RN from UE | | |
|---|---|---|
| Algorithm Input | Required by | Origin |
| Request for change in BW allocation at RN | NB | Change derived in UE, modified at RN and signalled to NB |
| QoS/SINR at UE (see part 2) | NB | |
| QoS/SINR at RN (see part 2) | NB | |
| Algorithm Output | Derivation | Destination & Signalling Requirement |
| Change in RN BW allocation | Relative change | Derived at UE, checked by RN, approved by NB and actioned by RN |

The following sequence takes place following deviation of a change in an indicator of the QoS derived for the destination apparatus from a desired value, which in this case is the target QoS of the destination apparatus, in order to determine a change in the bandwidth allocated to the transmitter of the intermediate apparatus which will tend bring the indicator derived for the destination apparatus back to said desired value.
1. The destination apparatus detects a change in an indicator of QoS or in an indicator of the variation from target QoS such that the QoS at the destination apparatus does not meet its target.
2. The destination apparatus transmits a request for a change in the RN bandwidth allocation to the RN;
3. The RN determines if it can satisfy this request.
   3a. If the request can be satisfied, it is propagated to the NB; or
   3b. If it cannot be satisfied, the RN determines a revised request and propagates this to the NB.
4. A control means provided in the NB receives a request for a change in the bandwidth allocated to the RN for the RN-UE communication link.
5. The NB receives an input signal comprising an indication of the QoS at the UE and the QoS at the RN and determines if an imbalance exists between the QoS at the UE and the QoS at the RN.
   5a. If an imbalance exists and the requested change in the bandwidth allocated to the RN will compound such an imbalance between the QoS at the UE and the QoS at the RN, the control means ignores said request; or
   5b. If no imbalance exists, or if an imbalance exists but the requested change in the bandwidth allocated to the RN will not compound such an imbalance between the QoS at the UE and the QoS at the RN, the control means issues a command to the RN, commanding a change in the bandwidth allocation at the RN;
6. The RN receives a command from the control means of the NB and adjusts its bandwidth in accordance with the command.

Figure 18A:
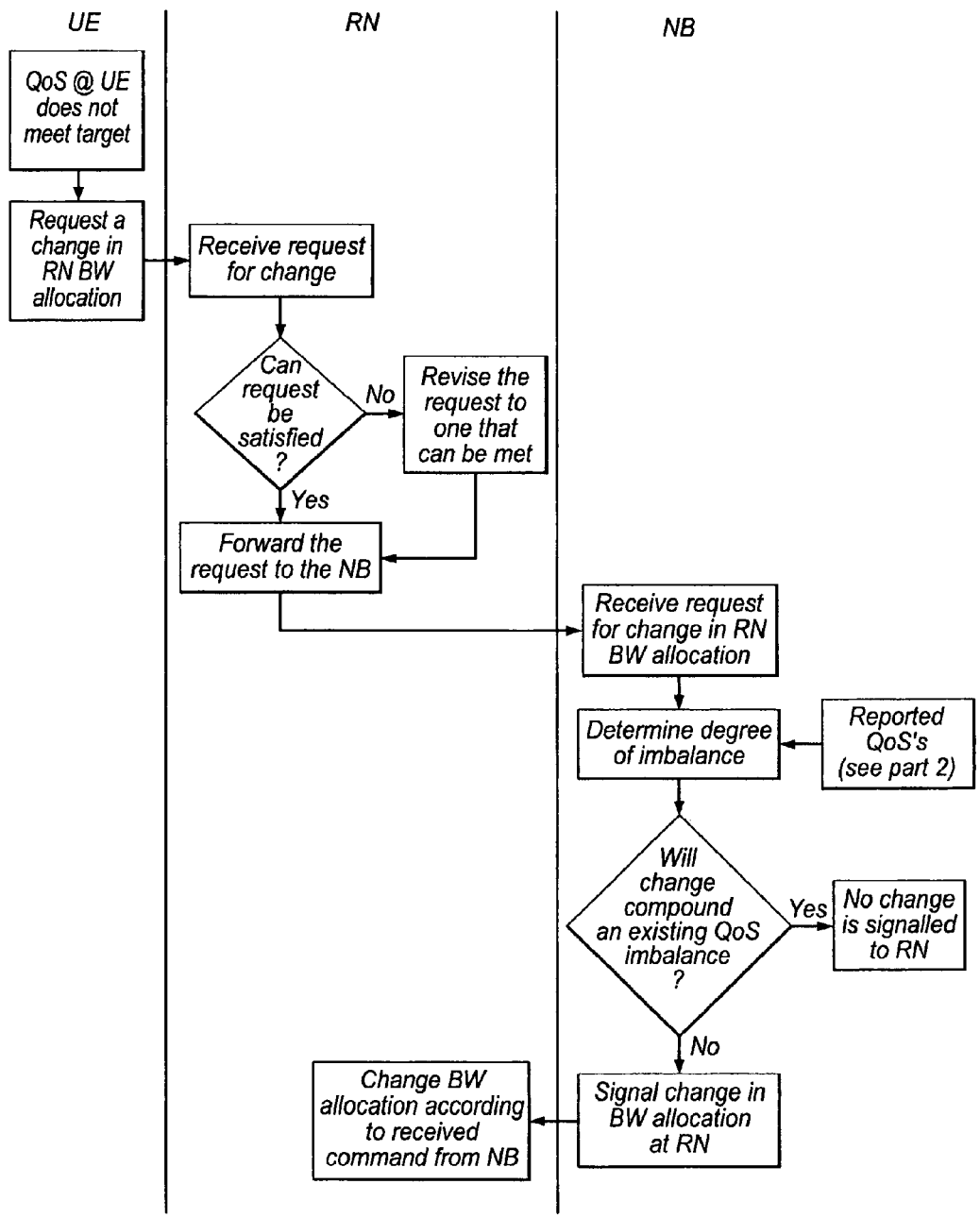
FIGS. 18A, 18B and 18C illustrate algorithms according to a first embodiment of the sixth aspect of the present invention.

According to the algorithm shown in FIG. 18A, the destination user equipment continually monitors the QoS and derives indicators of the QoS and the variation from target QoS.

Figure 18B:
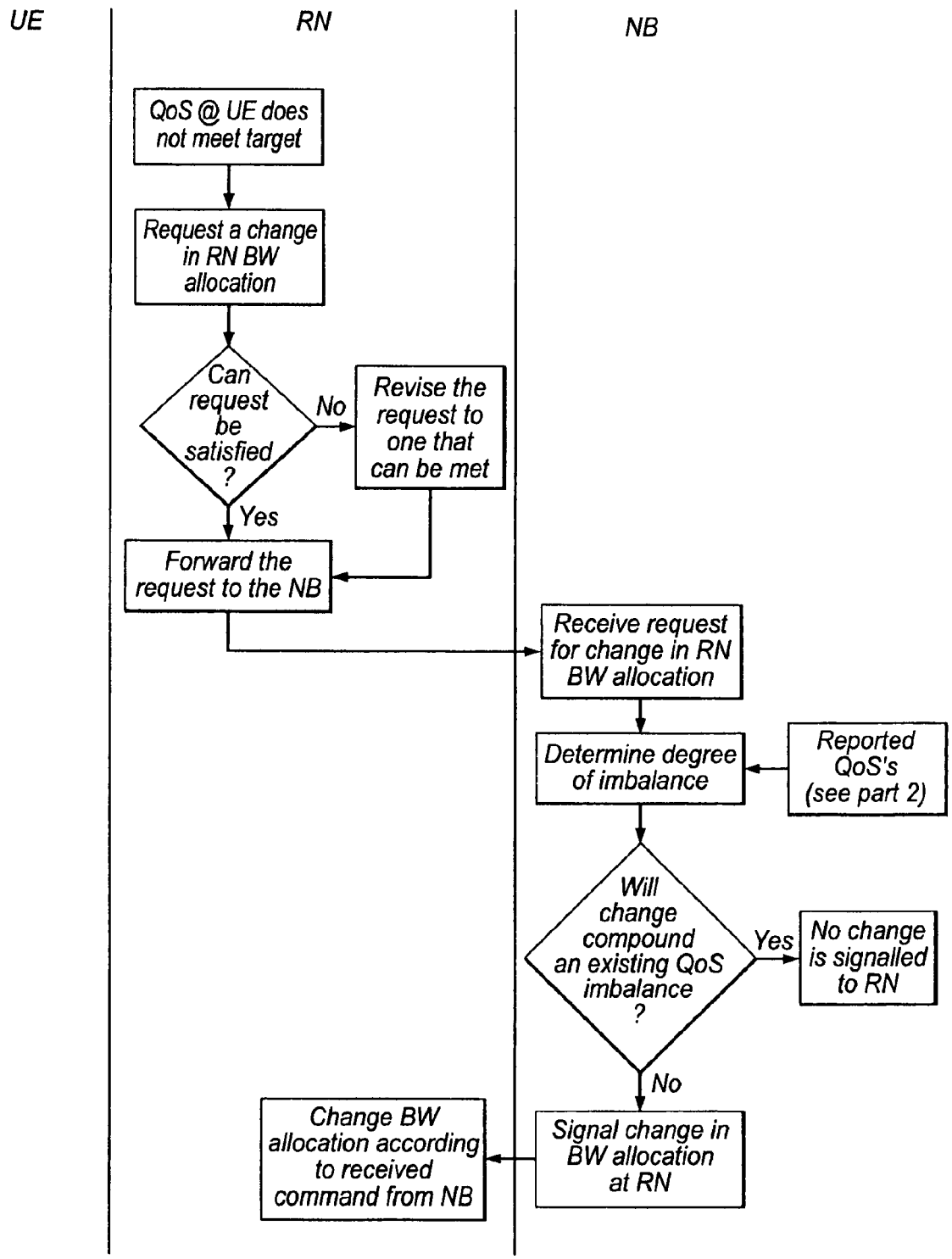

FIG. 18B shows an algorithm which is similar to the algorithm described above with reference to FIG. 18A and which may be implemented in a multi-hop communication system instead of the algorithm shown in FIG. 18A. The details of this algorithm may be summarised as follows:

| Downlink Algorithm 1B: Part 1 (Centralised with UE QoS derived at RN) Trigger: RN generates a request for change in BW allocated by RN to the UE | | |
|---|---|---|
| Algorithm Input | Required by | Origin |
| Request for change in BW allocation at RN | NB | Change derived in RN, modified at RN and signalled to NB |
| QoS/SINR at UE (see part 2) | NB | |
| QoS/SINR at RN (see part 2) | NB | |
| Algorithm Output | Derivation | Destination & Signalling Requirement |
| Change in RN BW allocation | Relative change | Derived at RN, checked by RN, approved by NB and actioned by RN |

The difference between the algorithms shown in FIGS. 18A and 18B is that instead of the QoS indicator being derived through direct measurements made by the receiving entity UE (as in FIG. 18A) the QoS indicator for the RN to UE link is derived remotely at the RN.

Figure 18C:
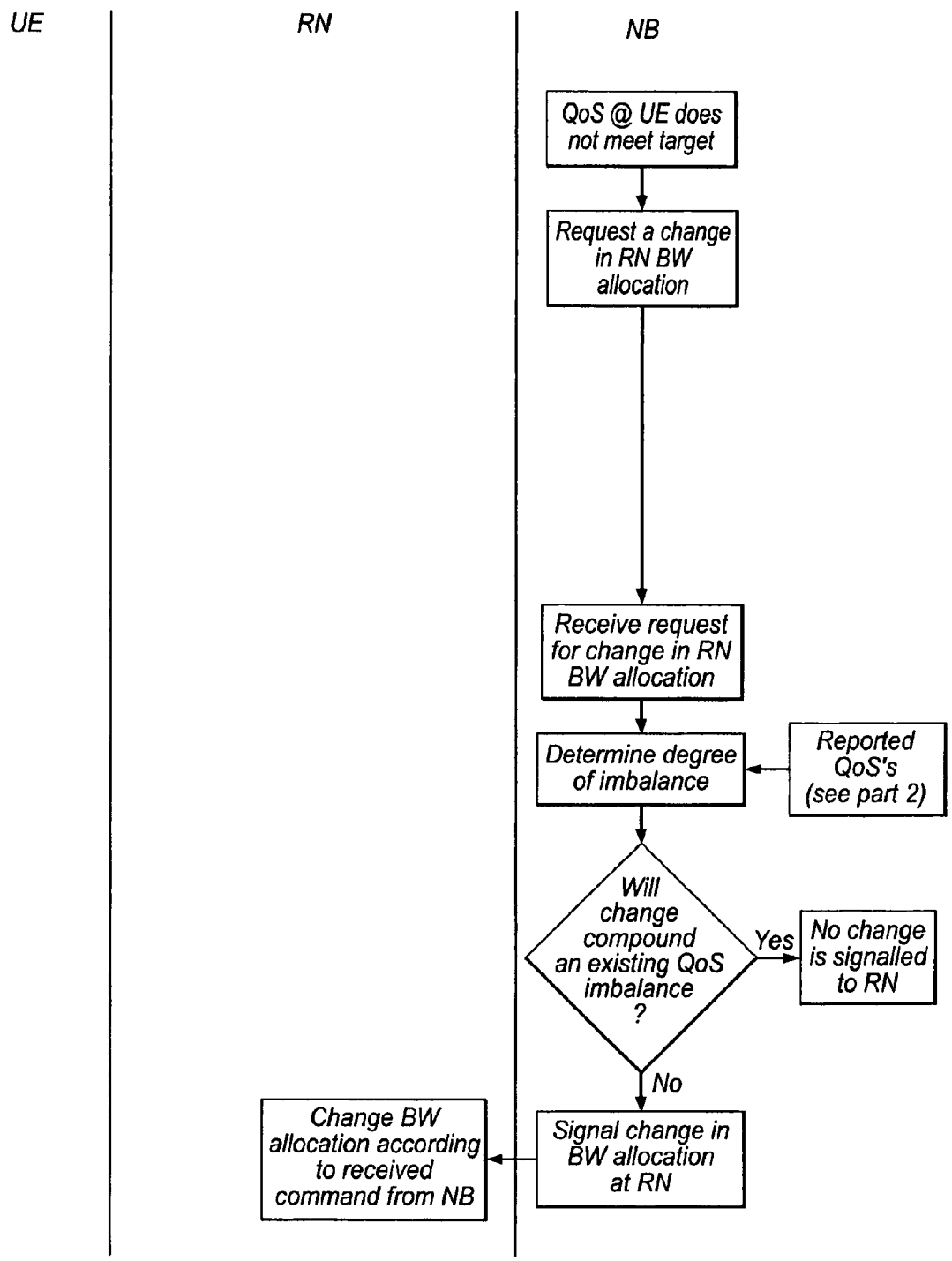

As a further alternative as shown in FIG. 18C, the QoS indicator for the RN to UE link may be derived remotely at the NB. The details of the algorithm shown in FIG. 18C may be summarised as follows:

| Downlink Algorithm 1C: Part 1 (Centralised with UE QoS derived at NB) Trigger: NB generates a request for change in BW allocated by RN to the UE | | |
|---|---|---|
| Algorithm Input | Required by | Origin |
| Request for change in BW allocation at RN | NB | Change derived in NB and signalled to NB |
| QoS/SINR at UE (see part 2) | NB | |
| QoS/SINR at RN (see part 2) | NB | |
| Algorithm Output | Derivation | Destination & Signalling Requirement |
| Change in RN BW allocation | Relative change | Derived at NB, approved by NB and actioned by RN |

Any one of the algorithms described with reference to FIG. 18A, 18B or 18C will manage the case of the propagation loss varying between the RN and UE and the case of the UE modifying its target QoS. In order to handle the case of the propagation loss varying between the NB and RN and the case that both the target in the UE and the propagation loss between the RN and UE varies, such that no request for change in RN bandwidth allocation is generated, an algorithm which implements a second embodiment of the sixth aspect of the present invention operates periodically, as discussed below, with reference to FIG. 19A.

The details of the algorithm according to the second embodiment are summarised as follows:

| Downlink Algorithm 1A: Part 2 (Centralised with UE & RN QoS reported to NB) Trigger: Periodically executed in NB | | |
|---|---|---|
| Algorithm Input | Required by | Origin |
| QoS at UE | NB | Signalled from UE via RN |
| QoS at RN | NB | Signalled from RN |
| Algorithm Output | Derivation | Destination & Signalling Requirement |
| Change in NB BW allocation | Relative change | Used by NB |
| Change in RN BW allocation | Relative change | Change signalled to RN |

According to a preferred embodiment, this algorithm is executed periodically in a multi-hop communication system in addition to either one of the algorithms discussed above with reference to FIGS. 18A, B and C. Alternatively, it is also possible for this algorithm, to be implemented separately in a wireless multi-hop communication system.

Figure 19A:
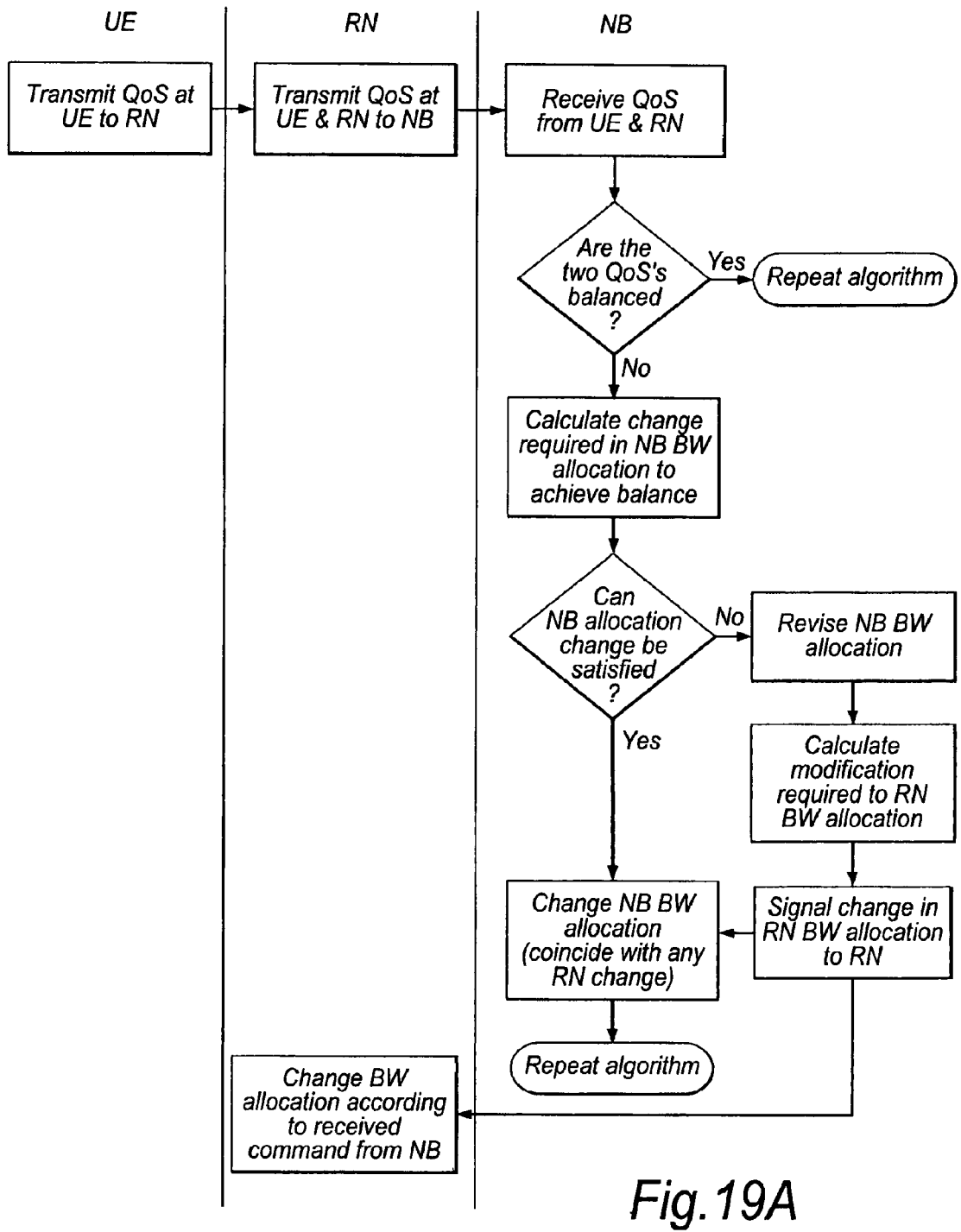
FIGS. 19A, 19B, 19C and 19D illustrate algorithms according to a second embodiment of the sixth aspect of the present invention.

The algorithm shown in FIG. 19A assumes that indicators of the QoS at the UE and RN are reported to the NB.
1. The NB monitors the indicators of the QoS derived for both the UE and the RN. If these are found to vary such that they are imbalanced, a control means of the NB determines the change in NB bandwidth allocation that is required to restore a balance in QoS.
2. The NB determines if it can carry out the required change in bandwidth that will restore balance.
   2a. If it is determined that the NB cannot carry out the required change, the NB determines a revised change in NB bandwidth allocation. The control means issues i) a command to the NB commanding a change in the bandwidth allocated to the NB and ii) a command to the RN commanding a change in the bandwidth allocated to the RN; or
   2b. If it is determined that the NB can carry out the required change, the NB control means issues a (local) command to the NB commanding a change in the bandwidth allocation of the NB.

Figure 19B:
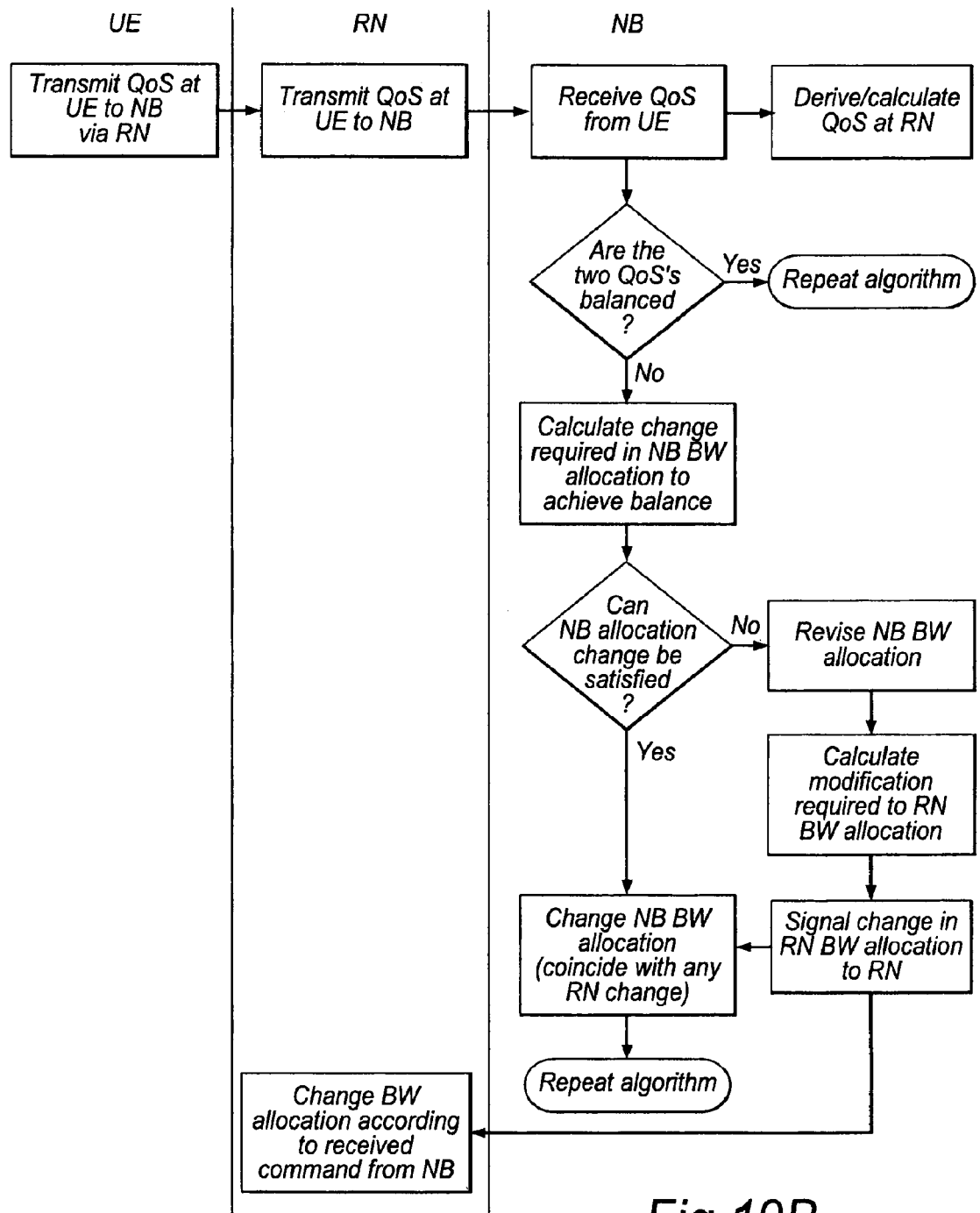

According to the algorithm shown in FIG. 19A, the destination UE and the RN continually monitor the QoS and derive indicators of the QoS. Alternatively, as shown in FIG. 19B, an algorithm may be implemented in which the QoS indicator for the NB to RN link is derived remotely at the NB whilst the QoS indicators for the RN to UE communication link are derived directly at the UE. Thus, the RN merely conveys the QoS indicator derived at the UE for the RN to UE communication link and does not derive any QoS indicators. The details for the algorithm shown in FIG. 19B are summarised as follows:

| Downlink Algorithm 1A: Part 2 (Centralised with UE QoS reported to NB and RN QoS derived in NB) Trigger: Periodically executed in NB | | |
|---|---|---|
| Algorithm Input | Required by | Origin |
| QoS at UE | NB | Signalled from UE via RN |
| QoS at RN | NB | Derived/calculated in NB |
| Algorithm Output | Derivation | Destination & Signalling Requirement |
| Change in NB BW allocation | Relative change | Used by NB |
| Change in RN BW allocation | Relative change | Change signalled to RN |

Figure 19C:
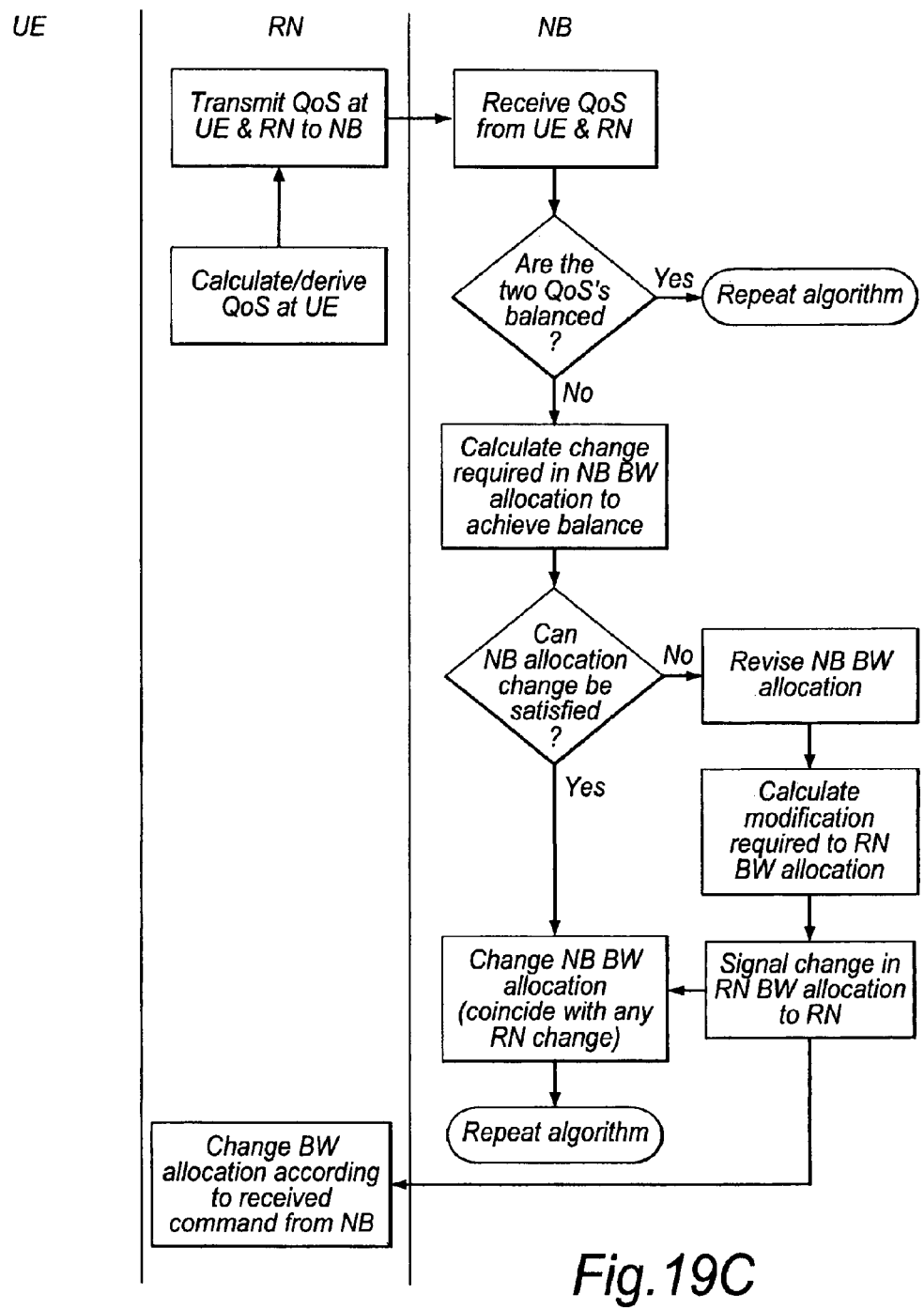

As a further alternative, the UE QoS indicator may be derived remotely at the RN. As shown in FIG. 19C, the RN may be operable to derive QoS indicators for both the communication links terminating at the RN and the UE. The details for the algorithm shown in FIG. 19C may be summarised as follows:

| Downlink Algorithm 1B: Part 2 (Centralised with UE QoS derived in RN) Trigger: Periodically executed in NB | | |
|---|---|---|
| Algorithm Input | Required by | Origin |
| QoS at UE | NB | Derived/calculated at RN and signalled to NB |
| QoS at RN | NB | Signalled from RN |
| Algorithm Output | Derivation | Destination & Signalling Requirement |
| Change in NB BW allocation | Relative change | Used by NB |
| Change in RN BW allocation | Relative change | Change signalled to RN |

Figure 19D:
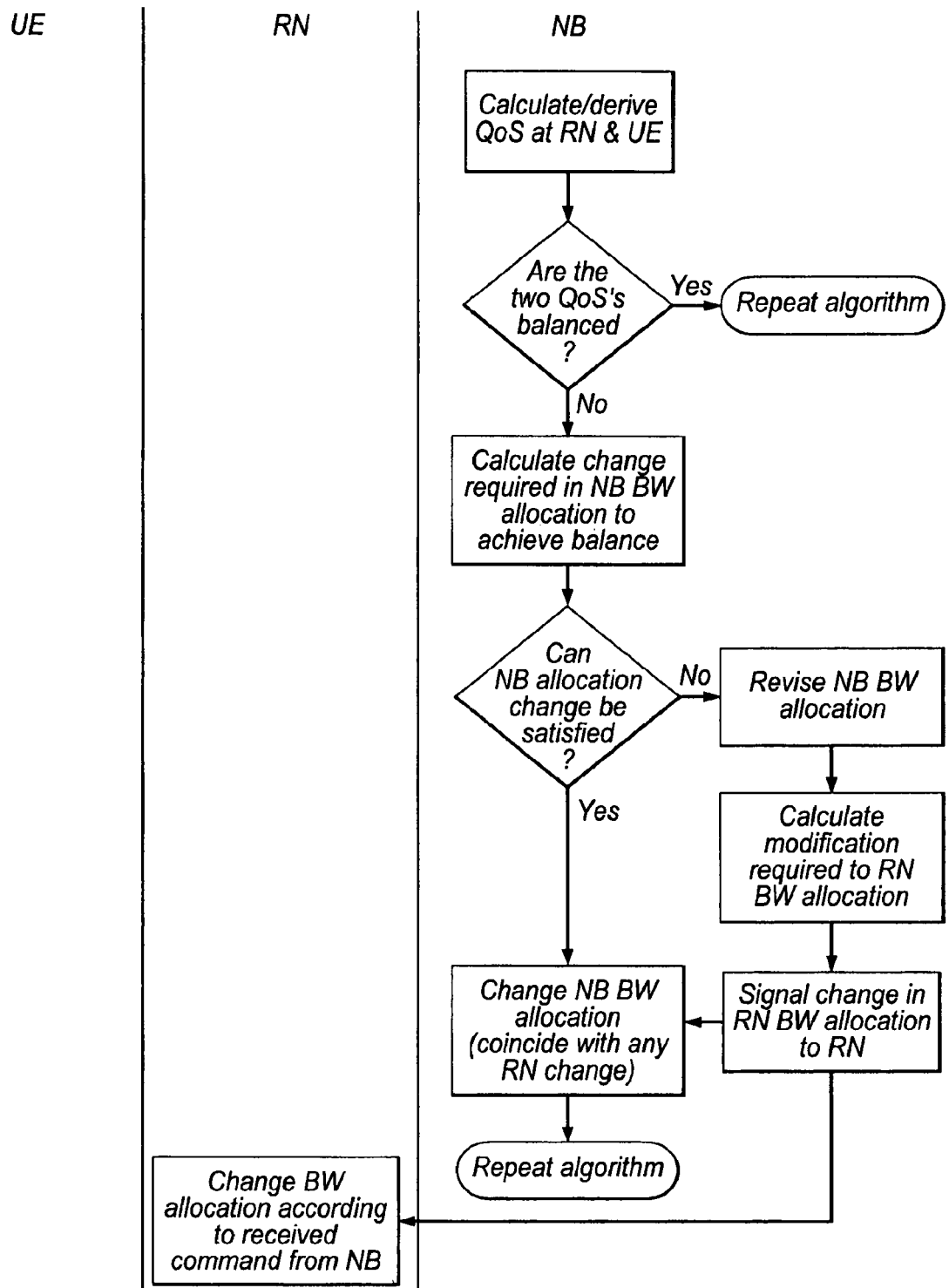

As a still further alternative, the UE and RN QoS indicators may be derived remotely at the NB. As shown in FIG. 19D, the NB may be operable to derive QoS indicators for both the communication links terminating at the RN and the UE. The details for the algorithm shown in FIG. 19D may be summarised as follows:

| Downlink Algorithm 1C: Part 2 (Centralised with UE & RN QoS derived at NB) Trigger: Periodically executed in NB | | |
|---|---|---|
| Algorithm Input | Required by | Origin |
| QoS at UE | NB | Derived/calculated at NB |
| QoS at RN | NB | Derived/calculated at NB |
| Algorithm Output | Derivation | Destination & Signalling Requirement |
| Change in NB BW allocation | Relative change | Used by NB |
| Change in RN BW allocation | Relative change | Change signalled to RN |

It will be appreciated that any one of the algorithms illustrated by FIGS. 18A, 18B and 18C may be implemented in conjunction with any one of the algorithms illustrated by FIGS. 19A, 19B, 19C and 19D.

Figure 20:
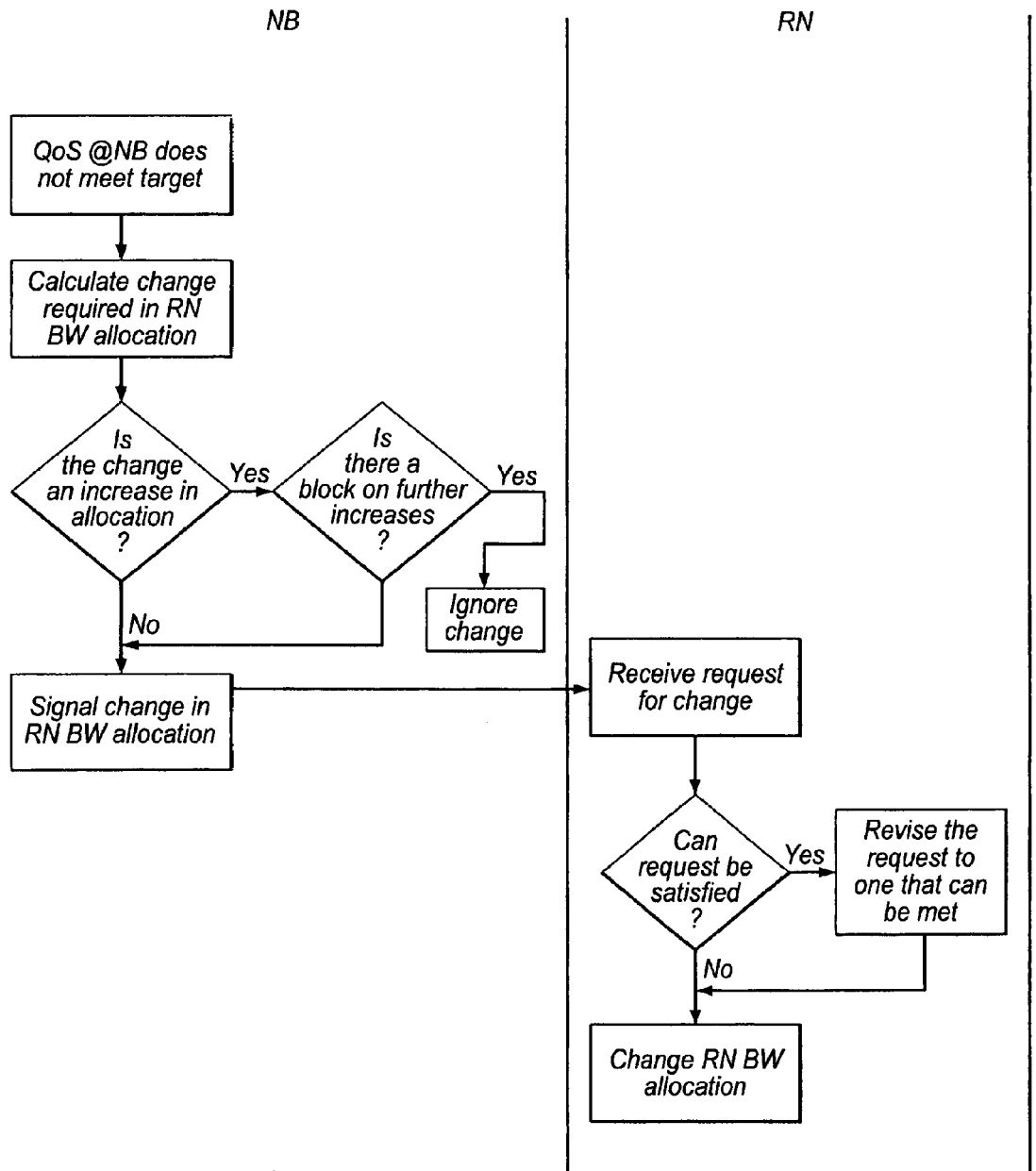
FIG. 20 illustrate an algorithm according to a third embodiment of the fifth aspect of the present invention.

An example of an algorithm which implements a third embodiment of the sixth aspect of the present invention will now be described with reference to FIG. 20, in which the source apparatus comprises a user equipment (UE), the intermediate apparatus comprises a relay node (RN) and the destination apparatus comprises a base station (NB). The present embodiment seeks to attain or maintain a balance between the QoS experienced on the UL communication links (UE-RN and RN-NB) by adjusting the bandwidth allocated to the RN-UE communication link.

The details of the algorithm are summarised as follows:

Uplink Algorithm 1A&B: Part 1 (Centralised with QoS derived at NB)
Trigger: Periodically executed in NB

| Algorithm Input | Required by | Origin |
|---|---|---|
| Request for change in BW allocation at RN | RN | Change derived in NB and processed by RN |
| Block in increase in BW allocation at RN | RN | Block is set/cleared in part 2 of the algorithm |
| Algorithm Output | Derivation | Destination & Signalling Requirement |
| Change in RN BW allocation | Relative change | Relative change derived at NB and made by RN |

The following sequence takes place following detection of a change in a QoS indicator derived for the base station from a desired value in order to determine a change in the bandwidth allocated to the intermediate apparatus which will tend bring the indicator derived for the destination apparatus back to said desired value.

1. The NB detects a change in an indicator of QoS or in an indicator of the variation from target QoS such that the QoS at the destination apparatus does not meet its target.
2. The NB calculates the required change in the bandwidth allocated to the intermediate apparatus (RN);
3. If the request is for a decrease in the RN bandwidth allocation, the NB issues a command to the RN for a decrease in the bandwidth allocated to the RN.
4. If the request is for an increase in the RN bandwidth allocation, the NB checks whether a prohibition, or block, is currently in place which prohibits increases in the RN bandwidth allocation. Then:
4a. If it is determined that a prohibition is in place, the NB ignores the request; or
4b. If it is determined that no prohibition is in place, the NB issues a command to the RN commanding an increase in the bandwidth allocated to the RN.
5. The RN receives a command from the control means of the NB and checks whether it can change its bandwidth in accordance with the command. Then:
6a: If the RN determines that it cannot change its bandwidth in accordance with the command, it determines a revised change in bandwidth and adjusts its bandwidth in accordance with the revised change; or
6b: If the RN determines that it can change its bandwidth in accordance with the command, the RN changes its bandwidth accordingly.

Figure 21A:
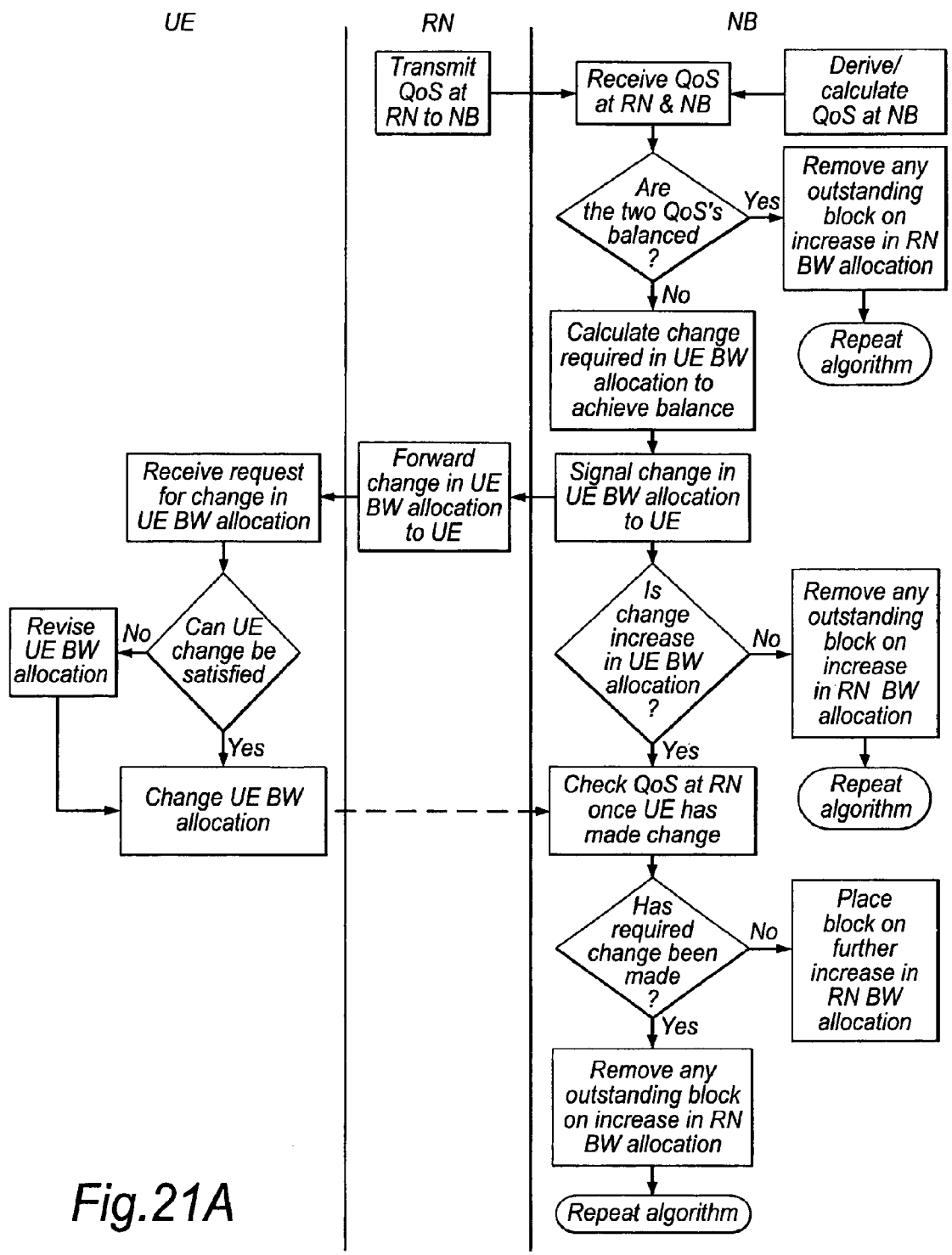
FIGS. 21A and 21B illustrate algorithms according to a fourth embodiment of the sixth aspect of the present invention.

The algorithm described above will manage the case of the propagation loss varying between the RN and NB and the case of the NB modifying its target QoS. In order to handle the case of the propagation loss varying between the UE and RN and the case that both the target in the NB and the propagation loss between the RN and NB varies, such that no request for change in RN bandwidth allocation is generated, an algorithm which implements a fourth embodiment of the sixth aspect of the present invention operates periodically as discussed below with reference to FIG. 21.

The details of the algorithm according to the fourth embodiment are summarised as follows:

Uplink Algorithm 1A: Part 2 (Centralised with RN QoS derived at RN)
Trigger: Periodically executed in NB

| Algorithm Input | Required by | Origin |
|---|---|---|
| QoS at NB | NB | Known at NB |
| QoS at RN | NB | Signalled from RN |
| Algorithm Output | Derivation | Destination & Signalling Requirement |
| Change in UE BW allocation | Relative change | Signalled to UE via RN |
| Block on RN BW allocation increase | True/false test | Part 1 of the algorithm |

This algorithm is executed periodically in addition to the algorithm discussed above with reference to FIG. 20. Alternatively, it is also possible for this algorithm to be implemented separately in a wireless multi-hop communication system.

The algorithm assumes that indicators of the QoS at the NB and RN are reported to the NB.

1. The NB derives and monitors indicators of the QoS for the NB and also monitors indicators of the QoS derived for the RN. Then:
1a. if these are found to vary such that they are imbalanced, a control means of the NB determines the change in the bandwidth allocated to the UE that is required to restore a balance in the indicators of QoS derived for each of the communication links; or
1b. If these are found to be balanced, a control means of the NB lifts any existing prohibition on an increase in the bandwidth allocated to the RN.
2. The control means issues a command to the UE, via the intermediate apparatus, commanding a change in the bandwidth allocation of the UE.
3. The UE receives the command from the NB and determines if it has the resource to carry out the required change in bandwidth. Then:
3a. If it is determined that the UE cannot carry out the required change, the UE determines a revised change in bandwidth allocation and changes its bandwidth in accordance with this revised change; or
3b. If it is determined that the UE can carry out the required change, the UE changes its bandwidth in accordance with the required change.
4. If the command issued by the control means was for a decrease in the bandwidth allocated to the UE, the control means lifts any existing prohibition on an increase in the bandwidth allocated to the RN.
5. If the command issued by the control means was for an increase in the bandwidth allocation, the control means monitors the QoS indicator derived for the intermediate apparatus to determine if the commanded change in bandwidth allocation of the UE has been effected. Then:
5a. if it is determined that the change was not effected by the UE, the control means places a prohibition on further increases in the bandwidth allocation of the RN; or
5b. If it is determined that the change was effected by the UE, the control means lifts any existing prohibition on an increase in the bandwidth allocation of the RN.

Figure 21B:
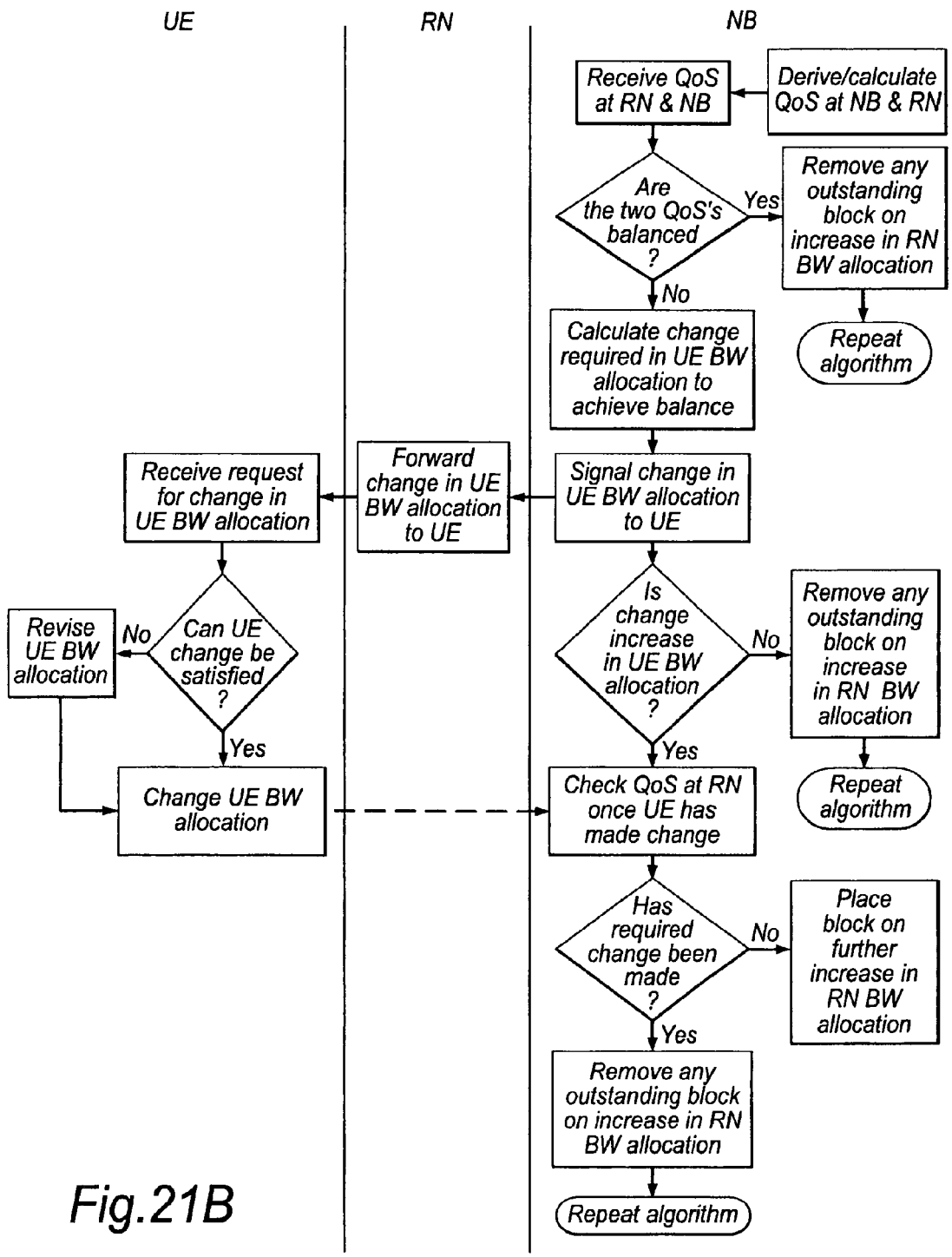

As an alternative, the RN QoS indicator may be derived remotely at the NB. As shown in FIG. 21B, the NB may be operable to derive QoS indicators for both the communication link terminating at the RN and the communication link terminating at the NB. The details for the algorithm shown in FIG. 21B may be summarised as follows:

| Uplink Algorithm 1B: Part 2 (Centralised with RN QoS derived at NB) Trigger: Periodically executed in NB | | |
| --- | --- | --- |
| Algorithm Input | Required by | Origin |
| QoS at NB | NB | Known at NB |
| QoS at RN | NB | Derived/calculated at NB |
| Algorithm Output | Derivation | Destination & Signalling Requirement |
| Change in UE BW allocation | Relative change | Signalled to UE via RN |
| Block on RN BW allocation increase | True/false test | Part 1 of the algorithm |

An example of a communication system according to an embodiment of the seventh aspect of the present invention will now be described with reference to FIG. 22A in which the source apparatus comprises a node-B (NB), the intermediate apparatus comprises a relay node (RN) and the destination apparatus comprises a user equipment (UE). Embodiments of the seventh aspect of the present invention seek to attain or maintain a balance between the QoS experienced on each of the communication links of a multi-hop communication system by adjusting the bandwidth allocated to one or more of the transmitters. According to the seventh aspect, the determination of the required bandwidth allocation or the change in the required bandwidth allocation is carried out in parts associated with the RN.

The present embodiment seeks to attain or maintain a balance between the QoS experienced on the DL communication links (NB-RN and RN-UE) by adjusting the bandwidth allocated to the RN-UE communication link.

The details of the algorithm are summarised as follows:

| Downlink Algorithm 2A: Part 1 (Distributed with UE QoS derived at UE) Trigger: RN receives request for change in BW allocated at RN from UE | | |
| --- | --- | --- |
| Algorithm Input | Required by | Origin |
| Request for change in BW allocation at RN | RN | Change derived in UE and processed by RN |
| Block in increase in RN BW allocation | RN | Block is set/cleared in part 2 of the algorithm |
| Algorithm Output | Derivation | Destination & Signalling Requirement |
| Change in RN BW allocation | Relative change | Relative change derived at UE and made by RN |

The following sequence takes place following detection of a change in a QoS indicator derived by the destination apparatus (UE) from a desired value which in this case is the target QoS. The destination apparatus (UE), following detection of a change, determines the change in the bandwidth allocation of the intermediate apparatus which will tend bring the indicator derived by the destination apparatus back to said desired value. Then:
1. The destination apparatus (UE) transmits a request for a change in the RN bandwidth allocation to the RN;
2. The RN checks whether the request can be satisfied. If the received request cannot be satisfied by the RN then it is modified to one that can be met.
3. If the requested change in bandwidth allocation of the RN is an increase, then a check is made to determine whether a block, or prohibition, has been placed on further increases. In this embodiment, the block is placed by the algorithm illustrated by FIG. 23A or 23B which implement a second embodiment of the seventh aspect of the present invention. If a block is in place then the request is ignored, otherwise the RN bandwidth allocation is changed accordingly.

As an alternative, the US QoS indicator may be derived remotely at the RN. As shown in FIG. 22B, the RN may be operable to derive QoS indicators for the communication link terminating at the UE. The details for the algorithm shown in FIG. 22B may be summarised as follows:

| Downlink Algorithm 2B: Part 1 (Distributed with UE QoS derived at RN) Trigger: RN generates a request for change in BW allocated at RN to the UE | | |
| --- | --- | --- |
| Algorithm Input | Required by | Origin |
| Request for change in BW allocation at RN | RN | Change derived in RN and processed by RN |
| Block in increase in RN BW allocation | RN | Block is set/cleared in part 2 of the algorithm |
| Algorithm Output | Derivation | Destination & Signalling Requirement |
| Change in RN BW allocation | Relative change | Relative change derived at RN and made by RN |

The algorithms described above with reference to FIGS. 22A and 22B will manage the case of the propagation loss varying between the RN and UE and the case of the UE modifying its target QoS. In order to handle the case of the propagation loss varying between the NB and RN and the case that both the target in the UE and the propagation loss between the RN and UE varies, such that no request for change in RN bandwidth is generated, an algorithm such as that shown in FIG. 23A operates periodically as discussed below.

Figure 22A:
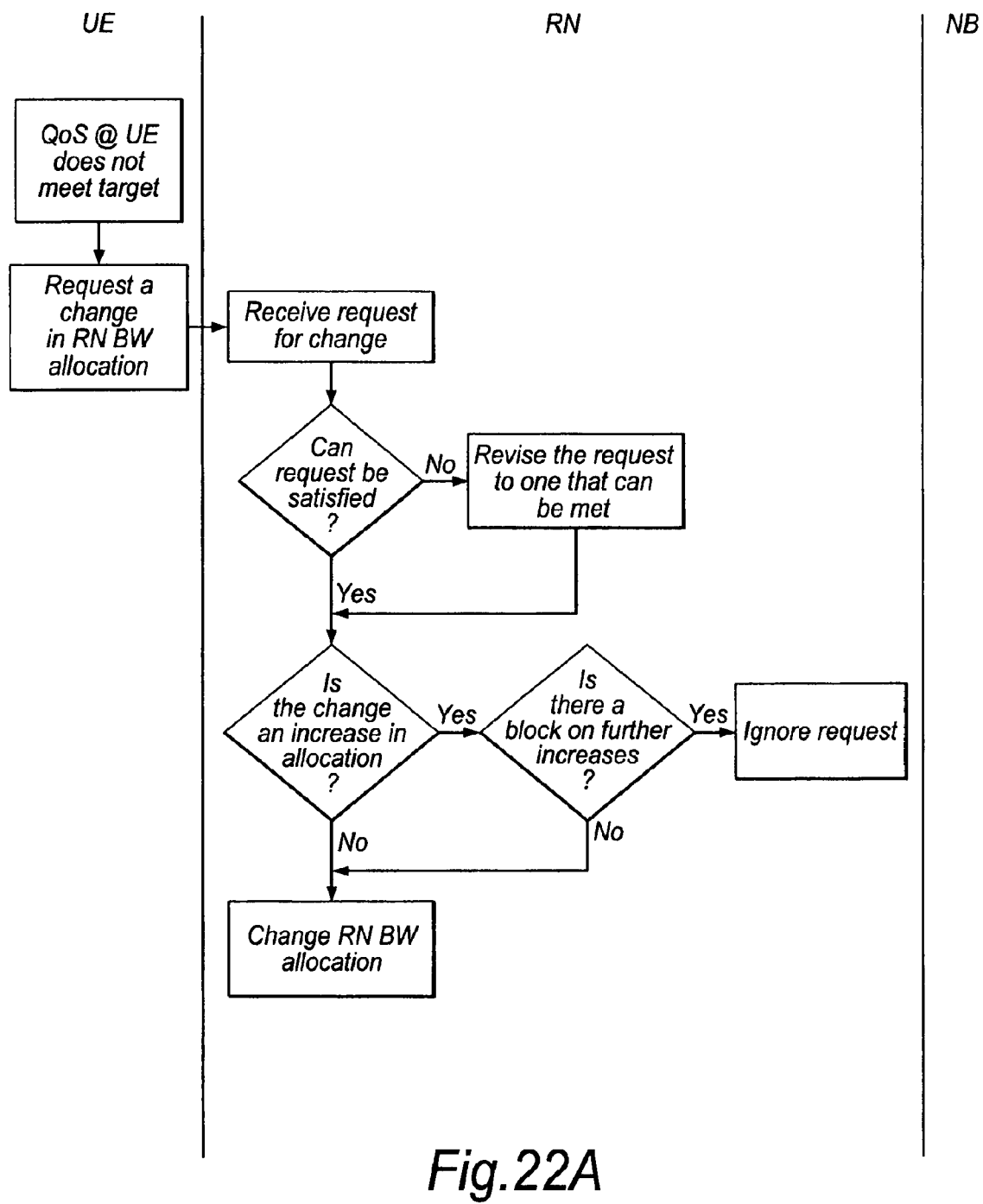
FIGS. 22A and 22B illustrate algorithms according to a first embodiment of the seventh aspect of the present invention.
Figure 22B:
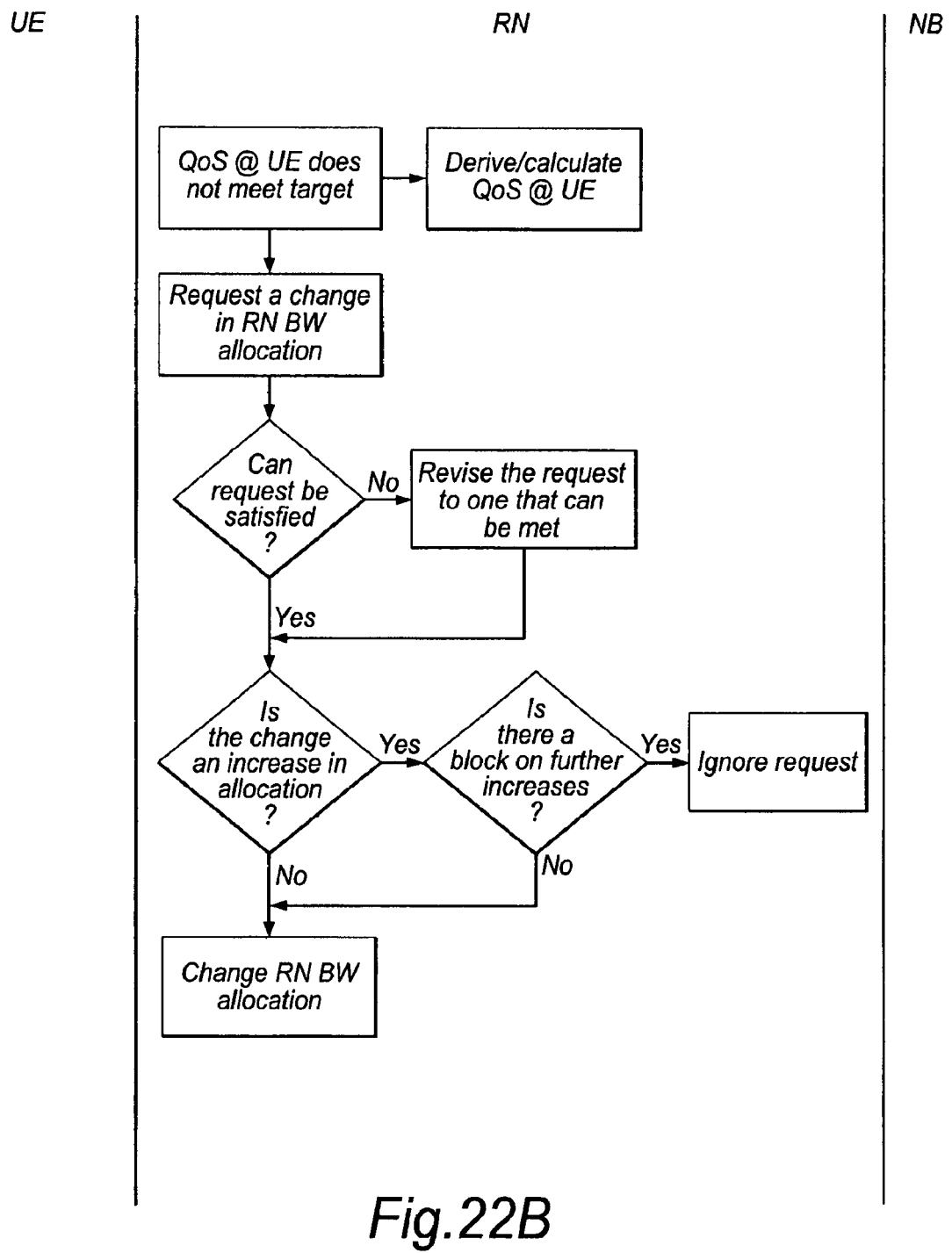
Figure 23A:
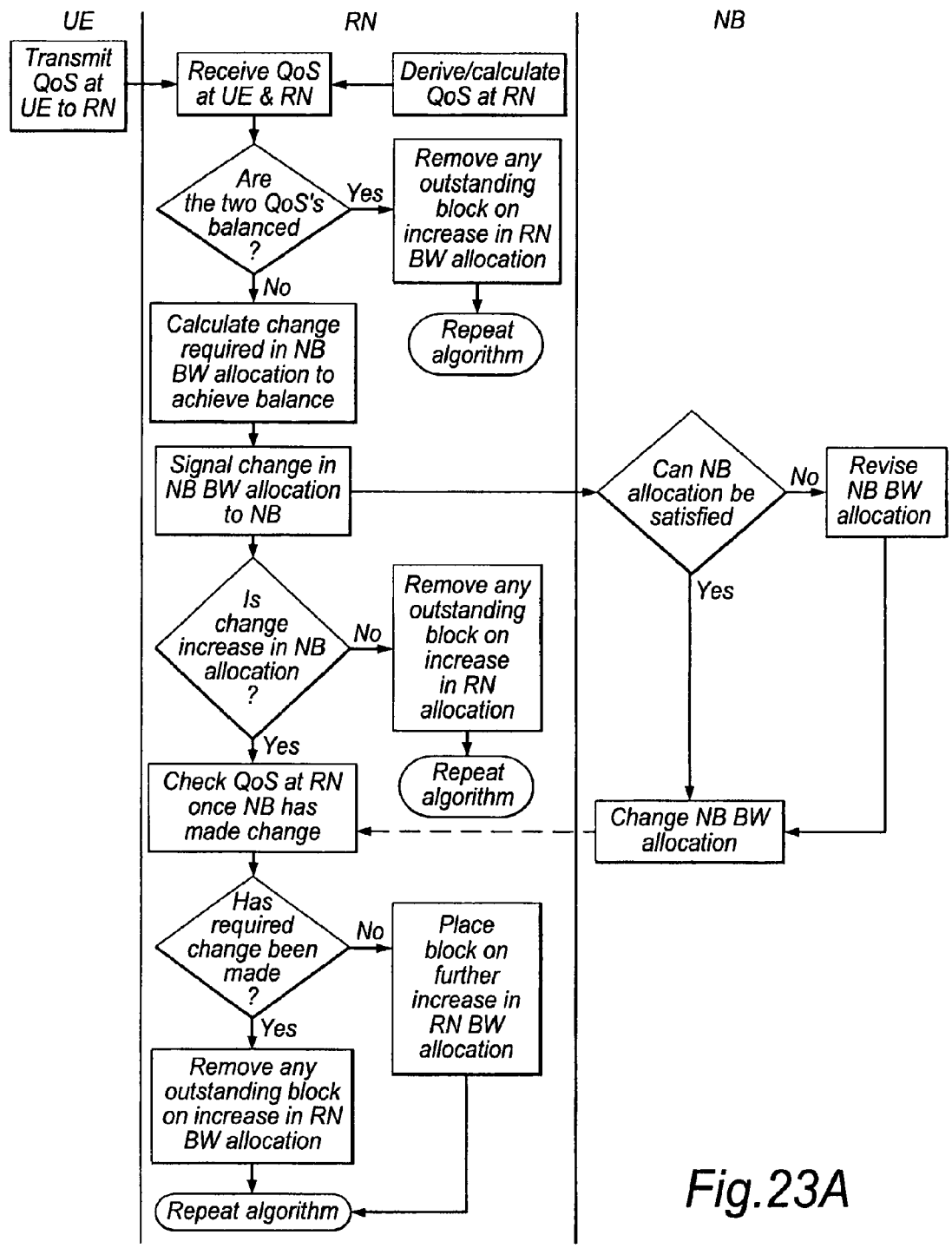
FIGS. 23A and 23B illustrate algorithms according to a second embodiment of the seventh aspect of the present invention.

FIG. 23A shows an algorithm which implements a second embodiment of the seventh aspect of the present invention. In this embodiment, the following algorithm is executed in addition to the algorithm discussed above with reference to FIG. 22A or 22B.

The details of the algorithm are summarised as follows:

| Downlink Algorithm 2A: Part 2 (Distributed with UE QoS derived at UE and signalled to RN) Trigger: Periodically executed in RN | | |
| --- | --- | --- |
| Algorithm Input | Required by | Origin |
| QoS at UE | RN | Signalled from UE |
| QoS at RN | RN | Known at RN |
| Algorithm Output | Derivation | Destination & Signalling Requirement |
| Change in NB BW allocation | Relative change | Signalled to NB |
| Block on RN allocation increase | True/false test | Part 1 of the algorithm |

1. The RN monitors the reported QoS indicators derived for both the UE and the RN. If an imbalance exists then the RN calculates the change in RN bandwidth allocation that is required to restore a balance in the QoS across the two communication links.
2. The RN then signals a command to the NB for a change in the bandwidth allocation of the NB according to the change determined in step 1.
3. The NB receives the request and checks that the request can be met. If it can not then it is revised. The NB then changes its bandwidth accordingly.
4. If the request from the RN was for an increase in NB bandwidth then the RN monitors the received SINR to check that the required change was made. If it is detected that the required change was not made then a block, or prohibition, is placed on further increases in RN bandwidth allocation. If this block was not placed then as the NB cannot increase its bandwidth, any increase in RN bandwidth will cause an imbalance that cannot be rectified, as this would require a further increase in the NB bandwidth, compounding any imbalance.

Note that the block on further RN bandwidth increase is removed if: it is detected that the QoS indicators are balanced; a decrease in NB bandwidth allocation is requested; or a requested change in NB bandwidth allocation is detected to have been made.

Figure 23B:
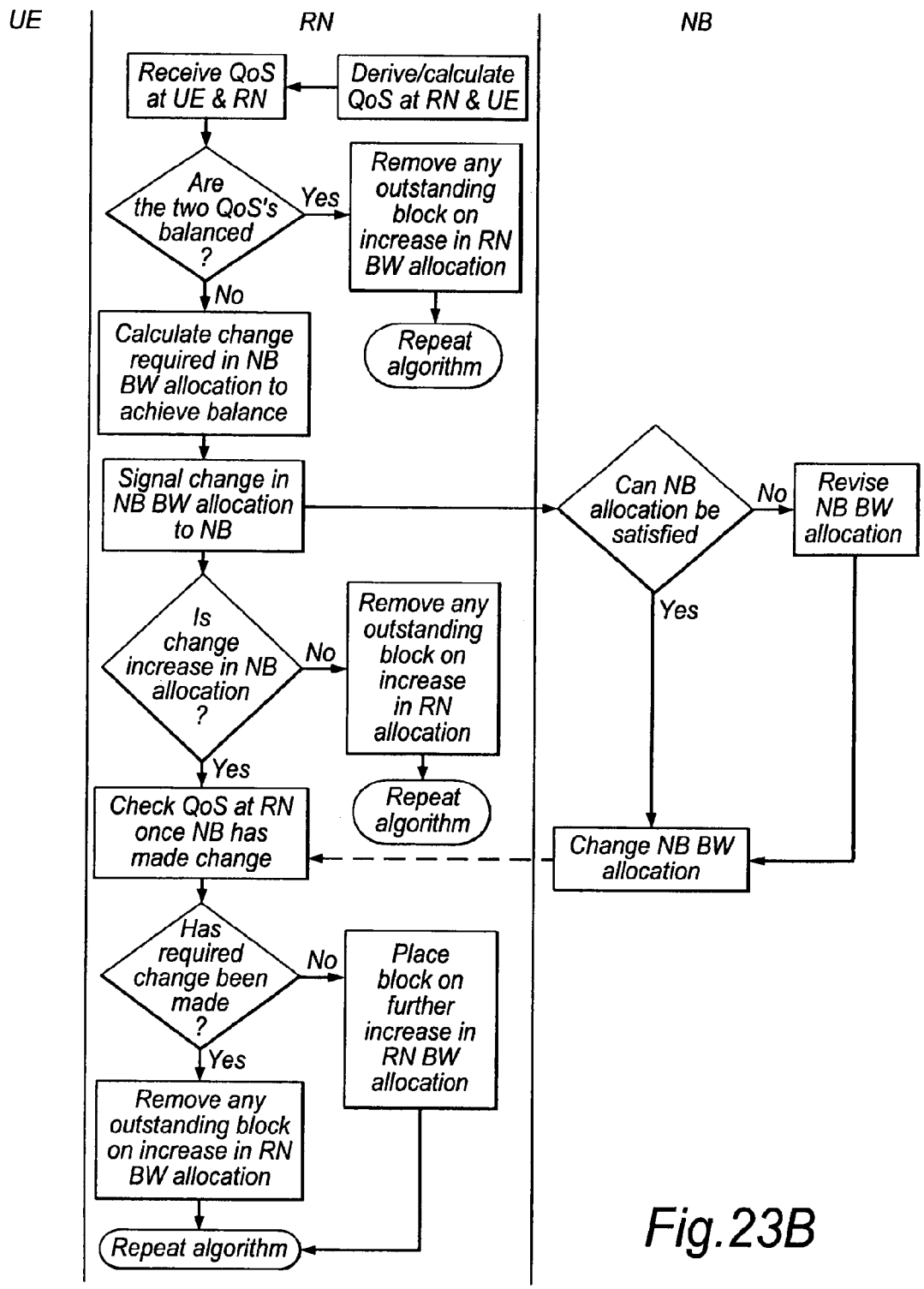

As an alternative, the UE QoS indicator may be derived remotely at the RN. As shown in FIG. 23B, the RN may be operable to derive QoS indicators for both the RN and the UE. The details for the algorithm shown in FIG. 23B may be summarised as follows:

Downlink Algorithm 2B: Part 2 (Distributed with UE QoS derived at RN)
Trigger: Periodically executed in RN

| Algorithm Input | Required by | Origin |
| --- | --- | --- |
| QoS at UE | RN | Derived/calculated at RN |
| QoS at RN | RN | Known at RN |

| Algorithm Output | Derivation | Destination & Signalling Requirement |
| --- | --- | --- |
| Change in NB BW allocation | Relative change | Signalled to NB |
| Block on RN allocation increase | True/false test | Part 1 of the algorithm |

It will be appreciated that either of the algorithms illustrated by FIGS. 22A and 22B may be implemented in conjunction with either of the algorithms illustrated by FIGS. 23A and 23B.

Another embodiment of the seventh aspect of the present invention will now be described with reference to FIG. 24A in the case of uplink transmissions in which the source apparatus comprises a user equipment (UE), the intermediate apparatus comprises a relay node (RN), and the destination apparatus comprises a Node-B (NB). The NB continually monitors the QoS of the communication link terminating at the NB and derives indicators of the QoS and the variation from target QoS. The NB is provided with an indicator deviation detection means for detecting a change in one or both of these indicators. According to the seventh aspect, the determination of the required bandwidth allocation or the change in the required bandwidth allocation is carried out in parts associated with the RN.

The details of the algorithm are summarised as follows:

Uplink Algorithm 2A: Part 1 (Distributed with NB QoS derived at NB)
Trigger: RN receives request for change in RN BW allocation from NB

| Algorithm Input | Required by | Origin |
| --- | --- | --- |
| Request for change in bandwidth allocation at RN | RN | Change derived in NB and processed by RN |
| Block in increase in RN BW allocation | RN | Block is set/cleared in part 2 of the algorithm |

| Algorithm Output | Derivation | Destination & Signalling Requirement |
| --- | --- | --- |
| Change in RN BW allocation | Relative change | Relative change derived at NB and made by RN |

The following sequence takes place following detection of a change in an indicator derived by for destination apparatus (NB) from a desired value:
1. The destination apparatus (NB) transmits a request for a change in the RN bandwidth allocation to the RN;
2. The RN checks whether the request can be satisfied. If the received request cannot be satisfied by the RN then it is modified to one that can be met.
3. If the requested change in bandwidth allocation of the RN is an increase, then a check is made to determine whether a block, or prohibition, has been placed on further increases. In this embodiment, the block is placed by the algorithm illustrated by FIG. 25A or 25B which embodies a further embodiment of the seventh aspect of the present invention. If a block is in place then the request is ignored, otherwise the RN bandwidth is changed accordingly.

As an alternative, the UE QoS indicator may be derived remotely at the RN. As shown in FIG. 24B, the RN may be operable to derive QoS indicators for the communication link terminating at the UE. The details for the algorithm shown in FIG. 24B may be summarised as follows:

Uplink Algorithm 2B: Part 1 (Distributed with NB QoS derived at RN)
Trigger: RN derives request for change in RN BW allocation

| Algorithm Input | Required by | Origin |
| --- | --- | --- |
| Request for change in bandwidth allocation at RN | RN | Change derived in RN and processed by RN |
| Block in increase in RN BW allocation | RN | Block is set/cleared in part 2 of the algorithm |

| Algorithm Output | Derivation | Destination & Signalling Requirement |
| --- | --- | --- |
| Change in RN BW allocation | Relative change | Relative change derived at NB and made by RN |

The algorithms described above with reference to FIGS. 24A and 24B will manage the case of the propagation loss varying between the RN and NB and the case of the NB modifying its target QoS. In order to handle the case of the propagation loss varying between the UE and RN and the case that both the target in the NB and the propagation loss between the RN and NB varies, such that no request for change in RN bandwidth allocation is generated, an algorithm as shown in FIG. 25A or 25B, which implement a further embodiment of the seventh aspect of the present invention, operates periodically as discussed below. Alternatively, it is also possible for either of the algorithms described with reference to FIG. 25A or 25B to be implemented separately in a wireless multi-hop communication system.

The details of the algorithm are summarised as follows:

| Uplink Algorithm 2A: Part 2 (Distributed with NB QoS derived at NB) Trigger: Periodically executed in RN | | |
|---|---|---|
| Algorithm Input | Required by | Origin |
| QoS at NB | RN | Signalled from NB |
| QoS at RN | RN | Known at RN |
| Algorithm Output | Derivation | Destination & Signalling Requirement |
| Change in UE BW allocation | Relative change | Signalled to UE |
| Block on RN BW allocation increase | True/false test | Part 1 of the algorithm |

1. The RN monitors the QoS indicators derived for both the NB and the RN. If an imbalance exists then the RN calculates the change in UE bandwidth allocation that is required to restore a balance in the QoS across both of the communication links.
2. The RN then signals a command to the UE for a change in the bandwidth allocation at the UE according to the change determined in step 1.
3. The UE receives the request and checks that the request can be met. If it can not then it is revised. The UE then changes its bandwidth accordingly.
4. If the request from the RN was for an increase in UE bandwidth allocation then the RN monitors the QoS for the link which terminates at the RN to check that the required change was made. If it is detected that the required change was not made then a block, or prohibition, is placed on further increases in RN bandwidth allocation.

Note that the block on further RN bandwidth increase is removed if: it is detected that the QoS indicators are balanced; a decrease in UE bandwidth allocation is requested; or a commanded change in UE bandwidth allocation is detected to have been made.

As an alternative, the NB QoS indicator may be derived remotely at the RN. As shown in FIG. 25B, the RN may be operable to derive QoS indicators for both the RN and the NB. The details for the algorithm shown in FIG. 25B may be summarised as follows:

| Uplink Algorithm 2B: Part 2 (Distributed with NB QoS derived at RN) Trigger: Periodically executed in RN | | |
|---|---|---|
| Algorithm Input | Required by | Origin |
| QoS at NB | RN | Derived/calculated at RN |
| QoS at RN | RN | Known at RN |
| Algorithm Output | Derivation | Destination & Signalling Requirement |
| Change in UE BW allocation | Relative change | Signalled to UE |
| Block on RN BW allocation increase | True/false test | Part 1 of the algorithm |

Figure 24A:
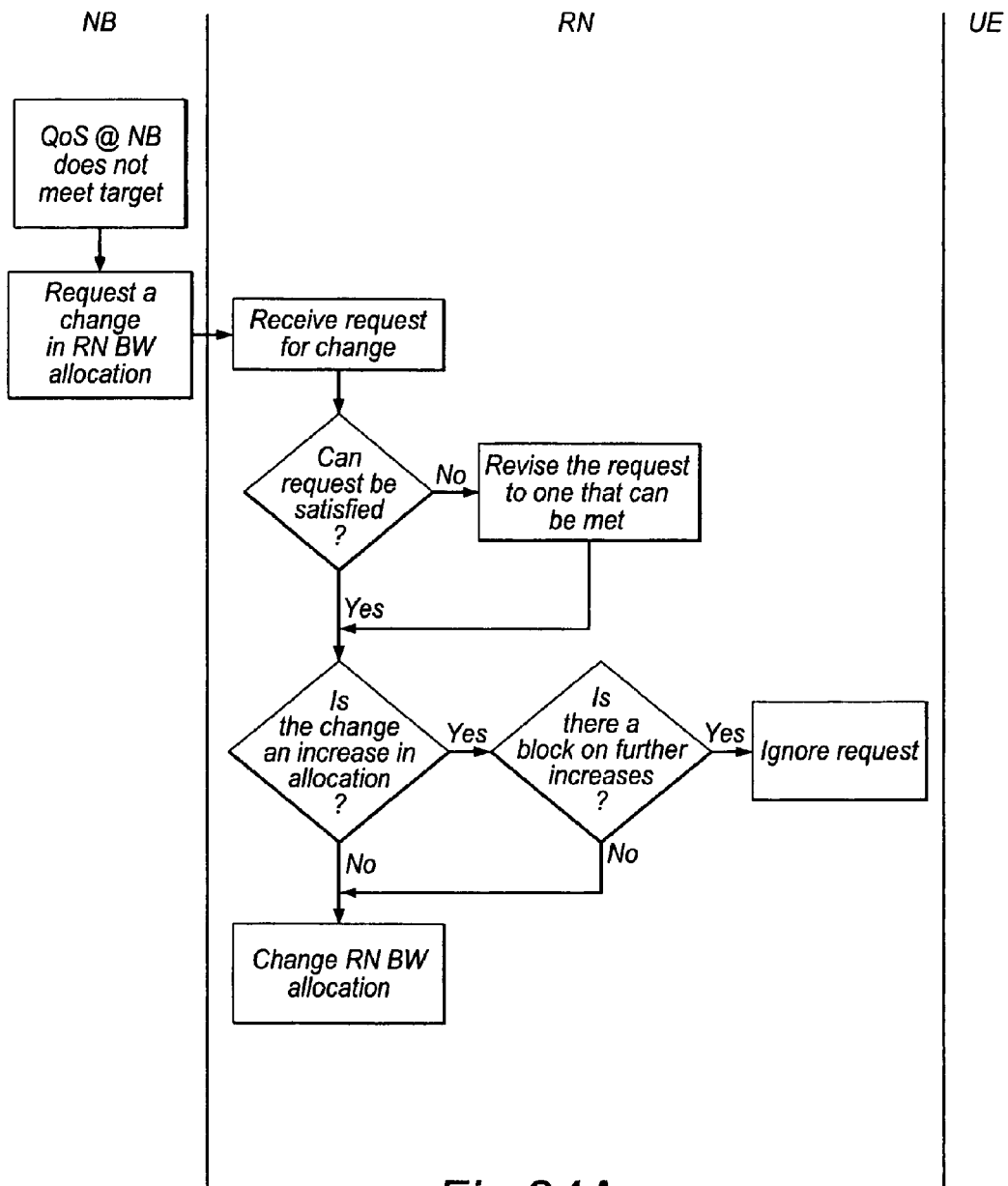
FIGS. 24A and 24B illustrate algorithms according to a further embodiment of the seventh aspect of the present invention.
Figure 24B:
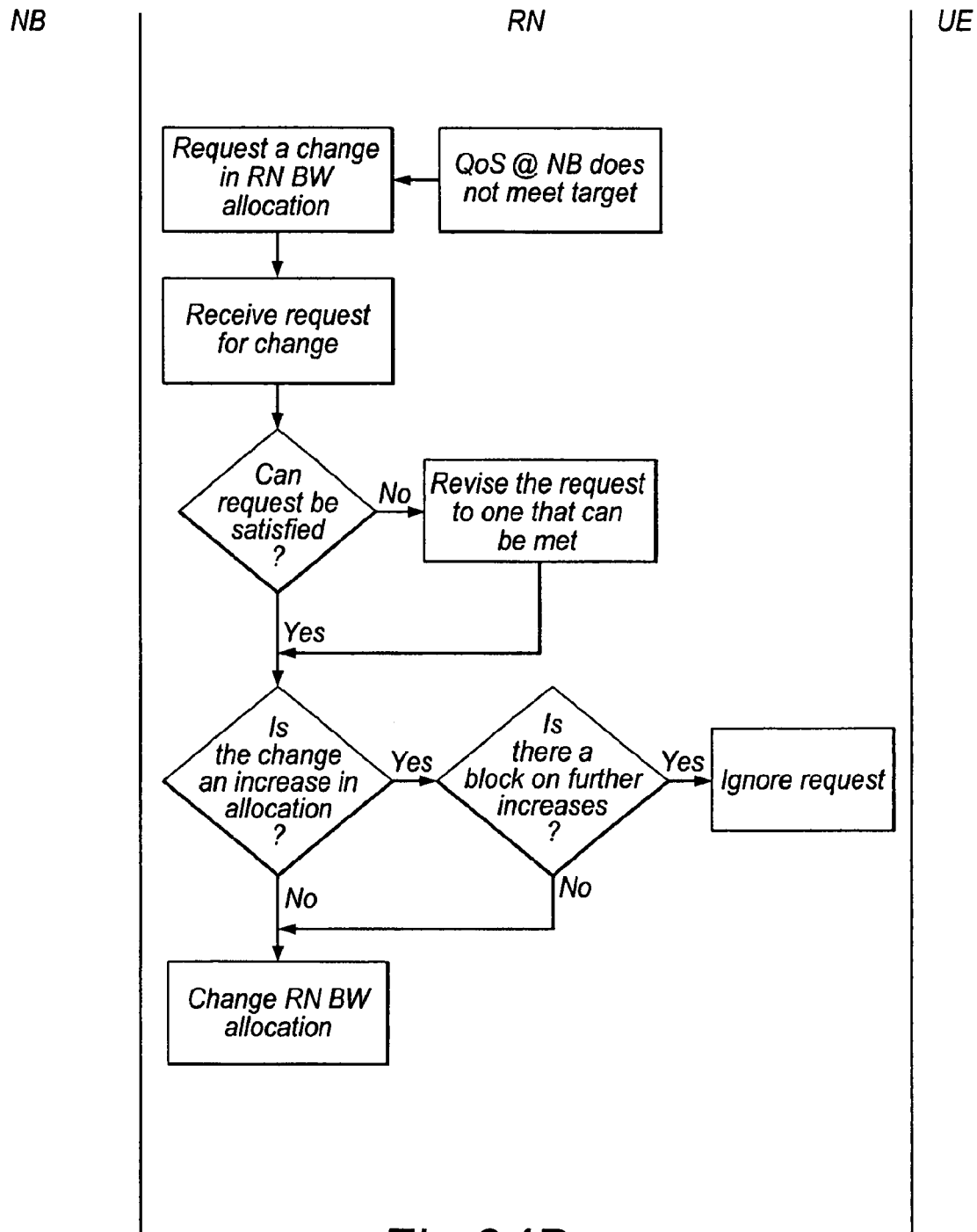
Figure 25A:
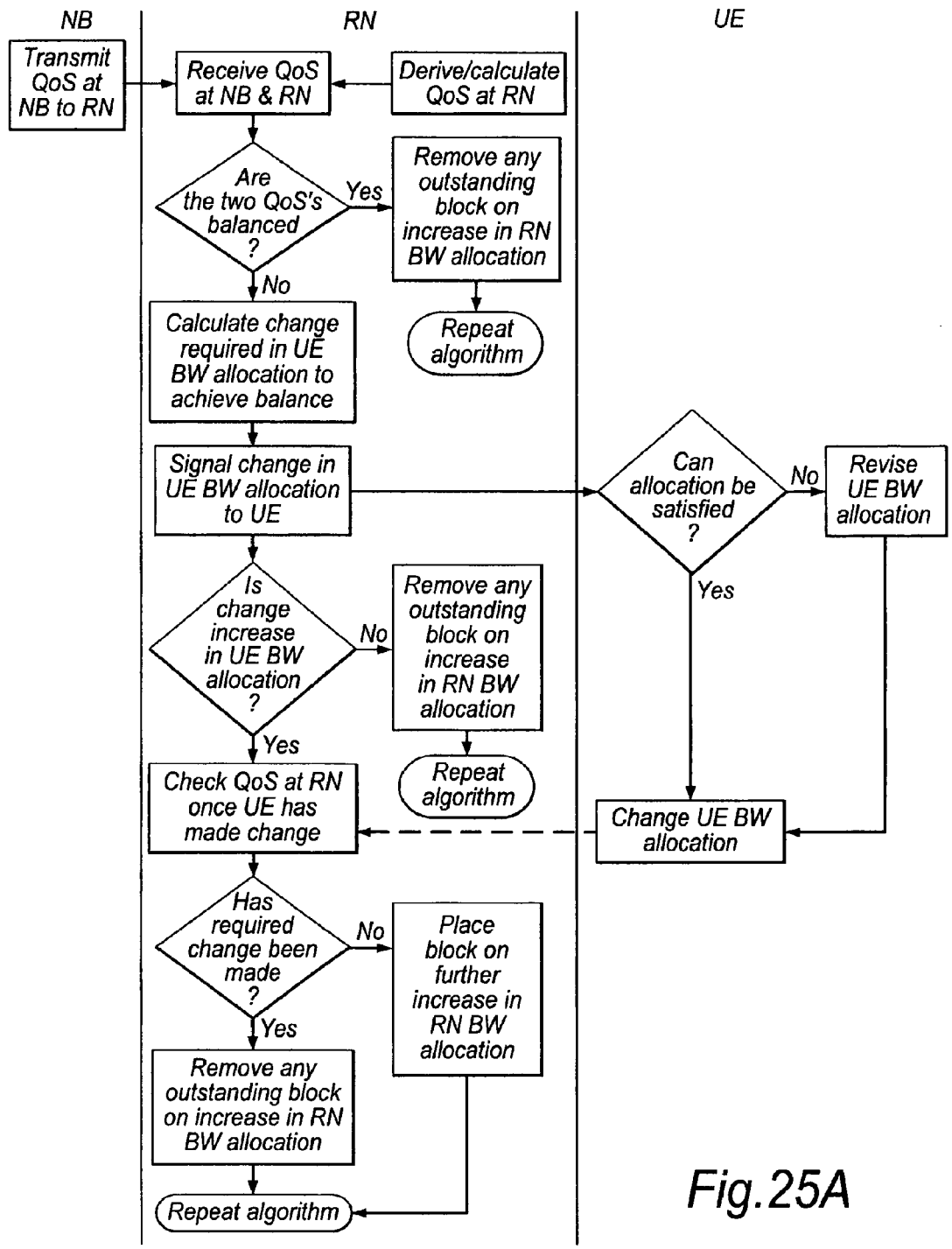
FIGS. 25A and 25B illustrate algorithms according to a further embodiment of the seventh aspect of the present invention.
Figure 25B:
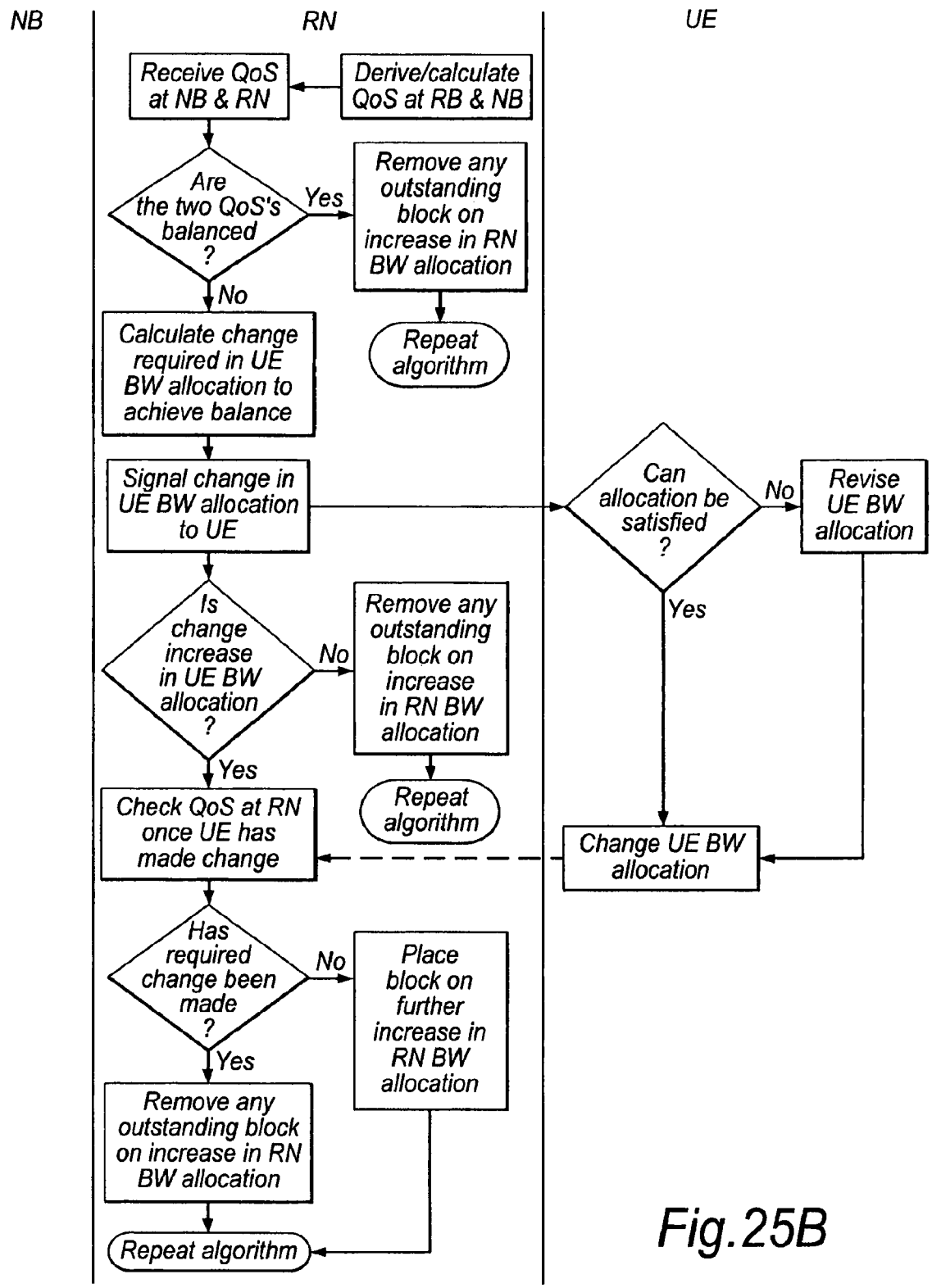

It will be appreciated that either of the algorithms illustrated by FIGS. 24A and 24B may be implemented in conjunction with either of the algorithms illustrated by FIGS. 25A and 25B.

Figure 31:
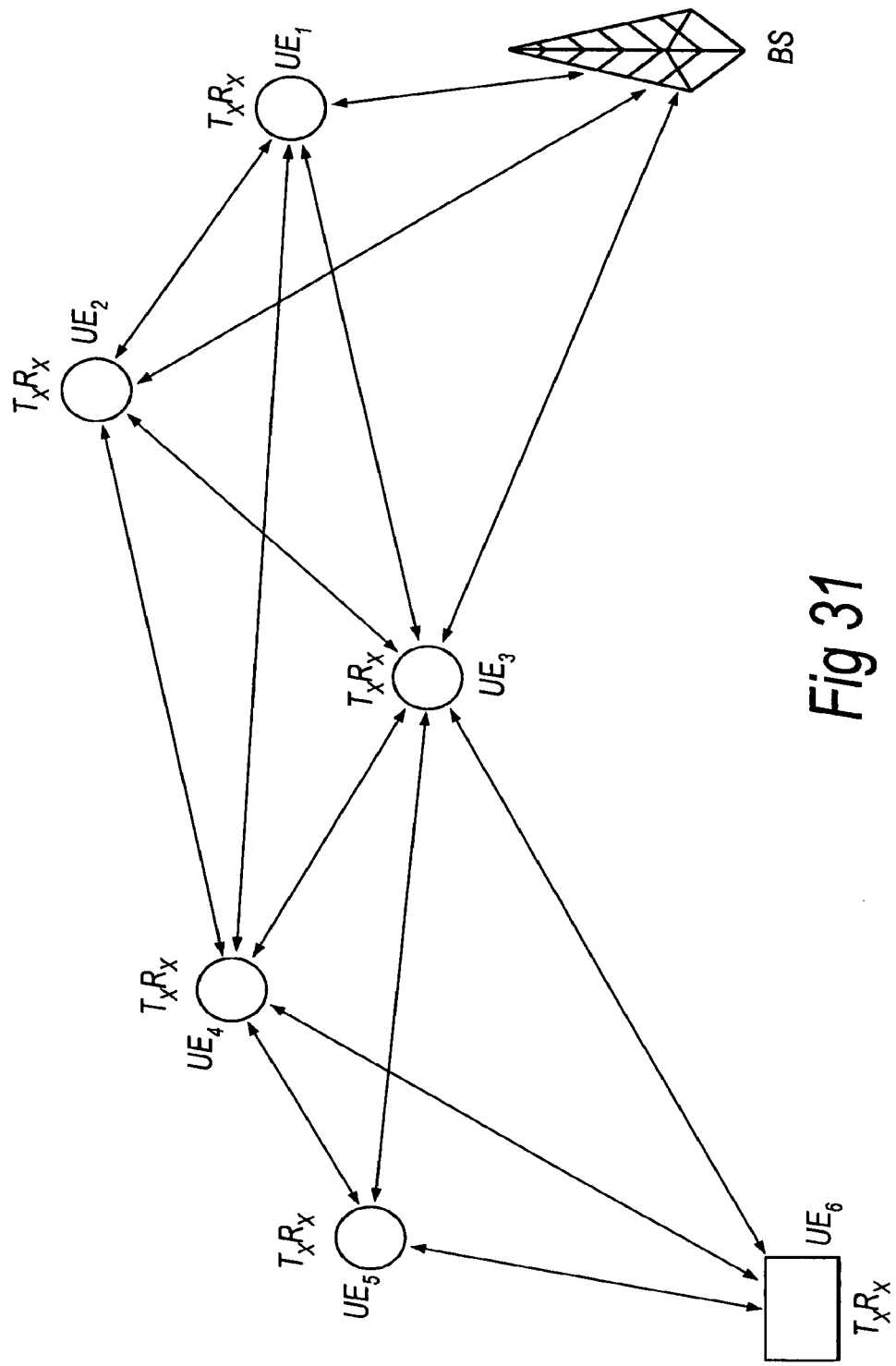

FIG. 31 shows an ad-hoc network according to an embodiment of the present invention, comprising a base station BS and six user equipments $UE_1$ to $UE_6$. The Figure shows some of the possible communication paths that may exist between the base station and $UE_6$. For example, a downlink communication path between the base station and $UE_6$ may comprise the $BS$-$UE_3$ link followed by the $UE_3$-$UE_5$ link followed by the $UE_5$ to $UE_6$ link.

Any of the user equipments or the base station may be provided with a determining means operable to determine the transmission resource of any one of the transmitters of the system that will maintain a balance between two or more of the receivers of the system. Considering as an example, the intermediate apparatus $UE_3$ shown in FIG. 31. This apparatus comprises a transmitter and a receiver and is operable to receive UL or DL communication signals. In the case of a downlink communications between the base station and $UE_6$, $UE_3$ is operable to receive a communication signal from the base station (the source apparatus in the case of DL) or from a previous intermediate apparatus in a communication direction, and to transmit said communication signal or a signal derived therefrom, to $UE_6$ (the destination apparatus in the case of DL) or to a subsequent intermediate apparatus in a communication direction. According to this embodiment the intermediate apparatus comprises a determining means operable to determine a measure of, or a change in a measure of, the resource allocated to: said transmitter of the intermediate apparatus; and/or a transmitter of the base station; and/or a transmitter of a previous intermediate apparatus ($UE_2$ or $UE_1$); and/or a transmitter of a subsequent intermediate apparatus ($UE_4$ or $UE_5$), that will tend to substantially attain or maintain a balance between a measure of the quality of the communication signal received at least two of:
 a receiver of $UE_6$ (the destination apparatus);
 a receiver of $UE_5$ or $UE_4$ (a subsequent intermediate apparatus);
 the receiver of $UE_3$; and
 a receiver of a $UE_2$ or $UE_1$ (a previous intermediate apparatus)

According to this embodiment, $UE_3$ is provided with an indicator derivation means operable to derive indicators of the quality of service experienced by each of receivers operating to receive a communication signal in the multi-hop network. $UE_3$ is therefore provided with a means to monitor the effective throughput across each of the communication links. Accordingly, the monitor is operable to receive measurements taken at the receiver and/or transmitter of a particular link and then reported to said indicator (QoS) derivation means.

Theoretical Analysis

The following theoretical analysis derives possible solutions for calculating the optimal transmit power of the transmitting elements comprised in a multi-hop network for various deployment scenarios. Although the third, fourth and fifth aspects of the preset invention seek to balance the quality indicators derived by the destination apparatus and intermediate apparatus without performing an explicit calculation of the transmit power required to achieve that balance, the following theoretical analysis, which derives possible solutions for explicitly calculating the optimal transmit power of the transmitting elements comprised in a multi-hop network for various deployment scenarios, is useful for understanding the present invention. Furthermore, whilst the equations are developed solely for the case of the connections that form the downlink in a multi-hop network, it is straightforward to adapt the equations derived for the case of the uplink. Such an adaptation is achieved by adopting the same methodology used to develop the expressions for the received SINR at the receiving nodes, where the transmitting nodes are now the UE and the RN and the receiving nodes are now the NB and RN. Once expressions for the SINR received at the RN and NB are arrived at, the same methodology can be employed for each deployment scenario in order to determine the optimal transmit power setting of the UE and RN. For each deployment scenario, theoretical solutions are obtained assuming a single-cell model and a two-cell model. In the case of a two cell model, it is assumed that the deployment in both cells is identical and that the transmit powers on the base station (BS) and the intermediate apparatus (I) are the same. It is also assumed that where appropriate $P_{tx\_tot,RN} = G_p P_{tx,RN}$ and $P_{tx\_tot,NB} = G_p P_{tx,NB}$ and that for the case of TDD both RN's transmit at the same time. This in effect generates the worse case scenario for two cells.

Theoretical solutions may be evolved from a consideration of the signal-to-interference plus noise ratio (SINR) experienced by the receiving nodes in a multi-hop system (i.e. the or each intermediate apparatus (I) and the destination apparatus (D)). The SINR at a particular node is a measure of the quality of a communication signal received by that node and is a ratio of the received strength of the desired signal to the received signal strength of the undesired signals (noise and interference).

As previously discussed, the considerations required for noise and interference depend on the duplexing method used to separate signal received at an intermediate apparatus from those transmitted from an intermediate apparatus, the characteristics of the intermediate apparatus and also the level of inter-cell interference which is taken into account (i.e. interference from neighbouring cells).

The following equation represents the SINR of a communication signal sent from an intermediate apparatus to a destination apparatus for all scenarios, where different terms may be ignored depending upon the type of intermediate apparatus (e.g. non-regenerative or regenerative) and the duplexing method:

$$SINR_{RN-UE} = \frac{G_p P_{tx,RN}}{L_{RN-UE}\left(N + \frac{P_{tx,RN}}{L_{RN-UE}SINR_{NB-RN}} + \frac{P_{tx\_tot,NB}}{L_{NB-UE}}\right)}$$

For the case of FDD instead of TDD then the third term in the bracket is removed and for the case of regenerative instead of non-regenerative the second term in the bracket is removed.

In the case of a two-cell model as illustrated in FIG. 1B, this becomes:

$$SINR_{RN-UE} = \frac{G_p P_{tx,RN1}}{L_{RN1-UE}\left(N + \frac{P_{tx,RN1}}{L_{RN1-UE}SINR_{NB1-RN1}} + \frac{P_{tx\_tot,NB1}}{L_{NB1-UE}} + \frac{P_{tx\_tot,NB2}}{L_{NB2-UE}} + \frac{P_{tx\_tot,RN2}}{L_{RN2-UE}}\right)}$$

The first three terms in the bracket in (2) are the same as those in (1). The additional last two terms originate from the interference experienced from the neighbouring co-channel NB and RN respectively. Obviously if the neighbouring cell employs a different frequency or uses a different timeslot for relay transmission then the terms needed to model this interference will vary. It should be appreciated that these equations can be extended to a three-cell model or more for a higher level of accuracy.

Considering now the various possible deployment scenarios in turn, for the case of DL transmissions transmitted between a base-station or node-B (NB), via an intermediate relay node (RN) to a destination user equipment (UE).

1A. Regenerative Relay with FDD—Single-Cell Model as Illustrated in FIG. 1A

In this case, the SINR at a destination UE which is connected to an intermediate RN is given by:

$$SINR_{RN-UE} = \frac{G_p P_{tx,RN}}{L_{RN-UE} N} \quad (1)$$

Where $G_P$ is the processing gain, $P_{tx,RN}$ is the transmit power on the channel of interest at the RN, $L_{RN-UE}$ is the propagation loss on the NB to RN link and N is the noise. Note this assumes that no intra-cell interference exists.

The SINR at an intermediate RN which is operable to receive signals from the NB is given by:

$$SINR_{NB-RN} = \frac{G_p P_{tx,NB}}{L_{NB-RN} N} \quad (2)$$

Where $P_{tx,NB}$ is the transmit power on the channel of interest at the NB and $L_{NB-RN}$ is the propagation loss on the RN to UE link. Again, it is assumed that no intra-cell interference exists.

The overall throughput across the multi-hop link will be limited by the lower of the two SINR values as this will limit the rate at which data can be transmitted to that entity.

Any increase in transmit power that causes an SINR imbalance will not improve the performance of the multi-hop system; it will simply result in wasted energy and an increase in interference to any co-channel users.

Thus, assuming that the receiver at the intermediate RN and the receiver at the destination UE perform the same, then it follows that the transmit power at the NB and RN should be set such that the SINR at the RN and UE is the same. Using this criterion for setting the ratio of the transmit powers, it follows that the ratio is given by:

$$\frac{P_{tx,NB}}{P_{tx,RN}} = \frac{L_{NB-RN}}{L_{RN-UE}} = \frac{b_1 s_1^{n_1}}{b_2 s_2^{n_2}} \quad (3)$$

Where $b_1$ and $n_1$ are the pathloss parameters for the NB to RN link which is $s_1$ in length and $b_2$, $n_2$ and $s_2$ are associated with the RN to UE link. Thus using equation (3) it is possible to find either transmit power given the other.

1B. Regenerative Relay with FDD—Two Cell Model as Shown in FIG. 1B

In this case, transmit power equations may be derived taking into account interference caused by transmissions arising in the other cell.

In this case the SINR at a destination UE that is operable to receive signals from an intermediate RN is now:

$$SINR_{RN-UE} = \frac{G_p P_{tx,RN}}{L_{RN-UE}\left(N + \frac{G_p P_{tx,RN}}{L_{RN-UE}}\right)} \quad (4)$$

The optimal NB transmit power can be found by setting (4) and (2) to be equal.

Therefore:

$$P_{tx,NB} = \frac{L_{NB-RN} N P_{tx,RN}}{L_{RN-UE}\left(N + \frac{G_p P_{tx,RN}}{L_{RN-UE}}\right)} \quad (5)$$

$$= \frac{L_{NB-RN} P_{tx,RN}}{\left(L_{RN-UE} + \frac{G_p P_{tx,RN}}{N}\right)}$$

(5) can be rearranged to find the intermediate RN transmit power given the source NB transmit power:

$$P_{tx,RN} = \frac{L_{RN-UE}}{\left(\frac{L_{NB-RN}}{P_{tx,NB}} - \frac{G_p}{N}\right)} \quad (6)$$

2A. Regenerative Relay with TDD: Single Cell Model—FIG. 1A

It is assumed that the two links (source to intermediate, intermediate to destination) operate on the same frequency with TDD being used to separate the receive and transmit operation of the RN (i.e. it is no longer full duplex). If it is assumed that the timeslot in which the RN transmits is not used by the NB then the equations described above for the case of a regenerative relay with an FDD duplexing scheme can be used. However, if the source NB uses the same timeslot as the intermediate RN to communicate with apparatuses or nodes other than the RN, interference will result to the transmission made by the RN. In this case the SINR at a destination UE that is operable to receive communication signals from an intermediate RN is given by:

$$SINR_{RN-UE} = \frac{G_p P_{tx,RN}}{L_{RN-UE}(N + I)} \quad (7)$$

$$= \frac{G_p P_{tx,RN}}{L_{RN-UE}\left(N + \frac{P_{tx\_tot,NB}}{L_{NB-UE}}\right)}$$

Where $P_{tx\_tot,NB}$ is the total transmission power from the NB and $L_{NB-UE}$ is the propagation loss on the NB to UE link. In this case the transmit power at the RN that ensures equal SINR is given by:

$$P_{tx,RN} = P_{tx,NB}\left(\frac{L_{RN-UE}}{L_{NB-RN}}\right)\left(1 + \frac{P_{tx\_tot,NB}}{NL_{NB-UE}}\right) \quad (8)$$

Comparing equation (3) and equation (8) it is apparent that a simple ratio no longer yields the ideal balance. Assuming that $P_{t\_tot,NB} = G_p P_{tx,NB}$ it is possible to write equation (8) as:

$$P_{tx,RN} = P_{tx,NB}\left(\frac{L_{RN-UE}}{L_{NB-RN}}\right)\left(1 + \frac{G_p P_{tx,NB}}{NL_{NB-UE}}\right) \quad (9)$$

$$= \left(\frac{L_{RN-UE}}{L_{NB-RN}}\right)\left(P_{tx,NB} + \frac{G_p P_{tx,NB}^2}{NL_{NB-UE}}\right)$$

From (9) it is possible to determine the ideal RN transmit power given the NB transmit power. It is worth noting that if the set-up of the system is arranged such that the second term in the second bracket is negligible (i.e. $P_{tx\_tot,NB}/NL_{NB-UE} \ll 1$) then the criterion described above for the case of a regenerative relay with an FDD duplex scheme can be used.

It follows that the ideal NB transmit power given a certain RN transmit power can be found from the roots of (9). Expressing (9) in the following simplified form:

$$\frac{L_{RN-UE}}{L_{NB-RN}} P_{tx,NB} + \frac{L_{RN-UE}}{L_{NB-RN}} \frac{G_p}{NL_{NB-UE}} P_{tx,NB}^2 - P_{tx,RN} = 0 \quad (10)$$

$$ax^2 + bx + c = 0$$

Where $$x = P_{tx,NB}, a = \frac{G_p L_{RN-UE}}{NL_{NB-RN} L_{NB-UE}}, b = \frac{L_{RN-UE}}{L_{NB-RN}} \text{ and } c = -P_{tx,RN}$$

it follows that the roots of (10) are given by:

$$x = \frac{-b \pm \sqrt{b^2 - 4ac}}{2a} \quad (11)$$

As the constains a, b and the transmit power are always a positive number, only one root is defined, it therefore follows that the optimal transmit power at the NB that ensures equal SINR at the RN and UE is given by:

$$x = P_{tx,NB} = \frac{-b + \sqrt{b^2 + 4aP_{tx,RN}}}{2a} \quad (12)$$

Finally, it is possible to use the definitions above to rewrite (9), which gives the optimal RN transmit power, in a similar simplified form:

$$P_{tx,RN} = bP_{tx,NB} + aP_{tx,NB}^2 \quad (13)$$

2A. Regenerative Relay with TDD: Two-Cell Model as Shown in FIG. 1B

In addition to assuming that the deployment in both is identical and that the transmit powers on the NB and RN are the same, it is also assumed that where appropriate $P_{tx\_tot,RN} = G_p P_{tx,RN}$ and $P_{tx\_tot,NB} = G_p P_{tx,NB}$ and that for the case of TDD both RN's transmit at the same time. This in effect generates the worse case scenario for two cells.

In this case the SINR at the destination UE that is operable to receive signals from an intermediate RN is now:

$$SINR_{RN-UE} = \frac{G_p P_{tx,RN}}{L_{RN-UE}\left(N + \frac{2G_p P_{tx,NB}}{L_{NB-UE}} + \frac{G_p P_{tx,RN}}{L_{RN-UE}}\right)} \quad (14)$$

The optimal NB transmit power can be found by setting (14) and (2) to be equal:

$$\frac{G_p P_{tx,NB}}{NL_{NB-RN}} = \frac{G_p P_{tx,RN}}{L_{RN-UE}\left(N + \frac{2G_p P_{tx,NB}}{L_{NB-UE}} + \frac{G_p P_{tx,RN}}{L_{RN-UE}}\right)} \quad (15)$$

$$P_{tx,RN} = P_{tx,NB}\left(\frac{L_{RN-UE}}{L_{NB-RN}}\right)\left(1 + \frac{2P_{tx\_tot,NB}}{NL_{NB-UE}} + \frac{P_{tx\_tot,RN}}{NL_{RN-UE}}\right)\left(\frac{L_{RN-UE}}{L_{NB-RN}}\right)$$

$$\left(\frac{2G_p}{NL_{NB-UE}}\right)P_{tx,NB}^2 + \left(\frac{L_{RN-UE}}{L_{NB-RN}}\right)\left(1 + \frac{G_p P_{tx,RN}}{NL_{RN-UE}}\right)P_{tx,NB} - P_{tx,RN}$$

The optimal NB transmit power is found from the positive root of:

$$\left(\frac{L_{RN-UE}}{L_{NB-RN}}\right)\left(\frac{2G_p}{NL_{NB-UE}}\right)P_{tx,NB}^2 + \quad (16)$$

$$\left(\frac{L_{RN-UE}}{L_{NB-RN}}\right)\left(1 + \frac{G_p P_{tx,RN}}{NL_{RN-UE}}\right)P_{tx,NB} - P_{tx,RN} = 0$$

Which is given by:

$$x = P_{tx,NB} = \frac{-b + \sqrt{b^2 - 4ac}}{2a} \quad (17)$$

Where in this case $$a = \frac{2G_p L_{RN-UE}}{NL_{NB-RN} L_{NB-UE}}, \; b = \frac{L_{RN-UE}}{L_{NB-RN}}\left(1 + \frac{G_p P_{tx,RN}}{NL_{RN-UE}}\right)$$

and $c=-P_{tx,RN}$, and both b and c are a function of the RN transmit power.

Given the NB transmit power it is possible to rearrange (15) to find the RN transmit. It follows that the optimal RN transmit power is given by:

$$P_{tx,RN} = \frac{\left(\frac{2G_p}{NL_{NB-UE}} \frac{L_{RN-UE}}{L_{NB-RN}}\right)P_{tx,NB}^2 + \left(\frac{L_{RN-UE}}{L_{NB-RN}}\right)P_{tx,NB}}{1 - \left(\frac{G_p}{NL_{RN-UE}} \frac{L_{RN-UE}}{L_{NB-RN}}\right)P_{tx,NB}} \quad (18)$$

3A. Non-Regenerative Relay Node (RN) with FDD—Single Cell Model as Shown in FIG. 1A The difference between this case and that of a regenerative relay node being used in conjunction with a FDD duplexing scheme is that the SINR at the UE is a function of the SINR at the RN, where the SINR at the destination UE which is connected to the RN is given by:

$$SINR_{RN-UE} = \frac{G_p P_{tx,RN}}{L_{RN-UE}\left(N + \frac{P_{tx,RN}}{L_{RN-UE} SINR_{NB-RN}}\right)} \quad (19)$$

The result is that the ideal balance is no longer derived from setting the SINR at the UE equal to that at the RN. According to (19), the SINR at the RN needs to be set so that it does not prevent this target SINR at the UE from being obtained. However, the NB power must be controlled to limit the SINR at the RN rising beyond that practically required else excess interference and wasted transmit power will result.

Figure 26A:
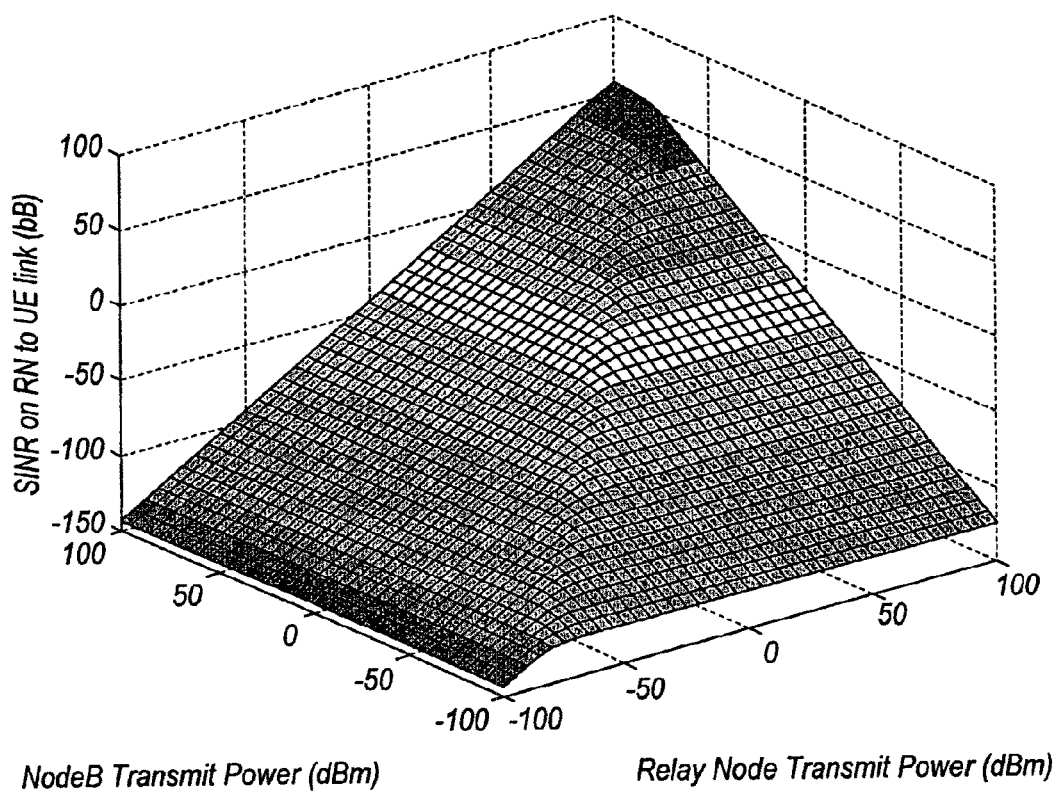
FIGS. 26A and 26B illustrate the relationship between source transmit power and intermediate transmit power in the case of a multi-hop communication system having a non-regenerative relay node and using an FDD duplexing technique.
Figure 26B:
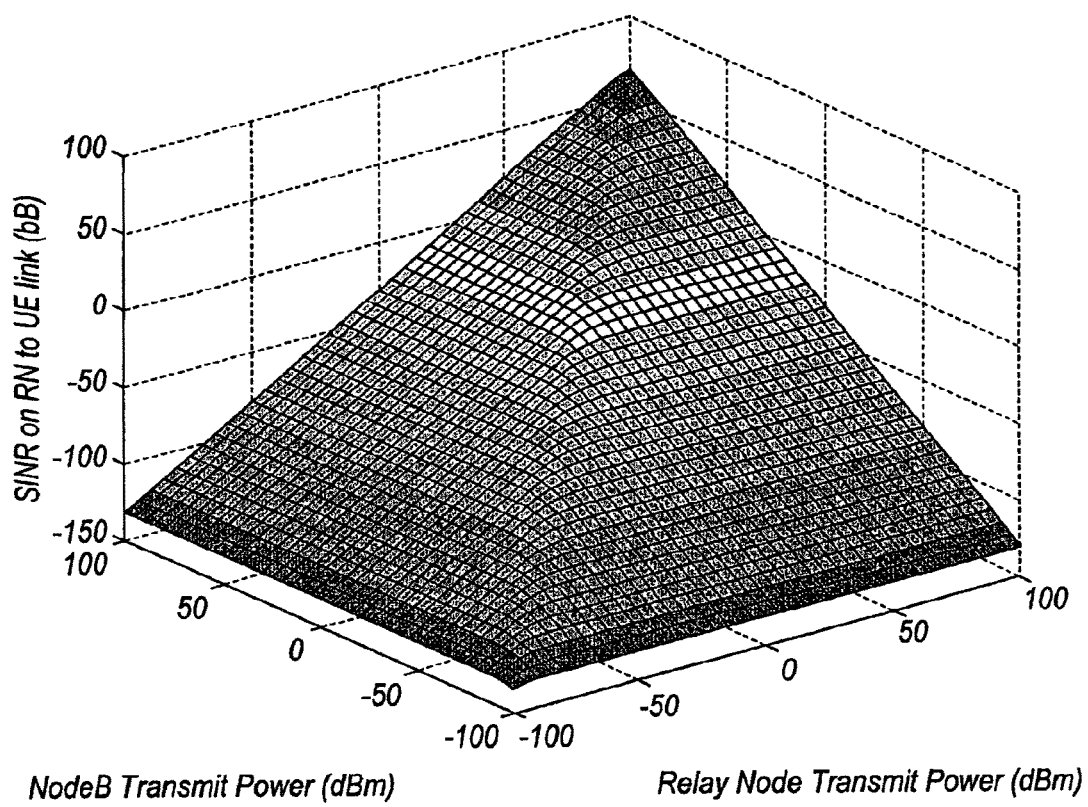

FIGS. 26A and 26B illustrates how the setting of NB and RN transmit power affects the SINR at the UE connected to the RN for a two different deployment scenarios.

Thus, it can be seen that the optimal solution is to select the transmit power of the NB and RN such that the system effectively operates on the diagonal fold in the surface shown in FIG. 26A or 26B. It is possible to realise such a solution by taking the first derivative of (19) and finding the point at which increasing either the NB or RN transmit power results in minimal increase to SINR at UE.

In order to determine the first derivative of (19), it is rewritten as:

$$SINR_{RN-UE} = \frac{G_p P_{tx,RN}}{L_{RN-UE}\left(N + \frac{P_{tx,RN}}{L_{RN-UE} \frac{G_p P_{tx,NB}}{NL_{NB-RN}}}\right)} \quad (20)$$

$$= \frac{1}{\left(\frac{NL_{RN-UE}}{G_p P_{tx,RN}}\right) + \left(\frac{NL_{NB-RN}}{G_p^2 P_{tx,NB}}\right)}$$

Defining $y = SINR_{RN-UE}$, $$k_1 = \frac{NL_{RN-UE}}{G_p} \text{ and } k_2 = \frac{NL_{NB-RN}}{G_p^2}$$

it is possible to simplify (20) to be:

$$y = \frac{1}{\frac{k_1}{P_{tx,RN}} + \frac{k_2}{P_{tx,NB}}} = \frac{P_{tx,NB}}{\frac{k_1 P_{tx,NB}}{P_{tx,RN}} + k_2} \quad (21)$$

In order to find the rate of change of SINR with $P_{tx,NB}$ the quotient rule for differentiation is used:

$$\frac{dy}{d(P_{tx,NB})} = \frac{k_2}{\left(\frac{k_1}{P_{tx,RN}} P_{tx,NB} + k_2\right)^2} = \nabla_{NB} \quad (22)$$

By solving (22) for $P_{tx,NB}$ given the required gradient and $P_{tx,RN}$ it is possible to find the optimal NB transmit power:

$$P_{tx,NB} = \frac{P_{tc,RN}\left(\sqrt{\frac{k_2}{\nabla_{NB}}} - k_2\right)}{k_1} \quad (23)$$

In order to find the optimal RN transmit power given that of the NB, the differentiation of (21) is now performed with respect to $P_{tx,RN}$. In this case the first order derivative is given by:

$$\frac{dy}{d(P_{tx,RN})} = \frac{k_1}{\left(\frac{k_2}{P_{tx,NB}} P_{tx,RN} + k_1\right)^2} = \nabla_{RN} \quad (24)$$

And the optimal RN transmit power given that of the NB is:

$$P_{tx,RN} = \frac{P_{tc,NB}\left(\sqrt{\frac{k_1}{\nabla_{RN}}} - k_1\right)}{k_2} \quad (25)$$

3B. Non-Regenerative Relay Node (RN) with FDD—Two Cell Model as Shown in FIG. 1B

In a two cell model the SINR for the worse case of a destination UE at the cell edge is given by:

$$SINR_{RN-UE} = \frac{G_p P_{tx,RN}}{L_{RN-UE}\left(N + \frac{P_{tx,RN}}{L_{RN-UE}SINR_{NB-RN}} + \frac{G_p P_{tx,RN}}{L_{RN-UE}}\right)} \quad (26)$$

$$= \frac{1}{\left(\frac{NL_{RN-UE}}{G_p P_{tx,RN}}\right) + \left(\frac{NL_{NB-RN}}{G_p^2 P_{tx,NB}}\right) + 1}$$

Assuming that the transmit power of the two RN's is equal, the deployment is identical across the two cells and that $P_{tx\_tot,RN} = G_p P_{tx,RN}$, then the simplified form of (26) is given by:

$$SINR_{RN-UE} = \frac{1}{\frac{k_1}{P_{tx,RN}} + \frac{k_2}{P_{tx,NB}} + 1} \quad (27)$$

$$= \frac{P_{tx,NB}}{\left(\frac{k_1}{P_{tx,RN}} + 1\right)P_{tx,NB} + k_2}$$

The first derivative is now:

$$\frac{dy}{d(P_{tx,NB})} = \frac{k_2}{\left(\left(\frac{k_1}{P_{tx,RN}} + 1\right)P_{tx,NB} + k_2\right)^2} \quad (28)$$

Thus the optimal NB transmit power can be found by:

$$P_{tx,NB} = \frac{P_{tx,RN}\sqrt{\frac{k_2}{\nabla}} - k_2}{k_1 + P_{tx,RN}} \quad (29)$$

The optimal RN transmit power is found by taking the derivative of (27) with respect to $P_{tx,RN}$:

$$\frac{dy}{d(P_{tx,RN})} = \frac{k_1}{\left(\left(\frac{k_2}{P_{tx,NB}} + 1\right)P_{tx,RN} + k_1\right)^2} \quad (30)$$

Thus the optimal RN transmit power can be found by:

$$P_{tx,RN} = \frac{P_{tx,NB}\sqrt{\frac{k_1}{\nabla}} - k_1}{k_2 + P_{tx,NB}} \quad (31)$$

4A—Non-Regenerative Relay with TDD—Single Cell Model as Shown in FIG. 1A

This case is similar to that described above for a non-regenerative except for the fact that now interference from the NB must be taken into account due to the fact that it transmits on the same frequency and at the same time as the RN. In this case the SINR at the UE which is receiving communication signals transmitted by the RN is given by:

$$SINR_{RN-UE} = \frac{G_p P_{tx,RN}}{L_{RN-UE}\left(N + \frac{P_{tx,RN}}{L_{RN-UE}SINR_{NB-RN}} + \frac{P_{tx\_tot,NB}}{L_{NB-UE}}\right)} \quad (32)$$

If the $P_{tx,NB}/P_{tx,RN}$ is too large then the SINR at the UE is limited due to insufficient RN transmit power and it is likely the area in which the link performance of a connection to a RN outperforms that for a connection to the NB is reduced. Conversely, if it is too small then the SINR at the UE is limited by the low SINR at the RN.

Figure 27A:
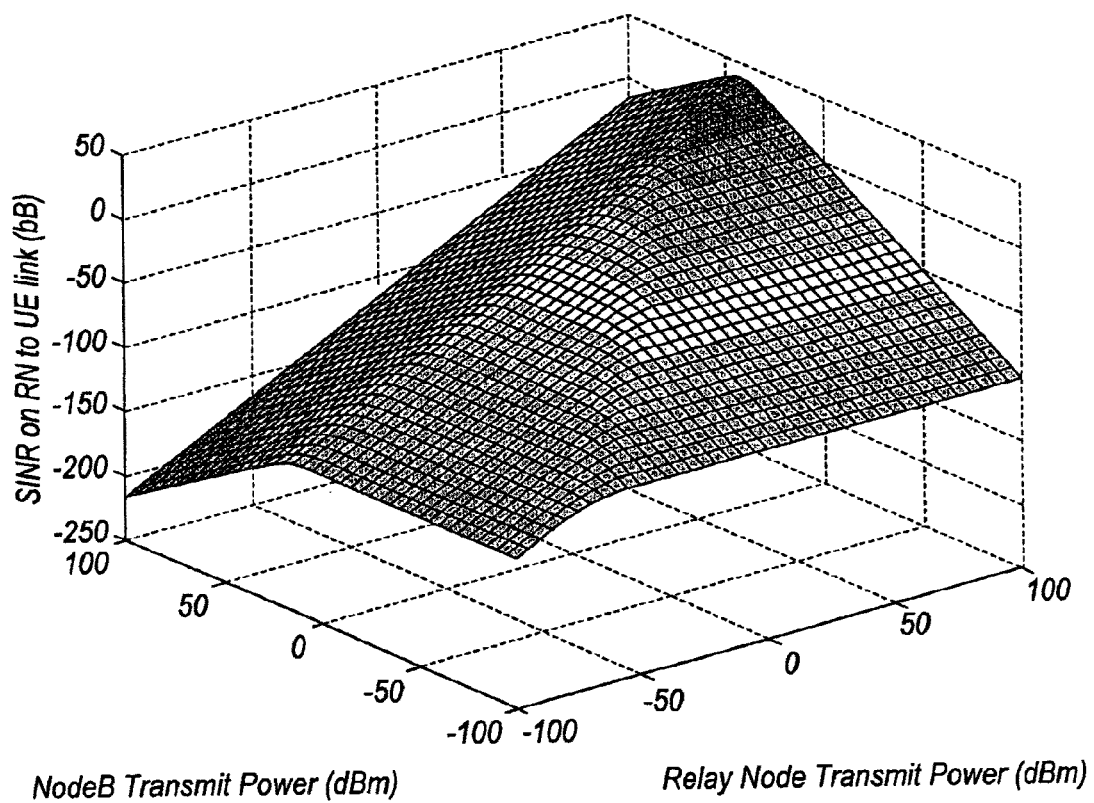
FIGS. 27A and 27B illustrate the relationship between source transmit power and intermediate transmit power in the case of a multi-hop communication system having a non-regenerative relay node and using a TDD duplexing technique.
Figure 27B:
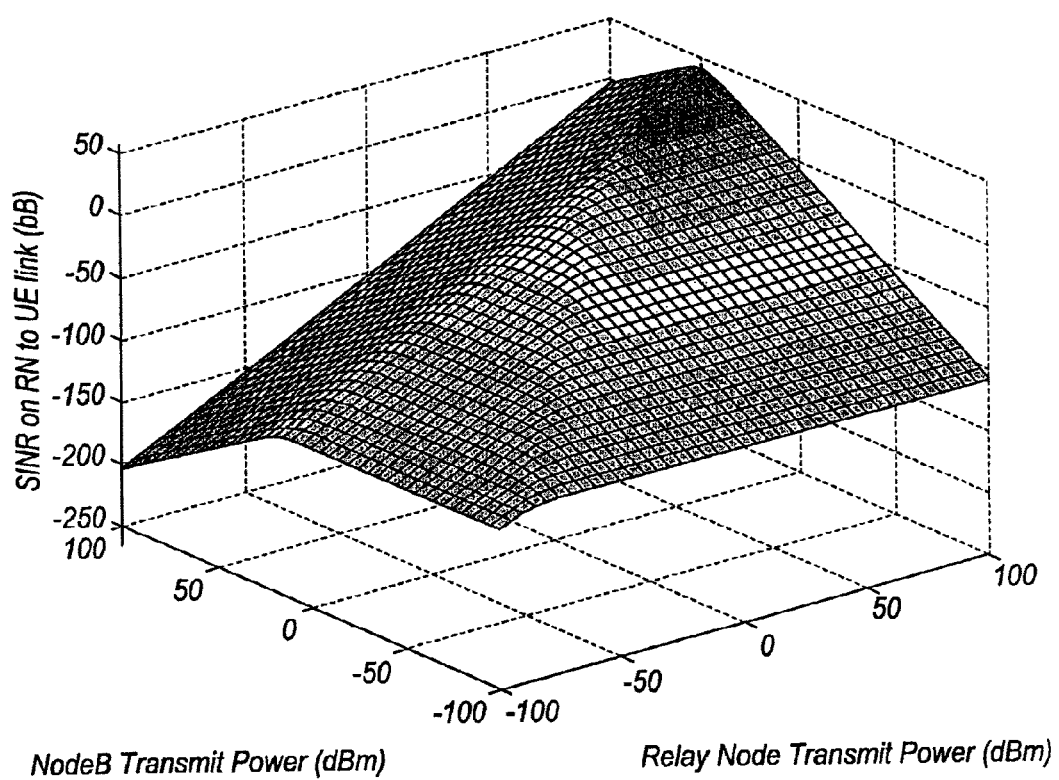

In this case, the balance is even finer than of that described in the case of a non-regenerative relay node employed in conjunction with an FDD duplexing scheme, as illustrated by FIG. 27. The optimal operating point is given by finding the point at which the first derivative of (32) is equal to zero. In order to find this optimal point, (32) is first rearranged in the following form:

$$SINR_{RN-UE} = \frac{G_p P_{tx,RN}}{L_{RN-UE}\left(N + \frac{P_{tx,RN}}{L_{RN-UE}\left(\frac{G_p P_{tx,NB}}{NL_{NB-RN}}\right)} + \frac{P_{tx\_tot,NB}}{L_{NB-UE}}\right)} \quad (33)$$

$$= \frac{1}{\left(\frac{NL_{RN-UE}}{G_p P_{tx,RN}}\right) + \left(\frac{NL_{NB-RN}}{G_p^2 P_{tx,NB}}\right) + \left(\frac{L_{RN-UE}P_{tx,NB}}{L_{NB-UE}P_{tx,RN}}\right)}$$

Defining $y = SINR_{RN-UE}$, $$k_1 = \frac{NL_{RN-UE}}{G_p} \text{ and } k_2 = \frac{NL_{NB-RN}}{G_p^2}$$

Using the definitions from the description in 3A above and $$k_3 = \left(\frac{L_{RN-UE}}{L_{NB-UE}}\right)$$

it is possible to simplify (33) to:

$$y = \frac{1}{\left(\frac{k_1}{P_{tx,RN}}\right) + \left(\frac{k_2}{P_{tx,NB}}\right) + \left(\frac{k_3 P_{tx,NB}}{P_{tx,RN}}\right)} = \quad (34)$$

-continued $$\frac{P_{tx,NB}}{\left(\frac{k_1}{P_{tx,RN}}\right)P_{tx,NB} + k_2 + \left(\frac{k_3}{P_{tx,RN}}\right)P_{tx,NB}^2}$$

The next step is to find the single maxima of the parabolic function in (34) by solving:

$$\frac{dy}{dx} = 0 \tag{35}$$

Using the quotient rule to find the first derivative of (34):

$$\frac{dy}{d(P_{tx,NB})} = \frac{\frac{k_1}{P_{tx,RN}}P_{tx,NB} + k_2 + \frac{k_3}{P_{tx,RN}}P_{tx,NB}^2 - P_{tx,NB}\left(\frac{k_1}{P_{tx,RN}} + \frac{2k_3}{P_{tx,RN}}P_{tx,NB}\right)}{\left(\frac{k_1}{P_{tx,RN}}P_{tx,NB} + k_2 + \frac{k_3}{P_{tx,RN}}P_{tx,NB}^2\right)^2} \tag{36}$$

The maxima of y is found by setting (36) equal to zero and solving for $P_{tx,NB}$. It follows that the maximum SINR at the UE is obtained by setting:

$$\frac{k_1}{P_{tx,RN}}P_{tx,NB} + k_2 + \frac{k_3}{P_{tx,RN}}P_{tx,NB}^2 = P_{tx,NB}^2\left(\frac{k_1}{P_{tx,RN}} + \frac{2k_3}{P_{tx,RN}}P_{tx,NB}\right) \tag{37}$$

$$P_{tx,NB} = \sqrt{\frac{P_{tx,RN}k_2}{2k_3}}$$

Therefore, given the transmit power of the RN it is possible to use (37) to find the corresponding NB transmit power that ensures maximum SINR at the UE that is connected to the RN.

For the case of finding the optimal RN transmit power given the NB transmit power a similar approach to that described in above in the case of a non-regenerative relay node employed in conjunction with an FDD duplexing scheme, can be used as the SINR at the UE is not a parabolic function of RN transmit power. In order to find the optimal RN transmit power, (34) is rearranged to the following:

$$y = \frac{1}{\left(\frac{k_1}{P_{tx,RN}}\right) + \left(\frac{k_2}{P_{tx,NB}}\right) + \left(\frac{k_3P_{tx,NB}}{P_{tx,RN}}\right)} = \frac{P_{tx,RN}}{\left(\frac{P_{tx,RN}k_2}{P_{tx,NB}}\right) + k_3P_{tx,NB} + k_1} \tag{38}$$

The first derivative is now:

$$\frac{dy}{d(P_{tx,RN})} = \frac{k_3P_{tx,NB} + k_1}{\left(\left(\frac{P_{tx,RN}k_2}{P_{tx,NB}}\right) + k_3P_{tx,NB} + k_1\right)^2} = \nabla \tag{39}$$

Solving (39) for $P_{tx,RN}$ gives the optimal RN transmit power given the NB transmit power:

$$P_{tx,RN} = \frac{P_{tx,NB}\left(\sqrt{\frac{k_3P_{tx,NB} + k_1}{\nabla}} - (k_3P_{tx,NB} + k_1)\right)}{k_2} \tag{40}$$

By observing the surface in FIG. 27 and from the form of (34) and the result in (40) it is apparent that if the NB transmit power is small then the rate of change of SINR with RN transmit power will decrease with increasing RN transmit power. However, for the case of large NB transmit power, the SINR at the UE approximates to a linear function of RN transmit power. The result is that in this case the solution to the problem, as summarised in (40) will be infinite.

4B—Non-Regenerative Relay with TDD—Two Cell Model as Shown in FIG. 1B

The worse case, from the perspective of a UE at the cell edge, is when the neighbouring cell employs a TDD scheme with the same timeslot used for RN transmission. If it is assumed that the cells are equal in size with the same deployment and transmit power settings and that $P_{tx\_tot,RN/NB} = G_p P_{tx,RN/NB}$ then:

$$SINR_{RN-UE} = \frac{G_p P_{tx,RN}}{L_{RN-UE}\left(N + \frac{P_{tx,RN}}{L_{RN-UE}SINR_{NB-R1}} + \frac{2G_p P_{tx,NB}}{L_{NB-UE}} + \frac{G_p P_{tx,RN}}{L_{RN-UE}}\right)} \tag{41}$$

$$= \frac{1}{\left(\frac{NL_{RN-UE}}{G_p P_{tx,RN}}\right) + \left(\frac{NL_{NB-RN}}{G_p^2 P_{tx,NB}}\right) + \left(\frac{2L_{RN-UE}P_{tx,NB}}{L_{NB-UE}P_{tx,RN}}\right) + 1}$$

In this case the simplified form of (4) is:

$$SINR_{RN-UE} = \frac{1}{\frac{k_1}{P_{tx,RN}} + \frac{k_2}{P_{tx,NB}} + \frac{2k_3}{P_{tx,RN}}P_{tx,NB} + 1} \tag{42}$$

$$= \frac{P_{tx,NB}}{\left(\frac{k_1}{P_{tx,RN}} + 1\right)P_{tx,NB} + k_2 + \frac{2k_3}{P_{tx,RN}}P_{tx,NB}^2}$$

And the first derivative is:

$$\frac{dy}{d(P_{tx,NB})} = \frac{\left(\frac{k_1}{P_{tx,RN}} + 1\right)P_{tx,NB} + k_2 + \frac{2k_3}{P_{tx,RN}}P_{tx,NB}^2 - P_{tx,NB}\left(\frac{k_1}{P_{tx,RN}} + 1 + \frac{4k_3}{P_{tx,RN}}P_{tx,NB}\right)}{\left(\left(\frac{k_1}{P_{tx,RN}} + 1\right)P_{tx,NB} + k_2 + \frac{2k_3}{P_{tx,RN}}P_{tx,NB}^2\right)^2} \tag{43}$$

Finally, the maxima is given by setting (43) equal to zero and solving for $P_{tx,NB}$:

$$\left(\frac{k_1}{P_{tx,RN}} + 1\right)P_{tx,NB} + k_2 + \frac{2k_3}{P_{tx,RN}}P_{tx,NB}^2 = P_{tx,NB}\left(\frac{k_1}{P_{tx,RN}} + 1 + \frac{4k_3}{P_{tx,RN}}P_{tx,NB}\right) \tag{44}$$

-continued $$k_2 + \frac{2k_3}{P_{tx,RN}} P_{tx,NB}^2 = \frac{4k_3}{P_{tx,RN}} P_{tx,NB}^2$$

$$P_{tx,NB} = \sqrt{\frac{P_{tx,RN} k_2}{2k_3}}$$

In order to find the optimal RN transmit power given the NB transmit power (42) is rearranged to:

$$y = \frac{1}{\frac{k_1}{P_{tx,RN}} + \frac{k_2}{P_{tx,NB}} + \frac{2k_3}{P_{tx,RN}} P_{tx,NB} + 1} \quad (45)$$

$$= \frac{P_{tx,RN}}{k_1 + \frac{k_2 P_{tx,RN}}{P_{tx,NB}} + 2k_3 P_{tx,NB} + P_{tx,RN}}$$

The first derivative is now:

$$\frac{dy}{d(P_{tx,RN})} = \frac{k_1 + 2k_3 P_{tx,NB}}{\left(k_1 + 2k_3 P_{tx,NB} + P_{tx,RN}\left(1 + \frac{k_2}{P_{tx,NB}}\right)\right)^2} = \nabla \quad (46)$$

Solving (46) for $P_{tx,RN}$ gives the optimal RN transmit power given the NB transmit power:

$$P_{tx,RN} = \frac{P_{tx,NB}\sqrt{\frac{k_1 + 2k_3 P_{tx,NB}}{\nabla}} - (k_1 + 2k_3 P_{tx,NB})}{(P_{tx,NB} + k_2)} \quad (47)$$

Again, in the case of large NB transmit power, the SINR at the UE approximates to a linear function of RN transmit power. The result is that the solution to (47) will be infinite.

The optimal transmit power balance will now be determined based on the solutions developed above for the different relay and duplexing schemes and for two separate deployment scenarios. These deployment scenarios are summarised in Table III and the propagation parameters of the pathloss equation in (48) are in Table IV.

$$L = b + 10n \log d \quad (48)$$

Where L is the pathloss in dB, b is in dB and is given in Table along with n, and d is the transmitter-receiver separation in meters.

TABLE III

Deployment scenarios

| | Scenario | |
|---|---|---|
| Parameter | 1 | 2 |
| Cell Radius | 1867 m | |
| Relay Position | 933 m | 1400 m |

The transmitter receiver separation is the same as the cell radius (i.e. the UE is located at the cell radius). The RN position quoted is relative to the centre of the cell which is where the NB is located. The RN positions are therefore the distance from the NB to the RN. The RN-UE is then the difference of the cell radius and the NB-RN separation.

TABLE IV

Propagation parameters.

| | Link | | |
|---|---|---|---|
| Parameter | NB-UE | NB-RN | RN-UE |
| b (dB) | 15.3 | 15.5 | 28 |
| n | 3.76 | 3.68 | 4 |

Regenerative Relay

Figure 28A:
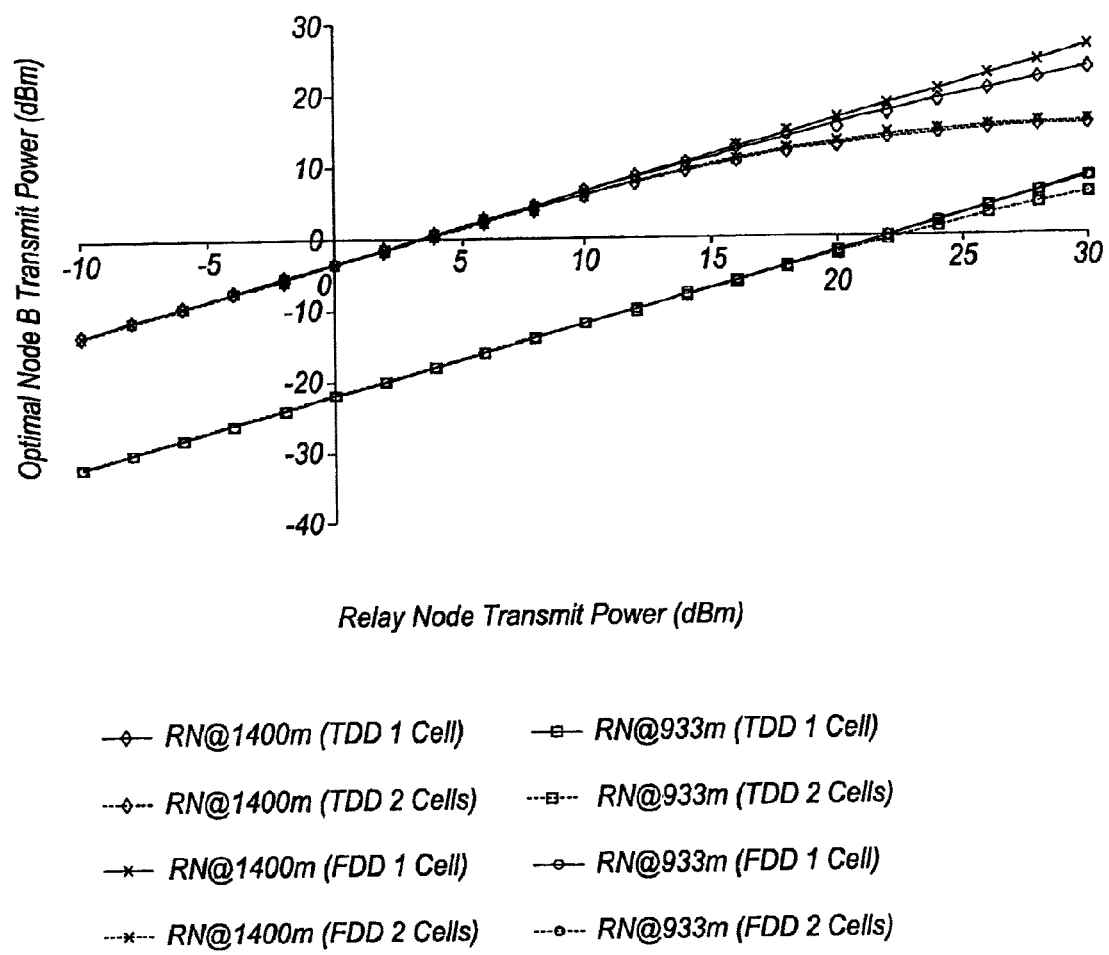
FIGS. 28A, 28B and 28C illustrate the optimal NB transmit power as a function of RN transmit power.

Substituting the values given in Table III and Table IV into equations (3) and (5) for FDD and (12) and (17) for TDD it is possible to find the optimal NB transmit power given the RN transmit power. FIG. 28A shows the optimal NB transmit power as a function of RN transmit power for both FDD and TDD for the two deployment scenarios.

Non-Regenerative Relay with FDD

Figure 28B:
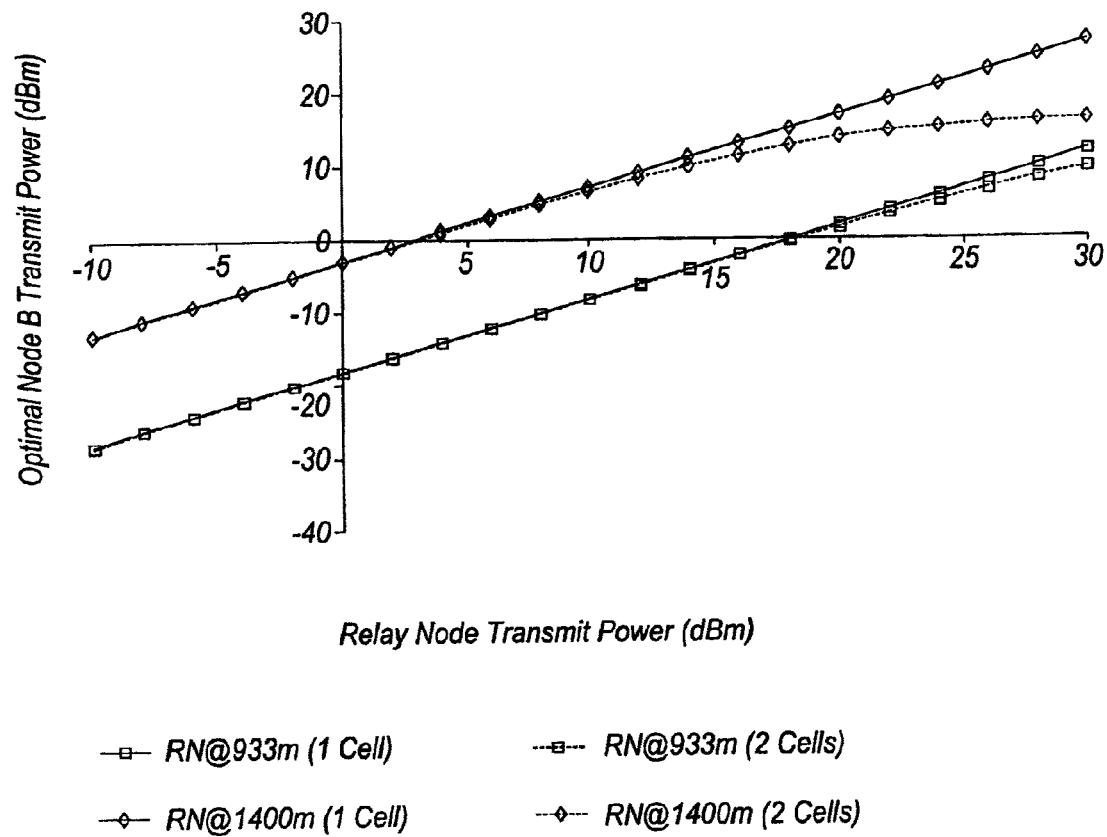

Substituting the parameters into (23) and (24) it is possible to find the optimal NB transmit power for the two deployment scenarios, as shown in FIG. 28B.

Non-Regenerative Relay with TDD

Figure 28C:
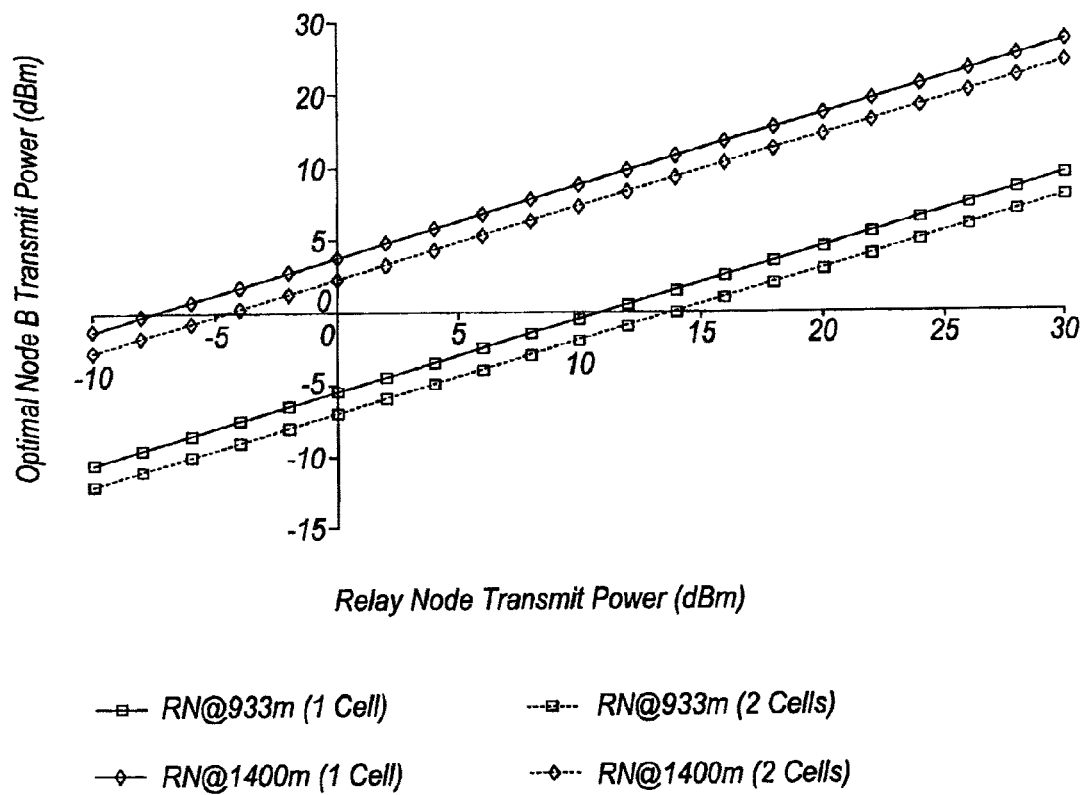

Substituting the parameters into (37) and (44) it is possible to find the optimal NB transmit power for the two deployment scenarios, as shown in FIG. 28C.

System Level Simulation Results

System simulation of a multi-hop HSDPA network employing non-regenerative relays with TDD duplexing with relays transmitting in every third transmission time interval have been conducted in order to validate the predicted optimal transmit power setting based on results of FIG. 28C, with the average packet call throughput gain being determined as the transmit powers of the RN and NB are varied around the optimal point.

Results of a system level simulation for the two deployment scenarios detailed above in Table III will now be presented. The simulation parameters are listed below in Table V and Table VI.

TABLE V

Deployment parameters

| Parameter | | Value |
|---|---|---|
| Base Station | Inter-cell Separation | 2.8 km |
| | Sectors/cell | 3 |
| | Antenna Height | 15 m |
| | Antenna Gain | 17 dBi |
| Relay Station | RN antenna | 120° |
| | Position | ½ and ¾ cell radius |
| | Num/cell | 9 |
| | Antenna Height | 5 m |
| | Antenna Gain | 17 dBi |
| User Equipment | Number per sector | 50 |
| | Initial Distribution | Random |
| | Velocity | 3 km/h |
| | Direction | Semi-directed |
| | Update | 20 m |
| Traffic Models | | WWW |

TABLE VI

Simulation parameters

| Parameters | | Value |
|---|---|---|
| Base Station/ | HS-DSCH power | Variable |
| Relay Node | CPICH power | 20% of total |
| | HARQ scheme | Chase |
| | HS-DSCH/frame | 15 |
| | Relay buffer size | 1.78 Mbits |
| | Ack/NAck Detection | Error free |
| | NB Scheduler | Round Robin |
| | Relay type | Amplify & Forward |
| User | | 10 |
| Equipment | Thermal Noise Density | −174 dBm/Hz |
| | Noise Figure | 5 dBm |
| | Detector | MMSE |

For both deployment scenarios the gain in the average packet call throughput experienced by the users on that observed for the case of a single hop system with NB transmission power of 30 dBm is plotted as a function of NB transmit power for four different RN transmit powers. FIG. 29A shows the gain for deployment scenario 1 and FIG. 29B shows the gain for scenario 2.

Note that the channel gain for the NB to UE link was 3 dB higher than for the NB to RN and RN to UE link. This means that the interference experienced by a UE connected to a RN from another NB is double that used in the link analysis discussed above with reference to FIGS. 28A, 28B and 28C.

The channel gain is due to the fact that a number of replicas of the transmitted signal are received, when the power on all these is added it is found that for the case of the NB to UE channel the total power is double that on the NB to RN or RN to UE channel. This accounts for the 3 dB gain, as 3 dB equates to double. As a result of the channel gain being higher for the NB to UE channel, this means that the received signal power will be 3 dB (or double) higher than that used in the analysis up to that point where no channel gain through multipath was considered.

Comparison of Link Based Prediction and System Simulation

Figure 30:
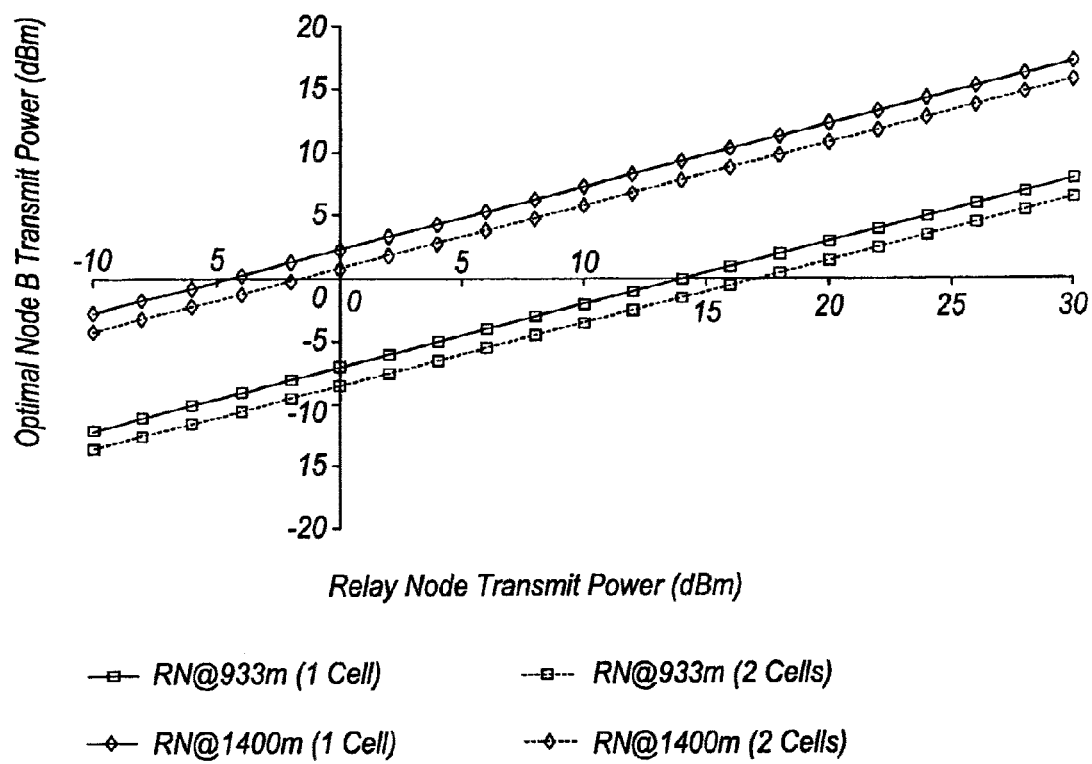
FIG. 30 illustrate the optimal NB transmit power as a function of RN transmit power where it is assumed that the communication link between the source and destination apparatus has a 3 dB gain compared with the shorter multi-hop links and FIG. 31 shows an ad-hoc network according to an embodiment of the present invention.

FIG. 30 shows the optimal NB transmit power as a function of RN transmit power for a non-regenerative relay for TDD for each deployment scenario where it is assumed the NB to UE link has a 3 dB gain compared with the other links. In this case, the predicted transmit power at the NB for the RN transmit power used in the simulation are listed in Table VII along with the throughput gain that would be experienced if these settings were used and the maximum achievable.

TABLE VII

Predicted optimal NB transmit power and resulting simulated throughput gain that would have been achieved from this setting compared with the maximum gain observed.

| | NB Transmit Power (dBm) & User Packet Throughput Gain | | | | | |
|---|---|---|---|---|---|---|
| | Scenario 1 | | | Scenario 2 | | |
| RN Transmit Power (dBm) | Predicted | Throughput Gain | Max Gain | Predicted | Throughput Gain | Max Gain |
| 16 | −0.5 | 33% | 40% | 8.8 | 60% | 67% |
| 19 | 1 | 38% | 43% | 10.3 | 65% | 74% |
| 22 | 2.5 | 41% | 46% | 11.8 | 68% | 74% |
| 25 | 4 | 49% | 51% | 13.3 | 72% | 75% |

Table VII, FIG. 28A and FIG. 29B suggest that if power balancing is performed according to a preferred embodiment of the present invention using a technique based on the equations developed above then the selected power balance will in general be in the region of the optimal point. In particular, for the transmit powers used the gain was shown to always be within 10% of the achievable maximum, with the difference being due to shortcomings of using of a two-cell model to model a multi-cell system.

The necessity of transmit power balancing is apparent in the results presented in both FIG. 29A and FIG. 29B where it is shown that if the NB transmit is increased beyond the optimal point then a significant degradation in gain will be experienced despite the emission of more signal energy. It also shows that if the NB transmit power is selected carefully then the sensitivity of the gain to RN transmit power is reduced.

The invention claimed is:

1. A communication system comprising:
a source apparatus;
a destination apparatus; and
an intermediate apparatus being for transmitting signals received from the source apparatus or signals derived from the signals to the destination apparatus or other intermediate apparatus;
wherein the communication system further comprises:
a quality of service determination unit for deriving indicators of the quality of service experienced by the destination apparatus and/or for deriving a target quality of service for the destination apparatus; and
an indicator change detection unit for detecting a change in an indicator of the quality of service experienced by the destination apparatus and/or for detecting a change in the target quality of service;
wherein:
the destination apparatus comprises a bandwidth allocation determining unit operable, in response to the detection of a change in an indicator of the quality of service experienced by the destination apparatus and/or in the target quality of service detected by the indicator change detection unit, to determine a bandwidth to be allocated to the intermediate apparatus, for transmission from the intermediate apparatus to the destination apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus; and
the intermediate apparatus comprises a receiving unit to receive notification from the destination apparatus of the bandwidth allocation determined by the bandwidth allocation determining unit; and
a bandwidth allocation unit to allocate a bandwidth to the intermediate apparatus for transmission from the intermediate apparatus to the destination apparatus in accordance with the received notification or in accordance with a revised notification obtained by revising the notification.

2. A communication system comprising:
a source apparatus;
a destination apparatus; and
an intermediate apparatus being for transmitting signals received from the source apparatus or signals derived from the signals to the destination apparatus or other intermediate apparatus;
wherein the communication system further comprises:
a quality of service determination unit for deriving indicators of the quality of service experienced by the destination apparatus and/or for deriving a target quality of service for the destination apparatus; and
an indicator change detection unit for detecting a change in an indicator of the quality of service experienced by the destination apparatus and/or for detecting a change in the target quality of service;
wherein:
the destination apparatus comprises a bandwidth allocation determining unit operable, in response to the detection of a change in an indicator of the quality of service experienced by the destination apparatus and/or in the target quality of service detected by the indicator change detection unit, to determine a bandwidth to be allocated to the source apparatus, for transmission from the source apparatus to the intermediate apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus; and
the intermediate apparatus comprises a receiving unit to receive notification from the destination apparatus of the bandwidth determined by the bandwidth allocation determining unit; and
a bandwidth allocation unit to allocate a bandwidth to the source apparatus for transmission from the source apparatus to the intermediate apparatus in accordance with the received notification or in accordance with a revised notification obtained by revising the notification.

3. An intermediate apparatus in a communication system including a source apparatus, a destination apparatus and the intermediate apparatus, the communication system further comprising:
a quality of service determination device for deriving indicators of the quality of service experienced by the destination apparatus and/or for deriving a target quality of service for the destination apparatus; and
an indicator change detection device for detecting a change in an indicator of the quality of service experienced by the destination apparatus and/or for detecting a change in the target quality of service;
wherein the intermediate apparatus comprises:
a transmitting device for transmitting signals received from the source apparatus, or signals derived from the signals, to the destination apparatus or other intermediate apparatus, the destination apparatus comprising a bandwidth allocation determining device operable, in response to the detection of a change in an indicator of the quality of service experienced by the destination apparatus and/or in the target quality of service detected by the indicator change detection device, to determine a bandwidth to be allocated to the intermediate apparatus, for transmission from the intermediate apparatus to the destination apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus;
a receiving device for receiving notification from the destination apparatus of the bandwidth allocation determined by the bandwidth allocation determining device; and
a bandwidth allocation device to allocate a bandwidth to the intermediate apparatus for transmission from the intermediate apparatus to the destination apparatus in accordance with the received notification or in accordance with a revised notification obtained by revising the notification.

4. An intermediate apparatus in a communication system including a source apparatus, a destination apparatus and the intermediate apparatus, the communication system further comprising:
a quality of service determination device for deriving indicators of the quality of service experienced by the destination apparatus and/or for deriving a target quality of service for the destination apparatus; and
an indicator change detection device for detecting a change in an indicator of the quality of service experienced by the destination apparatus and/or for detecting a change in the target quality of service;
wherein the intermediate apparatus comprises:
a transmitting device for transmitting signals received from the source apparatus, or signals derived from the signals, to the destination apparatus or other intermediate apparatus, the destination apparatus comprising a bandwidth allocation determining device operable, in response to the detection of a change in an indicator of the quality of service experienced by the destination apparatus and/or in the target quality of service detected by the indicator change detection device, to determine a bandwidth to be allocated to the source apparatus, for transmission from the source apparatus to the intermediate apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus;
a receiving device for receiving notification from the destination apparatus of the bandwidth allocation determined by the bandwidth allocation determining device; and
a bandwidth allocation device to allocate a bandwidth to the source apparatus for transmission from the source apparatus to the intermediate apparatus in accordance with the received notification or in accordance with a revised notification obtained by revising the notification.

5. A communication method in which signals received from a source apparatus, or signals derived from the signals, are transmitted to a destination apparatus or other intermediate apparatus, wherein the method comprises:
deriving indicators of the quality of service experienced by the destination apparatus and/or deriving a target quality of service for the destination apparatus; and detecting a change in an indicator of the quality of service experienced by the destination apparatus and/or detecting a change in the target quality of service, wherein the destination apparatus is operable, in response to the detection of a change in an indicator of the quality of service experienced by the destination apparatus and/or in the target quality of service detected by the indicator change detection unit, to determine a bandwidth to be allocated to the intermediate apparatus, for transmission from the intermediate apparatus to the destination apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus; and the intermediate apparatus is operable:

to receive notification from the destination apparatus of the bandwidth allocation determined by the bandwidth allocation determining unit; and to allocate a bandwidth to the intermediate apparatus for transmission from the intermediate apparatus to the destination apparatus in accordance with the received notification or in accordance with a revised notification obtained by revising the notification.

6. A communication method in which signals received from the source apparatus, or signals derived from the signals, are transmitted to the destination apparatus or other intermediate apparatus, wherein the method comprises:

deriving indicators of the quality of service experienced by the destination apparatus and/or deriving a target quality of service for the destination apparatus; and detecting a change in an indicator of the quality of service experienced by the destination apparatus and/or detecting a change in the target quality of service, the destination apparatus is operable, in response to the detection of a change in an indicator of the quality of service experienced by the destination apparatus and/or in the target quality of service detected by the indicator change detection unit, to determine a bandwidth to be allocated to the source apparatus, for transmission from the source apparatus to the intermediate apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus; and the intermediate apparatus is operable to:

receive notification from the destination apparatus of the bandwidth allocation determined by the bandwidth allocation determining unit; and allocate a bandwidth to the source apparatus for transmission from the source apparatus to the intermediate apparatus in accordance with the received notification or in accordance with a revised notification obtained by revising the notification.

7. A communication method carried out in an intermediate apparatus of a communication system the intermediate apparatus being operable to transmit signals received from a source apparatus, or signals derived from the signals, to a destination apparatus or other intermediate apparatus, the communication system comprising:

a quality of service determination device for deriving indicators of the quality of service experienced by the destination apparatus and/or for deriving a target quality of service for the destination apparatus; and an indicator change detection device for detecting a change in an indicator of the quality of service experienced by the destination apparatus and/or for detecting a change in the target quality of service, the destination apparatus comprising a bandwidth allocation determining device operable, in response to the detection of a change in an indicator of the quality of service experienced by the destination apparatus and/or in the target quality of service detected by the indicator change detection device, to determine a bandwidth to be allocated to the intermediate apparatus, for transmission from the intermediate apparatus to the destination apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus;

the method comprising:

receiving notification from the destination apparatus of the bandwidth allocation determined by the bandwidth allocation determining device; and allocating a bandwidth to the intermediate apparatus for transmission from the intermediate apparatus to the destination apparatus in accordance with the received notification or in accordance with a revised notification obtained by revising the notification.

8. A communication method carried out in an intermediate apparatus operable to transmit signals received from a source apparatus, or signals derived from the signals, to a destination apparatus or other intermediate apparatus, the communication system comprising:

a quality of service determination device for deriving indicators of the quality of service experienced by the destination apparatus and/or for deriving a target quality of service for the destination apparatus; and an indicator change detection device for detecting a change in an indicator of the quality of service experienced by the destination apparatus and/or for detecting a change in the target quality of service, the destination apparatus comprising a bandwidth allocation determining device operable, in response to the detection of a change in an indicator of the quality of service experienced by the destination apparatus and/or in the target quality of service detected by the indicator change detection device, to determine a bandwidth to be allocated to the source apparatus, for transmission from the source apparatus to the intermediate apparatus, that will attain or maintain a balance between a measure of the quality of service experienced at the destination apparatus and a measure of the quality of service experienced at the intermediate apparatus in order that the number of data packets received at the intermediate apparatus is substantially equal to the number of data packets received at the destination apparatus;

the method comprising:

receiving notification from the destination apparatus of the bandwidth allocation determined by the bandwidth allocation determining device; and allocating a bandwidth to the source apparatus for transmission from the source apparatus to the intermediate apparatus in accordance with the received notification or in accordance with a revised notification obtained by revising the notification.

* * * * *